United States Patent
Stretton et al.

(10) Patent No.: US 10,981,663 B2
(45) Date of Patent: *Apr. 20, 2021

(54) AERO ENGINE FLOW RATE

(71) Applicant: ROLLS-ROYCE PLC, London (GB)

(72) Inventors: Richard G Stretton, Ashby-de-la-Zouch (GB); Michael C Willmot, Sheffield (GB)

(73) Assignee: ROLLS-ROYCE PLC, London (GB)

(*) Notice: Subject to any disclaimer, the term of this patent is extended or adjusted under 35 U.S.C. 154(b) by 0 days.

This patent is subject to a terminal disclaimer.

(21) Appl. No.: 16/934,767

(22) Filed: Jul. 21, 2020

(65) Prior Publication Data

US 2020/0346779 A1    Nov. 5, 2020

Related U.S. Application Data

(63) Continuation of application No. 16/741,005, filed on Jan. 13, 2020, which is a continuation of application
(Continued)

(30) Foreign Application Priority Data

Dec. 21, 2018    (GB) ..................................... 1820930

(51) Int. Cl.
    *F02K 3/06*       (2006.01)
    *B64D 33/02*    (2006.01)
    (Continued)

(52) U.S. Cl.
    CPC ............. *B64D 33/02* (2013.01); *B64D 27/12* (2013.01); *F02C 7/04* (2013.01); *F02K 3/06* (2013.01);
(Continued)

(58) Field of Classification Search
CPC .. F02C 7/04; F02K 3/06; B64D 27/12; B64D 33/02; B64D 2033/0286; F05D 2200/00
See application file for complete search history.

(56) References Cited

U.S. PATENT DOCUMENTS 7,165,744 B2 *   1/2007   Howarth ................ B64D 29/02
                                               244/55
10,752,369 B2 *   8/2020   Takami ..................... F02K 3/06
(Continued)

*Primary Examiner* — Arun Goyal
(74) *Attorney, Agent, or Firm* — Oliff PLC

(57) ABSTRACT

A gas turbine engine of an aircraft includes: an engine core having a turbine including a lowest pressure rotor stage, a turbine diameter, a fan including a plurality of fan blades extending from a hub, an annular fan face at a leading edge of the fan defining a fan tip radius at the fan face; wherein a downstream blockage ratio is defined as:

$$\frac{\text{the turbine diameter at an axial location of the lowest pressure rotor stage}}{\text{a distance from a ground plane to the wing}}$$

and wherein an engine blockage ratio of:

$$\frac{(2\times \text{the fan tip radius/the engine length})}{\text{the downstream blockage ratio}}$$

is in the range from 2.5 to 4.

17 Claims, 14 Drawing Sheets

Related U.S. Application Data

No. 16/398,909, filed on Apr. 30, 2019, now Pat. No. 10,583,932.

(51) Int. Cl.
  *B64D 27/12* (2006.01)
  *F02C 7/04* (2006.01)

(52) U.S. Cl.
  CPC .. *B64D 2033/0286* (2013.01); *F05D 2200/00* (2013.01)

(56) References Cited

U.S. PATENT DOCUMENTS

2017/0369179 A1* 12/2017 Bradbrook ................ F02C 6/02
2019/0016471 A1* 1/2019 Lieser ...................... F02K 3/06

* cited by examiner

AERO ENGINE FLOW RATE

CROSS-REFERENCE TO RELATED APPLICATION(S)

This application is a continuation of U.S. application Ser. No. 16/741,005 filed on Jan. 13, 2020, which is a continuation of U.S. application Ser. No. 16/398,909 filed Apr. 30, 2019, which is based on and claims priority under 35 U.S.C. 119 from British Patent Application No. 1820930.4 filed on Dec. 21, 2018. The contents of the above applications are incorporated herein by reference.

DESCRIPTION

The present disclosure relates to a gas turbine engine for an aircraft, and more specifically to a gas turbine engine with specified relative component dimensions.

The skilled person would appreciate that simply scaling up components of a known engine type may not provide a corresponding scaling of power/thrust and/or efficiency, and may introduce problems such as increased drag or difficulty of installation. Reconsideration of engine parameters may therefore be appropriate.

For example, the skilled person would appreciate that, if the overall size of a gas turbine engine is increased, one problem that may need to be addressed is how to reduce the overall drag produced by a correspondingly larger nacelle of the larger engine when it is in use. If the components of the engine are scaled proportionally—simply scaling up a known engine type—the increased drag may negatively affect the performance of the aircraft on which the engine is mounted. Additionally or alternatively, the engine may not fit to be mounted beneath the wing of the aircraft unless dimensions are adjusted.

As used herein, a range "from value X to value Y" or "between value X and value Y", or the likes, denotes an inclusive range; including the bounding values of X and Y. As used herein, the term "axial plane" denotes a plane extending along the length of an engine, parallel to and containing an axial centreline of the engine, and the term "radial plane" denotes a plane extending perpendicular to the axial centreline of the engine, so including all radial lines at the axial position of the radial plane. Axial planes may also be referred to as longitudinal planes, as they extend along the length of the engine. A radial distance or an axial distance is therefore a distance in a radial or axial plane, respectively.

According to one aspect there is provided a gas turbine engine for an aircraft, the engine comprising an engine core having a core length and comprising a turbine, a compressor, and a core shaft connecting the turbine to the compressor, the turbine comprising a lowest pressure rotor stage, the turbine having a turbine diameter at the lowest pressure rotor stage; and a fan located upstream of the engine core, the fan comprising a plurality of fan blades extending from a hub, the hub and fan blades together defining a fan face having a fan face area and a fan tip radius. An engine area ratio of:

$$\frac{\text{the fan face area}}{\text{the turbine diameter (at the lowest pressure rotor stage)} \times \text{the core length}}$$

is in the range from 1.7 to 3.

The present aspect relates to a gas turbine engine with specified relative fan face and engine sizes. The skilled person will appreciate that a larger fan may provide improved propulsive efficiency. The skilled person will appreciate that a relatively small turbine diameter, compared to the fan size, may improve ease of installation. The skilled person will appreciate that a relatively short core length, and/or a relatively narrow core diameter, compared to the fan size, may benefit close coupled installation.

The skilled person will appreciate that turbine diameter× core length may provide an effective engine area in an axial plane, and that reducing this area may benefit close-coupled installation. In particular, the fan may be mounted closer to the wing when the engine area is smaller (mounted further back and further up than otherwise), so reducing the moment applied to the wing by the mass of the engine.

The skilled person will appreciate that equivalent units should be selected for the fan face area, turbine diameter and core length—e.g. if the area is given in $m^2$, the lengths should both be provided in metres.

The engine area ratio may be higher than that of known aircraft gas turbine engines.

The engine area ratio may be in the range from 1.7 to 3.0, and optionally from 1.70 to 3.00. The engine area ratio may be in the range from 1.8 to 3, or 1.9 to 3 (or optionally to 3.0).

The engine area ratio may be in the range from 2 to 3. The engine area ratio may be in the range from 2.1 to 2.7.

The fan tip radius may be measured between a centreline of the engine and an outermost tip of each fan blade at its leading edge—this may equivalently be described as the fan tip radius being defined as the radial distance between a centreline of the engine and an outermost tip of each fan blade at its leading edge. The fan face area may be equal to $\pi$ multiplied by the square of the fan tip radius.

The fan tip radius, measured between a centreline of the engine and an outermost tip of each fan blade at its leading edge, may be in the range from 95 cm to 200 cm, for example in the range from 110 cm to 150 cm, or alternatively in the range from 155 cm to 200 cm. The fan tip radius may be greater than any of: 110 cm, 115 cm, 120 cm, 125 cm, 130 cm, 135 cm, 140 cm, 145 cm, 150 cm, 155 cm, 160 cm, 165 cm, 170 cm, 175 cm, 180 cm, 185 cm, 190 cm or 195 cm. The fan tip radius may be around 110 cm, 115 cm, 120 cm, 125 cm, 130 cm, 135 cm, 140 cm, 145 cm, 150 cm, 155 cm, 160 cm, 165 cm, 170 cm, 175 cm, 180 cm, 185 cm, 190 cm or 195 cm. The fan tip radius may be greater than 160 cm.

The fan tip radius may be in the range from 95 cm to 150 cm, optionally in the range from 110 cm to 150 cm, optionally in the range of from 110 cm to 145 cm, and further optionally in the range from 120 cm to 140 cm.

The fan tip radius may be in the range from 155 cm to 200 cm, optionally in the range from 160 cm to 200 cm, and further optionally in the range from 165 cm to 190 cm.

Optionally, for example for an engine with a fan tip radius in the range from 110 cm to 150 cm, the engine area ratio may be in the range from 1.7 to 3, optionally 1.7 to 2.7, optionally from 2.1 to 2.7, and further optionally from 2.2 to 3.

Optionally, for example for an engine with a fan tip radius in the range from 155 cm to 200 cm, the engine area ratio may be in the range from 2 to 3, optionally 2.2 to 3, optionally 2.3 to 2.6, and optionally from 2.5 to 2.6.

The turbine diameter at the lowest pressure rotor stage may be measured at the axial location of blade tip trailing edges of rotor blades of the lowest pressure rotor stage. In embodiments in which the rotor (of the lowest pressure rotor stage) is shrouded, the turbine diameter of the turbine at the lowest pressure rotor stage may be measured to the underside of the shroud. In embodiments in which the rotor (of the lowest pressure rotor stage) is unshrouded, the turbine diameter of the turbine at the lowest pressure rotor stage may be measured to the blade tips of the rotor. The lowest pressure rotor stage may be the most axially rearward (or most downstream) rotor stage.

The turbine diameter at the lowest pressure rotor stage may be in the range from 70 cm to 170 cm. Optionally, for example for an engine with a fan tip radius in the range from 110 cm to 140 cm, the turbine diameter at the lowest pressure rotor stage may be in the range from 70 cm to 120 cm, for example 80 cm to 115 cm. Optionally, for example for an engine with a fan tip radius in the range from 155 cm to 200 cm, the turbine diameter at the lowest pressure rotor stage may be in the range from 120 cm to 170 cm, for example 130 cm to 160 cm.

The ratio of the fan tip radius to the turbine diameter at the lowest pressure rotor stage $$\left(\frac{\text{fan tip radius}}{\text{turbine diameter}}\right)$$

may be in the range of 0.8 to 2.1. Optionally, for example for an engine with a fan tip radius in the range from 95 cm to 150 cm, the ratio of the fan tip radius to the turbine diameter may be in the range 0.8 to 2.1. Optionally, for example for an engine with a fan tip radius in the range from 155 cm to 200 cm, the ratio of the fan tip radius to the turbine diameter may be in the range of 0.9 to 1.7.

The core length may be defined as the axial distance between a forward region of the compressor and a rearward region of the turbine. The core length may be measured along a centreline of the engine from a mean radius point of the first stage of the compressor blade leading edge to a mean radius point of the lowest pressure turbine rotor stage blade trailing edge of the turbine. The core length may be in the range from 150 cm to 350 cm, and optionally 160 cm to 320 cm. Optionally, for example for an engine with a fan tip radius in the range from 95 cm to 150 cm, the core length may be in the range from 160 cm to 260 cm, for example 200 cm to 250 cm. Optionally, for example for an engine with a fan tip radius in the range from 155 cm to 200 cm, the core length may be in the range from 240 cm to 320 cm, for example 260 cm to 300 cm.

The ratio of the fan tip radius to the core length $$\left(\frac{\text{fan tip radius}}{\text{core length}}\right)$$

may be in the range of 0.3 to 1, and optionally of 0.4 to 0.9, optionally 0.5 to 0.8. Optionally, for example for an engine with a fan tip radius in the range from 95 cm to 150 cm, the ratio of the fan tip radius to the core length may be in the range from 0.4 to 0.9, optionally 0.5 to 0.8, or 0.55 to 0.75. Optionally, for example for an engine with a fan tip radius in the range from 155 cm to 200 cm, the ratio of the fan tip radius to the core length may be in the range from 0.5 to 0.8, optionally 0.60 to 0.80.

The gas turbine engine may further comprise a gearbox. The gearbox may be connected between the core shaft and the fan. The gearbox may be arranged to receive an input from the core shaft, and to provide an output to drive the fan at a lower rotational speed than the core shaft. The gearbox may help to facilitate the ratios (for example the engine area ratio) described and/or claimed herein.

The fan may comprise a plurality of fan blades extending radially from a hub, each fan blade having a leading edge and a trailing edge. The lowest pressure turbine stage may comprise a row of rotor blades, each of the rotor blades extending radially and having a leading edge and a trailing edge. The gas turbine engine may have a fan tip axis that joins a radially outer tip of the leading edge of one of the plurality of fan blades and the radially outer tip of the trailing edge of one of the rotor blades of the lowest pressure stage of the turbine. The fan tip axis may lie in longitudinal plane which contains a centreline of the gas turbine engine. A fan tip axis angle may be defined as the angle between the fan tip axis and the centreline, and the fan axis angle is in a range between 10 to 20 degrees, optionally 11 to 18 degrees, 12 to 17 degrees, or 12 to 16 degrees. The fan tip axis angle may be as described below.

The engine core may comprise more than one turbine. The turbine may be a first turbine, the compressor may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

According to another aspect, there is provided a gas turbine engine for an aircraft comprising an engine core comprising a turbine, a compressor, a core shaft connecting the turbine to the compressor, and a core exhaust nozzle having a core exhaust nozzle exit, the core exhaust nozzle having a core exhaust nozzle pressure ratio calculated using total pressure at the core nozzle exit; a fan located upstream of the engine core, the fan comprising a plurality of fan blades; and a nacelle surrounding the fan and the engine core and defining a bypass duct located radially outside of the engine core, the bypass duct comprising a bypass exhaust nozzle having a bypass exhaust nozzle exit, the bypass exhaust nozzle having a bypass exhaust nozzle pressure ratio calculated using total pressure at the bypass nozzle exit. A bypass to core ratio of:

$$\frac{\text{bypass exhaust nozzle pressure ratio}}{\text{core exhaust nozzle pressure ratio}}$$

is configured to be in the range from 1.1 to 2 under aircraft cruise conditions.

The present aspect relates to a gas turbine engine with specified relative core and bypass exhaust nozzle pressure ratios. The skilled person will appreciate that a nozzle pressure ratio (NPR) is defined as:

$$\frac{\text{total pressure at nozzle exit}}{\text{ambient pressure of surroundings}}$$

The skilled person will appreciate that, as is standard in the field, "total pressure" at a nozzle exit is defined as the sum of the static and dynamic pressures at the nozzle exit. Given that the ambient pressure of the surroundings is equal for the core exhaust nozzle and the bypass exhaust nozzle, the bypass to core ratio therefore may be simplified as follows:

$$\frac{NPR_{bypass\ exhaust\ nozzle}}{NPR_{core\ exhaust\ nozzle}} = \frac{\frac{\text{total pressure at bypass nozzle exit}}{\text{ambient pressure}}}{\frac{\text{total pressure at core nozzle exit}}{\text{ambient pressure}}}$$

$$= \frac{\text{total pressure at bypass nozzle exit}}{\text{total pressure at core nozzle exit}}$$

The ratio of $$\frac{\text{total pressure at bypass nozzle exit}}{\text{total pressure at core nozzle exit}}$$

may also be referred to as the extraction ratio. The ambient pressure (or pressure of the surroundings) may also be referred to as exit static pressure.

The skilled person will appreciate that the specified relationship between NPRs may improve engine efficiency as compared to known turbine engines, for example by improving fuel-burn. The skilled person will appreciate that the specified relationship between NPRs may allow dimension limitations for the engine core and/or the fan to be inferred—the specified relationship therefore is not limited in its application to when the aircraft is at cruise conditions; rather, whether or not an engine falls within the scope of the claims may be inferred from those dimensions when the aircraft/engine is not in use.

The bypass to core ratio may be higher than that of known aircraft gas turbine engines.

The bypass to core ratio may be in the range from 1.1 to 2.0 under aircraft cruise conditions. The bypass to core ratio may be in the range from 1.10 to 2.00 under aircraft cruise conditions. The bypass to core ratio may be above 1.15 under aircraft cruise conditions. The bypass to core ratio may be in the range from 1.2 to 1.5 under aircraft cruise conditions. The bypass to core ratio may be in the range from 1.1 to 1.6 under aircraft cruise conditions. Optionally, for example for an engine with a fan tip radius in the range from 110 cm to 150 cm, the bypass to core ratio may be in the range from 1.0 to 1.4; for example from 1.1 to 1.4 or from 1.0 to 1.3. Optionally, for example for an engine with a fan tip radius in the range from 155 cm to 200 cm, the bypass to core ratio may be in the range from 1.3 to 1.6.

Optionally, for example for an engine with a fan tip radius in the range from 110 cm to 150 cm, $NPR_{bypass\ exhaust\ nozzle}$ may be in the range from 2.0 to 2.3. Optionally, for example for an engine with a fan tip radius in the range from 155 cm to 200 cm, $NPR_{bypass\ exhaust\ nozzle}$ may be in the range from 2.1 to 2.3.

Optionally, for example for an engine with a fan tip radius in the range from 110 cm to 150 cm, $NPR_{core\ exhaust\ nozzle}$ may be in the range from 1.7 to 1.9. Optionally, for example for an engine with a fan tip radius in the range from 155 cm to 200 cm, $NPR_{core\ exhaust\ nozzle}$ may be in the range from 1.4 to 1.6.

The bypass ratio is defined as the ratio of the mass flow rate of the flow through the bypass duct to the mass flow rate of the flow through the core at cruise conditions. The bypass ratio may be greater than (or on the order of) any of the following: 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, or 20. The bypass ratio may be in an inclusive range bounded by any two of the values in the previous sentence (i.e. the values may form upper or lower bounds). The bypass ratio may be in the range from 11 to 20, and optionally in the range from 13 to 20 or 14 to 20. The bypass ratio may be in the range of 8 to 9.5, for example for some direct drive engines (engines without a gearbox). The bypass ratio may be in the range of 9 to 16, for example for some geared engines (engines with a gearbox). Optionally, for example for an engine with a fan tip radius in the range from 110 cm to 150 cm (which may be geared), the bypass ratio may be in the range from 9 to 15, and optionally from 13 to 15. Optionally, for example for an engine with a fan tip radius in the range from 155 cm to 200 cm (which may be geared), the bypass to core ratio may be in the range from 13 to 18, optionally 13 to 16.

Cruise conditions may be as defined elsewhere herein.

The total pressure at the bypass nozzle exit may be determined at an exit plane of the bypass exhaust nozzle. The exit plane may extend from a rearmost point of the nacelle towards a centreline of the engine. The exit plane may be a radial plane.

The engine core may comprise a casing (also referred to as an inner fixed structure). The total pressure at the core nozzle exit may be determined at an exit plane of the core exhaust nozzle. The exit plane may extend from a rearmost point of the engine core casing towards a centreline of the engine. The exit plane may be a radial plane. The outer diameter of the bypass exhaust nozzle at the bypass exhaust nozzle exit may be in the range of 200 cm to 400 cm, and optionally 200 cm to 380 cm. Optionally, for example for an engine with a fan tip radius in the range from 95 cm to 150 cm (for example 110 cm to 150 cm), the outer diameter of the bypass exhaust nozzle may be in the range from 200 cm to 290 cm. Optionally, for example for an engine with a fan tip radius in the range from 155 cm to 200 cm, the outer diameter of the bypass exhaust nozzle may be in the range from 290 cm to 380 cm.

The inner diameter of the bypass exhaust nozzle may be measured at the axial position of the rearmost tip of the nacelle. The inner diameter of the bypass exhaust nozzle may be the radial distance between the outer surfaces of the engine core at the axial position of the rearmost tip of the nacelle. The inner diameter of the bypass exhaust nozzle may be in the range from 100 cm to 250 cm, and optionally from 130 cm to 220 cm. Optionally, for example for an engine with a fan tip radius in the range from 95 cm to 150 cm (for example 110 cm to 150 cm), the inner diameter of the bypass exhaust nozzle may be in the range from 130 cm to 180 cm. Optionally, for example for an engine with a fan tip radius in the range from 155 cm to 200 cm, the inner diameter of the bypass exhaust nozzle may be in the range from 160 cm to 220 cm.

The flow area of the core exhaust nozzle at the core exhaust nozzle exit may be from 0.4 m$^2$ (600 square inches) to 1.3 m$^2$ (2000 square inches). Optionally, for example for an engine with a fan tip radius in the range from 95 cm to 150 cm (for example 110 cm to 150 cm), the flow area of the core exhaust nozzle at the core exhaust nozzle exit may be in the range from 0.4 m$^2$ (600 square inches) to 0.6 m$^2$ (900 square inches). Optionally, for example for an engine with a fan tip radius in the range from 155 cm to 200 cm, the flow area of the core exhaust nozzle at the core exhaust nozzle exit may be in the range from 0.6 m$^2$ (900 square inches) to 1.3 m$^2$ (2000 square inches).

The flow area of the bypass exhaust nozzle at the bypass duct exhaust nozzle exit may be from 1.9 m$^2$ (3000 square inches) to 5.8 m$^2$ (9000 square inches). Optionally, for example for an engine with a fan tip radius in the range from 95 cm to 150 cm (for example 110 cm to 150 cm), the flow area of the bypass duct exhaust nozzle at the bypass duct nozzle exit may be in the range from 1.9 m² (3000 square inches) to 4.5 m² (7000 square inches). Optionally, for example for an engine with a fan tip radius in the range from 155 cm to 200 cm, the flow area of the bypass duct exhaust nozzle at the bypass duct exhaust nozzle exit may be in the range from 4.5 m² (7000 square inches) to 5.8 m² (9000 square inches).

A ratio of bypass exhaust nozzle flow area to the core exhaust nozzle flow area $$\left(\frac{\text{bypass exhaust nozzle flow area}}{\text{core exhaust nozzle flow area}}\right)$$

may be in the range from 4 to 6, and optionally in the range from 5 to 6. Optionally, a geared engine (with a gearbox) may have a ratio of bypass exhaust nozzle flow area to the core exhaust nozzle flow area in the range from 5 to 6.

The bypass exhaust nozzle and/or the core exhaust nozzle may be a convergent nozzle.

The gas turbine engine may further comprise a gearbox connected between the core and the fan. The gearbox may be arranged to receive an input from the core shaft and to provide an output to drive the fan at a lower rotational speed than the core shaft.

The fan tip radius, measured between a centreline of the engine and an outermost tip of each fan blade at its leading edge, may be in the range from 95 cm to 200 cm, for example in the range from 110 cm to 150 cm, or alternatively in the range from 155 cm to 200 cm. The fan tip radius may be greater than any of: 110 cm, 115 cm, 120 cm, 125 cm, 130 cm, 135 cm, 140 cm, 145 cm, 150 cm, 155 cm, 160 cm, 165 cm, 170 cm, 175 cm, 180 cm, 185 cm, 190 cm or 195 cm. The fan tip radius may be around 110 cm, 115 cm, 120 cm, 125 cm, 130 cm, 135 cm, 140 cm, 145 cm, 150 cm, 155 cm, 160 cm, 165 cm, 170 cm, 175 cm, 180 cm, 185 cm, 190 cm or 195 cm. The fan tip radius may be greater than 160 cm. The fan tip radius may be in the range from 95 cm to 150 cm, optionally in the range from 110 cm to 150 cm, optionally in the range of from 110 cm to 145 cm, and further optionally in the range from 120 cm to 140 cm. The fan tip radius may be in the range from 155 cm to 200 cm, optionally in the range from 160 cm to 200 cm, and further optionally in the range from 165 cm to 190 cm.

The engine core may comprise more than one turbine. The turbine may be a first turbine, the compressor may be a first compressor, and the core shaft may be a first core shaft. The engine core may comprise a second turbine, a second compressor, and a second core shaft connecting the second turbine to the second compressor. The second turbine, second compressor, and second core shaft may be arranged to rotate at a higher rotational speed than the first core shaft.

The gas turbine engine may be arranged to be mounted beneath a wing of an aircraft. A downstream blockage ratio may be defined as:

$$\frac{\text{the turbine diameter at an axial location of the turbine's lowest pressure rotor stage}}{\text{ground plane to wing distance}}$$

A quasi-non-dimensional mass flow rate, Q, may be defined as:

$$Q = W \frac{\sqrt{T0}}{P0 \cdot A_{flow}}$$

where:
W is mass flow rate through the fan in Kg/s;
T0 is average stagnation temperature of the air at the fan face in Kelvin;
P0 is average stagnation pressure of the air at the fan face in Pa; and
$A_{flow}$ is the flow area of the fan face in m².

A Q ratio of:
the downstream blockage ratio×quasi non dimensional mass flow rate Q may be in a range from 0.005 Kgs⁻¹N⁻¹K^{1/2}, 0.011 Kgs⁻¹N⁻¹K^{1/2}.

The Q ratio may be in a range from 0.005 Kgs⁻¹N⁻¹K^{1/2} to 0.010 Kgs⁻¹N⁻¹K^{1/2}, and optionally from 0.0050 Kgs⁻¹N⁻¹K^{1/2} to 0.0110 or to 0.0100 Kgs⁻¹N⁻¹K^{1/2}. The Q ratio may be in a range from 0.006 Kgs⁻¹N⁻¹K^{1/2} to 0.009 Kgs⁻¹N⁻¹K^{1/2}.

The downstream blockage ratio may be in a range from 0.2 to 0.3. The downstream blockage ratio may be in a range from 0.20 to 0.29. The downstream blockage ratio may be in a range from 0.22 to 0.28.

A specific thrust may be defined as net engine thrust divided by mass flow rate through the engine; and at engine cruise conditions, it may be that:
0.029 Kgs⁻¹N⁻¹K^{1/2}≤Q≤0.036 Kgs⁻¹N⁻¹K^{1/2}; and
70 Nkg⁻¹s≤specific thrust≤110 Nkg⁻¹s.

At cruise conditions, it may be that: 0.032 Kgs⁻¹N⁻¹K^{1/2}≤Q≤0.036 Kgs⁻¹N⁻¹K^{1/2}. At cruise conditions, it may be that: 0.033 Kgs⁻¹N⁻¹K^{1/2}≤Q≤0.035 Kgs⁻¹N⁻¹K^{1/2}.

According to another aspect, there is provided a method of operating an aircraft comprising a gas turbine engine comprising:
an engine core comprising a turbine, a compressor, a core shaft connecting the turbine to the compressor, and a core exhaust nozzle having a core exhaust nozzle exit, the core exhaust nozzle having a core exhaust nozzle pressure ratio calculated using total pressure at the core nozzle exit;
a fan located upstream of the engine core, the fan comprising a plurality of fan blades; and
a nacelle surrounding the fan and the engine core and defining a bypass duct located radially outside of the engine core, the bypass duct comprising a bypass exhaust nozzle having a bypass exhaust nozzle exit, the bypass exhaust nozzle having a bypass exhaust nozzle pressure ratio calculated using total pressure at the bypass nozzle exit.

The method comprises controlling the aircraft such that a bypass to core ratio of:

$$\frac{\text{bypass exhaust nozzle pressure ratio}}{\text{core exhaust nozzle pressure ratio}}$$

is in the range from 1.1 to 2 under aircraft cruise conditions.
The aircraft may be controlled such that a Q ratio of:
the downstream blockage ratio×quasi non dimensional mass flow rate Q, as defined for the preceding aspect, may be in a range from 0.005 Kgs⁻¹N⁻¹K^{1/2} to 0.011 Kgs⁻¹N⁻¹K^{1/2}.

The Q ratio may be in a range from 0.005 $Kgs^{-1}N^{-1}K^{1/2}$ to 0.010 $Kgs^{-1}N^{-1}K^{1/2}$, and optionally from 0.0050 $Kgs^{-1}N^{-1}K^{1/2}$ to 0.0100 $Kgs^{-1}N^{-1}K^{1/2}$. The Q ratio may be in a range from 0.006 $Kgs^{-1}N^{-1}K^{1/2}$ to 0.009 $Kgs^{-1}N^{-1}K^{1/2}$.

The gas turbine engine may be as described for the preceding aspect.

According to another aspect, there is provided a gas turbine engine for an aircraft comprising: an engine core comprising a turbine, a compressor, and a core shaft connecting the turbine to the compressor; a fan located upstream of the engine core, the fan comprising a plurality of fan blades extending from a hub; and a gearbox that receives an input from the core shaft and outputs drive to the fan so as to drive the fan at a lower rotational speed than the core shaft, wherein: the gas turbine engine has an engine length and a centre of gravity position measured relative to the fan, and wherein a centre of gravity position ratio of:

the centre of gravity position/the engine length is in a range from 0.43 to 0.6.

Defining the centre of gravity position ratio in this range may allow the centre of gravity to be located closer the front mounting position of the gas turbine engine. This may help to reduce or minimise mounting loads compared to centre of gravity position ratios found in known gas turbine engines or which would be achieved with a proportional scaling of engine architecture. Other effects such as reducing bending of the engine core and deflection of the shaft may also be provided by defining the centre of gravity position ratio as defined above. The centre of gravity position ratio may be higher than that of known aircraft gas turbine engines.

The centre of gravity position ratio may be in a range from 0.43 to 0.60, and optionally from 0.45 to 0.6 or 0.46 to 0.6 (or to 0.60). The centre of gravity position ratio may be in a range from 0.47 to 0.49, for example for an engine with a fan tip radius in the range from 110 cm to 150 cm. The centre of gravity position ratio may be in range from 0.45 to 0.48, for example for an engine with a fan tip radius in the range from 155 cm to 200 cm.

The engine length may be in the range from 200 cm to 500 cm, and optionally from 230 cm to 470 cm, optionally 300 cm to 450 cm. Optionally, for example for an engine with a fan tip radius in the range from 110 cm to 150 cm (for example 120 cm to 140 cm), the engine length may be in the range from 230 cm to 370 cm, optionally 300 to 360 cm. Optionally, for example for an engine with a fan tip radius in the range from 155 cm to 200 cm (for example 165 cm to 190 cm), the engine length may be in the range from 370 cm to 470 cm, optionally 390 cm to 450 cm.

The centre of gravity position may be in a range between 100 cm to 230 cm, optionally 140 cm to 220 cm. Optionally, for example for an engine with a fan tip radius in the range from 110 cm to 150 cm, the centre of gravity position may be in a range between 100 cm to 180 cm, optionally 140 cm to 180 cm. Optionally, for example for an engine with a fan tip radius in the range from 155 cm to 200 cm, the centre of gravity position may be in a range between 160 cm to 230 cm, optionally 180 cm to 220 cm.

The engine length may be measured as the axial distance between a forward region of the fan and a rearward region of the turbine.

The turbine may comprise a lowest pressure turbine stage having a row of rotor blades, and the engine length may be measured as the axial distance between: the intersection of the leading edge of one of the plurality of fan blades and the hub; and a mean radius point of the trailing edge of one of the rotor blades of the lowest pressure turbine stage of the turbine. The mean radius point may be the midpoint between a 0% span position and a 100% span position of the rotor blade.

The turbine may be a lowest pressure turbine of a plurality of turbines provided in the core.

The position of centre of gravity may be measured as the axial distance between the intersection of the leading edge of one of the plurality of fan blades and the hub; and the centre of gravity of the gas turbine engine.

According to an aspect, there is provided a fan speed to centre of gravity ratio of:

the centre of gravity position ratio×maximum take off rotational fan speed may be in a range from 600 rpm to 1350 rpm. This ratio may be lower than that of known aircraft gas turbine engines. By defining the fan speed to centre of gravity ratio in this range the centre of gravity may be moved forwards relative to that of a direct drive engine whilst also providing a relatively low fan rotational speed.

The fan speed to centre of gravity ratio may be in a range from 650 rpm to 1276 rpm. The fan speed to centre of gravity ratio may be in a range from 600 rpm to 1290 rpm. Optionally, for example for an engine with a fan tip radius in the range from 110 cm to 150 cm, the fan speed to centre of gravity ratio may be 925 rpm to 1325 rpm. Optionally, for example for an engine with a fan tip radius in the range from 155 cm to 200 cm, the fan speed to centre of gravity ratio may be 650 rpm to 910 rpm.

The maximum take-off rotational fan speed may be in a range between 1450 rpm to 3020 rpm. Optionally, for example for an engine with a fan tip radius in the range from 110 cm to 150 cm, the maximum take-off rotational fan speed may be in a range between 1970 rpm to 3020 rpm. Optionally, for example for an engine with a fan tip radius in the range from 155 cm to 200 cm, the maximum take-off rotational fan speed may be in a range between 1450 rpm to 1910 rpm.

According to another aspect, there is provided a method of operating an aircraft comprising a gas turbine engine comprising: an engine core comprising a turbine, a compressor, and a core shaft connecting the turbine to the compressor; a fan located upstream of the engine core, the fan comprising a plurality of fan blades extending from a hub; and a gearbox that receives an input from the core shaft and outputs drive to the fan so as to drive the fan at a lower rotational speed than the core shaft, wherein: the gas turbine engine has an engine length and a centre of gravity position measured relative to the fan, and wherein the method comprises controlling the aircraft such that a centre of gravity position ratio of:

the centre of gravity position/the engine length is in a range from 0.43 to 0.6, and a fan speed to centre of gravity ratio of:

the centre of gravity position ratio×maximum take off rotational fan speed is in a range from 600 rpm to 1350 rpm.

The fan speed to centre of gravity ratio may be in a range from 650 rpm to 1276 rpm. Optionally, for example for an engine with a fan tip radius in the range from 110 cm to 150 cm, the fan speed to centre of gravity ratio may be 925 rpm to 1325 rpm. Optionally, for example for an engine with a fan tip radius in the range from 155 cm to 200 cm, the fan speed to centre of gravity ratio may be 650 rpm to 910 rpm.

The maximum take-off rotational fan speed may be in a range between 1450 rpm to 3020 rpm. Optionally, for example for an engine with a fan tip radius in the range from 110 cm to 150 cm, the maximum take-off rotational fan speed may be in a range between 1970 rpm to 3020 rpm. Optionally, for example for an engine with a fan tip radius in the range from 155 cm to 200 cm, the maximum take-off rotational fan speed may be in a range between 1450 rpm to 1910 rpm.

According to another aspect, there is provided a gas turbine engine for an aircraft comprising: an engine core comprising a turbine, a compressor, and a core shaft connecting the turbine to the compressor; a fan located upstream of the engine core, the fan comprising a plurality of fan blades extending from a hub; and a gearbox that receives an input from the core shaft and outputs drive to the fan so as to drive the fan at a lower rotational speed than the core shaft, wherein: the gas turbine engine has an engine length and a gearbox location relative to a forward region of the fan, wherein a gearbox location ratio of:

gearbox location/engine length is in a range from 0.19 to 0.45.

Defining gearbox location ratio in this range may allow the gearbox to be located at or near a front mounting position of the gas turbine engine. As the gearbox is generally amongst the heaviest components within the engine its location may have a significant influence on the position of the centre of gravity. Moving the centre of gravity closer to the front mounting may help to minimise rear mounting loads. Other effects such as reducing bending of the engine core and deflection of the core connecting drive shaft may also be provided by controlling the engine centre of gravity by suitable positioning of the gearbox. The gearbox location ratio may be higher than that of known gas turbine engines.

The gearbox location ratio may be in a range from 0.19 to 0.3. The gearbox location ratio may be in a range from 0.19 to 0.23. The gearbox location ratio may be in a range from 0.19 to 0.23, for example 0.19 to 0.21, for example for an engine with a fan tip radius in the range from 110 cm to 150 cm. The gearbox location ratio may be in a range from 0.20 to 0.25, for example equal to or around 0.23—for example, being in the range from 0.225 to 0.235—for example, for an engine with a fan tip radius in the range from 155 cm to 200 cm.

The engine length may be in the range from 200 cm to 500 cm, and optionally from 230 cm to 470 cm, optionally 300 cm to 450 cm. Optionally, for example for an engine with a fan tip radius in the range from 110 cm to 150 cm (for example 120 cm to 140 cm), the engine length may be in the range from 230 cm to 370 cm, optionally 300 to 360 cm. Optionally, for example for an engine with a fan tip radius in the range from 155 cm to 200 cm (for example 165 cm to 190 cm), the engine length may be in the range from 370 cm to 470 cm, optionally 390 cm to 450 cm.

The gearbox location may be in a range between 50 cm to 110 cm. Optionally, for example for an engine with a fan tip radius in the range from 110 cm to 150 cm, the gearbox location may be in a range between 50 cm to 80 cm, optionally 55 cm to 75 cm. Optionally, for an engine with a fan tip radius in the range from 155 cm to 200 cm, the gearbox location may be in a range between 80 cm to 110 cm, optionally 85 cm to 105 cm.

The engine length may be measured as the axial distance between a forward region of the fan and a rearward region of the turbine.

The turbine may comprise a lowest pressure turbine stage having a row of rotor blades, and the engine length is measured as the axial distance between: the intersection of the leading edge of one of the plurality of fan blades and the hub; and a mean radius point of the trailing edge of one of the rotor blades of the lowest pressure turbine stage of the turbine. The mean radius point may be the midpoint between a 0% span position and a 100% span position of the rotor blade.

The turbine may be a lowest pressure turbine of a plurality of turbines provided in the core.

The gearbox location may be measured between: the intersection of a leading edge of one of the fan blades and the hub; and a radial centre plane of the gearbox, the radial centre plane being at the midpoint between the front face of a most forward gear mesh of the gearbox and the rear face of a most rearward gear mesh of the gearbox.

The gearbox may be an epicyclic gearbox comprising a ring gear; in such embodiments, the gearbox location may be measured as the axial distance between: the intersection of a leading edge of one of the fan blades and the hub; and a radial plane intersecting the axial centre point of the ring gear.

The fan blades may be formed at least partly from a composite material, and the gearbox location for such embodiments may be in a range between 50 cm and 110 cm and optionally in a range between 80 cm and 110 cm.

The fan blades may be formed at least partly from a metal or metal alloy, such as an aluminium-lithium alloy, and wherein the gearbox location may be in a range between 50 cm and 110 cm and optionally in a range between 50 cm and 80 cm.

The fan blades may be formed at least partly from a composite material and the gearbox location ratio may be in the range of from 0.02 to 0.25, for example equal to or around 0.23; for example, being in the range from 0.225 to 0.235. This may be, for example, for an engine with a fan tip radius in the range from 155 cm to 200 cm.

The fan blades may be formed at least partly from a metal or metal alloy, such as an aluminium-lithium alloy, and the gearbox location ratio may be in a range from 0.19 to 0.25, for example 0.19 to 0.23. This may be, for example, for an engine with any fan tip radius.

According to another aspect, there is provided a gas turbine engine for an aircraft comprising: an engine core comprising a turbine, a compressor, and a core shaft connecting the turbine to the compressor; a fan located upstream of the engine core, the fan comprising a plurality of fan blades extending from a hub, the fan blades being formed from a metal or metal alloy (optionally an aluminium-lithium alloy); and a gearbox that receives an input from the core shaft and outputs drive to the fan so as to drive the fan at a lower rotational speed than the core shaft, wherein: the gas turbine engine has an engine length and a gearbox location relative to a forward region of the fan, wherein a gearbox location ratio of:

gearbox location/engine length wherein the gearbox location ratio may be in a range from 0.19 to 0.3, optionally 0.19 to 0.25.

This may be, for example, for an engine with a fan tip radius in the range from 110 cm to 150 cm.

According to another aspect, there is provided a gas turbine engine for an aircraft comprising: an engine core comprising a turbine, a compressor, and a core shaft connecting the turbine to the compressor; a fan located upstream of the engine core, the fan comprising a plurality of fan blades extending from a hub, the fan blades being formed from at least partly from a composite material; and a gearbox that receives an input from the core shaft and outputs drive to the fan so as to drive the fan at a lower rotational speed than the core shaft, wherein: the gas turbine engine has an engine length and a gearbox location relative to a forward region of the fan, wherein a gearbox location ratio of:

gearbox location/engine length
wherein the gearbox location ratio may be in the range of from 0.20 to 0.25, for example equal to or around 0.23; for example, being in the range from 0.225 to 0.235.

This may be, for example, for an engine with a fan tip radius in the range from 155 cm to 200 cm.

The gas turbine engine of these aspects may further have a centre of gravity position ratio as defined in any of the statements of the previous two aspects.

According to another aspect there is provided a gas turbine engine for an aircraft comprising an engine core comprising a turbine, a compressor, and a core shaft connecting the turbine to the compressor; a fan located upstream of the engine core, the fan comprising a plurality of fan blades, wherein a fan tip radius of the fan is measured/defined between a centreline of the engine and an outermost tip of each fan blade at its leading edge; and a nacelle surrounding the fan and the engine core and defining a bypass exhaust nozzle, the bypass exhaust nozzle having an outer radius. An outer bypass to fan ratio of:

$$\frac{\text{the outer radius of the bypass exhaust nozzle}}{\text{the fan tip radius}}$$

is in the range from 0.6 to 1.05.

The present aspect relates to a gas turbine engine comprising a fan and nacelle with specified relative shapes and/or sizes. The skilled person would appreciate that having a relatively narrow bypass exhaust nozzle, as compared to fan size, may reduce drag produced by the engine in use. Further, the skilled person would appreciate that the relatively narrow bypass exhaust nozzle may create a more compact exhaust system, which may allow or facilitate under-wing installation of a larger engine on an aircraft. The outer bypass to fan ratio may be lower than that of known aircraft gas turbine engines.

The outer bypass to fan ratio may be in the range from 0.60 to 1.05. The outer bypass to fan ratio may be in the range from 0.65 to 1.00. The outer bypass to fan ratio may be lower than 1.05, optionally lower than 1.02, and further optionally lower than 1.00. The outer bypass to fan ratio may be in the range from 0.80 to 1.00. The outer bypass to fan ratio may be in the range from 0.9 to 1.0, and optionally in the range from 0.90 to 1.00.

The fan tip radius may be in the range from 95 cm to 200 cm, for example in the range from 110 cm to 150 cm, or alternatively in the range from 155 cm to 200 cm. Optionally, for example for an engine with a fan tip radius in the range from 110 cm to 150 cm, the outer bypass to fan ratio may be in the range from 0.95 to 1.00, for example equal to or around 0.97, for example being in the range from 0.96 to 0.98. Optionally, for example for an engine with a fan tip radius in the range from 155 cm to 200 cm, outer bypass to fan ratio may be in the range from 0.91 to 0.98, for example equal to or around 0.95, for example being in the range from 0.94 to 0.96.

The bypass exhaust nozzle may have an exit plane, which may be a radial plane. The outer radius of the bypass exhaust nozzle may be measured at the axial position of the exit plane of the bypass exhaust nozzle.

The outer radius of the bypass exhaust nozzle may be measured at the axial position of the rearmost tip of the nacelle. The outer radius of the bypass exhaust nozzle may be the radial distance between the centreline of the engine and an inner surface of the nacelle at the axial position of the rearmost tip of the nacelle.

The outer radius of the bypass exhaust nozzle may be in the range of 100 cm to 200 cm, and optionally 100 cm to 190 cm. The outer radius of the bypass exhaust nozzle may be defined as half the diameter of the bypass exhaust nozzle as described above. Optionally, for example for an engine with a fan tip radius in the range from 110 cm to 150 cm, the outer radius of the bypass exhaust nozzle may be in the range from 100 cm to 145 cm, for example 110 cm to 140 cm. Optionally, for example for an engine with a fan tip radius in the range from 155 cm to 200 cm, the outer radius of the bypass exhaust nozzle may be in the range from 145 cm to 190 cm.

The bypass exhaust nozzle may have an inner radius. An inner bypass to fan ratio of:

$$\frac{\text{the inner radius of the bypass exhaust nozzle}}{\text{the fan tip radius}}$$

may be in the range from 0.4 to 0.65.

The inner bypass to fan ratio may be lower than that for known aircraft gas turbine engines. The inner bypass to fan ratio may be in the range from 0.5 to 0.6, and optionally in the range from 0.50 to 0.60. The inner bypass to fan ratio may be in the range from 0.40 to 0.65. The inner bypass to fan ratio may be lower than 0.65, and optionally lower than 0.64, and optionally lower than 0.62. The inner bypass to fan ratio may be in the range from 0.54 to 0.64. Optionally, for example for an engine with a fan tip radius in the range from 110 cm to 150 cm, the inner bypass to fan ratio may be in the range of from 0.57 to 0.63, for example 0.57 to 0.62, for example around 0.59, for example being in the range from 0.58 to 0.60. Optionally, for example for an engine with a fan tip radius in the range from 155 cm to 200 cm, the inner bypass to fan ratio may be in the range from 0.5 to 0.6, and optionally from 0.52 to 0.58.

The bypass exhaust nozzle may have an exit plane, which may be a radial plane. The inner radius of the bypass exhaust nozzle may be measured at the axial position of the exit plane of the bypass exhaust nozzle. The inner and outer radii may therefore be measured in the same radial plane. The inner and outer radii of the bypass exhaust nozzle may therefore be measured at the exit of the bypass exhaust nozzle.

The inner radius of the bypass exhaust nozzle may be measured at the axial position of the rearmost tip of the nacelle. The inner radius of the bypass exhaust nozzle may be the radial distance between the centreline of the engine and an outer surface of the engine core at the axial position of the rearmost tip of the nacelle. The inner radius of the bypass exhaust nozzle is half the inner diameter of the bypass exhaust nozzle. The inner radius of the bypass exhaust nozzle may be in the range from 50 cm to 125 cm, and optionally from 65 cm to 110 cm, optionally from 75 cm to 110 cm. Optionally, for example for an engine with a fan tip radius in the range from 110 cm to 150 cm, the inner radius of the bypass exhaust nozzle may be in the range from 70 cm to 90 cm. Optionally, for example for an engine with a fan tip radius in the range from 155 cm to 200 cm, the inner radius of the bypass exhaust nozzle may be in the range from 80 cm to 120 cm, for example 90 cm to 120 cm.

The nacelle may define a bypass duct located radially outside of the engine core. The bypass exhaust nozzle may be an exit of the bypass duct, for example forming a rearmost portion of the bypass exhaust duct. The nacelle may comprise an inner surface at least partly defining the bypass duct.

The engine may further comprise a bypass duct outlet guide vane extending radially across the bypass duct between an outer surface of the engine core and the inner surface of the nacelle. The bypass duct outlet guide vane may extend between a radially inner tip and a radially outer tip and may have a leading edge and a trailing edge relative to the direction of gas flow through the bypass duct. An outer wall axis may be defined joining the radially outer tip of the trailing edge of the bypass duct outlet guide vane and the rearmost tip of the inner surface of the nacelle. The outer wall axis may lie in a longitudinal plane containing the centreline of the gas turbine engine. An outer bypass duct wall angle may be defined as the angle between the outer wall axis and the centreline.

The outer bypass duct wall angle may be in a range between −15 degrees and 1 degrees. The outer bypass duct wall angle may be in a range between −10 degrees and 0 degrees, for example −5 degrees and 0 degrees. The outer bypass duct wall angle may be in a range between −4 degrees and −1 degrees. The outer bypass duct wall angle may be in the range of −0.5 degrees to −4 degrees; this may be for an engine with a fan tip radius in the range from 110 cm to 150 cm. The outer bypass duct wall angle may be in a range between −1 degrees and −5 degrees, for example −2.5 degrees to −4 degrees; this may be for an engine with a fan tip radius in the range from 155 cm to 200 cm.

A negative value of the outer bypass duct wall angle may correspond to the outer wall axis sloping towards the centreline of the gas turbine engine.

The gas turbine engine may comprise a gearbox that receives an input from the core shaft and outputs drive to the fan so as to drive the fan at a lower rotational speed than the core shaft. The gearbox may have a gear ratio in the ranges defined elsewhere herein, for example 3.2 to 5 or 3.2 to 3.8.

The gas turbine engine may comprise more than one turbine. The turbine may be a first turbine, the compressor may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

According to another aspect there is provided a gas turbine engine for an aircraft comprising an engine core comprising a turbine, a compressor, and a core shaft connecting the turbine to the compressor; a fan located upstream of the engine core, the fan comprising a plurality of fan blades, wherein a fan tip radius of the fan is measured between a centreline of the engine and an outermost tip of each fan blade at its leading edge; and a nacelle surrounding the fan and the engine core and defining a bypass exhaust nozzle, the bypass exhaust nozzle having an inner radius. An inner bypass to fan ratio of:

$$\frac{\text{the inner radius of the bypass exhaust nozzle}}{\text{the fan tip radius}}$$

is in the range from 0.4 to 0.65.

The present aspect relates to a gas turbine engine comprising a fan and engine core with specified relative shapes and/or sizes. The skilled person would appreciate that having a relatively narrow bypass exhaust nozzle, as compared to fan size, may reduce drag produced by the engine in use. The skilled person would appreciate that the engine core is situated radially within the bypass exhaust nozzle, and that the inner radius of the bypass exhaust nozzle may therefore equivalently be thought of as an outer radius of the engine core. The skilled person would appreciate that having a relatively narrow engine core, as compared to fan size, may reduce drag produced by the engine in use. The inner bypass to fan ratio may be lower than that for known aircraft gas turbine engines.

The inner bypass to fan ratio may be in the range from 0.40 to 0.65. The inner bypass to fan ratio may be lower than 0.65 and optionally lower than 0.64. The inner bypass to fan ratio may be in the range from 0.54 to 0.64. Optionally, for example for an engine with a fan tip radius in the range from 110 cm to 150 cm, the inner bypass to fan ratio may be in the range of from 0.57 to 0.63, for example 0.57 to 0.62, for example around 0.59, for example being in the range from 0.58 to 0.60. Optionally, for example for an engine with a fan tip radius in the range from 155 cm to 200 cm, the inner bypass to fan ratio may be in the range from 0.5 to 0.6, and optionally from 0.52 to 0.58, optionally 0.53 to 0.55.

The bypass exhaust nozzle may have an exit plane, which may be a radial plane. The inner radius of the bypass exhaust nozzle may be measured at the axial position of the exit plane of the bypass exhaust nozzle.

The inner radius of the bypass exhaust nozzle may be measured at the axial position of the rearmost tip of the nacelle. The inner radius of the bypass exhaust nozzle may be the radial distance between the centreline of the engine and an outer surface of the engine core at the axial position of the rearmost tip of the nacelle.

The inner radius of the bypass exhaust nozzle may be in the range from 50 cm to 125 cm, and optionally from 65 cm to 110 cm, optionally from 75 cm to 110 cm. Optionally, for example for an engine with a fan tip radius in the range from 110 cm to 150 cm, the inner radius of the bypass exhaust nozzle may be in the range from 70 cm to 90 cm. Optionally, for example for an engine with a fan tip radius in the range from 155 cm to 200 cm, the inner radius of the bypass exhaust nozzle may be in the range from 80 cm to 120 cm, for example 90 cm to 120 cm.

The bypass exhaust nozzle may have an outer radius, and an outer bypass to fan ratio of:

$$\frac{\text{the outer radius of the bypass exhaust nozzle}}{\text{the fan tip radius}}$$

may be in the range from 0.6 to 1.05. The outer bypass to fan ratio may be lower than that for known aircraft gas turbine engines.

The outer bypass to fan ratio may be in the range from 0.9 to 1.0, and optionally from 0.90 to 1.00. The outer bypass to fan ratio may be lower than 1.05, optionally lower than 1.02, and further optionally lower than 1.00. The outer bypass to fan ratio may be in the range from 0.8 to 1.00, and optionally in the range from 0.90 to 1.00. Optionally, for example for an engine with a fan tip radius in the range from 110 cm to 150 cm, the outer bypass to fan ratio may be in the range from 0.95 to 1.00, for example equal to or around 0.97, for example being in the range from 0.96 to 0.98. Optionally, for example for an engine with a fan tip radius in the range from 155 cm to 200 cm, outer bypass to fan ratio may be in the range from 0.91 to 0.98, for example equal to or around 0.95, for example being in the range from 0.94 to 0.96.

The bypass exhaust nozzle may have an exit plane, which may be radial. The outer radius of the bypass exhaust nozzle may be measured at the axial position of the exit plane of the bypass exhaust nozzle. The outer radius of the bypass exhaust nozzle may be measured at the axial position of the rearmost tip of the nacelle. The outer radius of the bypass exhaust nozzle may be the radial distance between the centreline of the engine and an inner surface of the nacelle at the axial position of the rearmost tip of the nacelle.

The outer radius of the bypass exhaust nozzle may be in the range of 100 cm to 200 cm, and optionally 100 cm to 190 cm. The outer radius of the bypass exhaust nozzle may be defined as half the diameter of the bypass exhaust nozzle as described above. Optionally, for example for an engine with a fan tip radius in the range from 95 cm to 150 cm, the outer radius of the bypass exhaust nozzle may be in the range from 100 cm to 145 cm. Optionally, for example for an engine with a fan tip radius in the range from 155 cm to 200 cm, the outer radius of the bypass exhaust nozzle may be in the range from 145 cm to 190 cm.

The nacelle may define a bypass duct located radially outside of the engine core. The nacelle may comprise an inner surface at least partly defining the bypass duct.

The bypass exhaust nozzle may be an exit of the bypass duct, for example forming a rearmost portion of the bypass exhaust duct.

The engine may further comprise a bypass duct outlet guide vane extending radially across the bypass duct between an outer surface of the engine core and the inner surface of the nacelle. The bypass duct outlet guide vane may extend between a radially inner tip and a radially outer tip and may have a leading edge and a trailing edge relative to the direction of gas flow through the bypass duct. An outer wall axis may be defined joining the radially outer tip of the trailing edge of the bypass duct outlet guide vane and the rearmost tip of the inner surface of the nacelle. The outer wall axis may lie in a longitudinal plane containing the centreline of the gas turbine engine. An outer bypass duct wall angle may be defined as the angle between the outer wall axis and the centreline.

The outer bypass duct wall angle may be in a range between −15 to 1 degrees. The outer bypass duct wall angle may be in a range between −10 degrees and 0 degrees, for example −5 degrees and 0 degrees. The outer bypass duct wall angle may be in a range between −4 degrees and −1 degrees. The outer bypass duct wall angle may be in the range of −0.5 degrees to −4 degrees; this may be for an engine with a fan tip radius in the range from 110 cm to 150 cm. The outer bypass duct wall angle may be in a range between −1 degrees and −5 degrees, for example −2.5 degrees to −4.0 degrees; this may be for an engine with a fan tip radius in the range from 155 cm to 200 cm.

A negative value of the outer bypass duct wall angle may correspond to the outer wall axis sloping towards the centreline of the gas turbine engine.

The gas turbine engine may further comprise a gearbox that receives an input from the core shaft and outputs drive to the fan so as to drive the fan at a lower rotational speed than the core shaft. The gearbox may have a gear ratio in the ranges defined elsewhere herein, for example 3.2 to 5 or 3.2 to 3.8.

The gas turbine engine may comprise more than one turbine. The turbine may be a first turbine, the compressor may be a first compressor, and the core shaft may be a first core shaft. The engine core may further comprise a second turbine, a second compressor, and a second core shaft connecting the second turbine to the second compressor. The second turbine, second compressor, and second core shaft are arranged to rotate at a higher rotational speed than the first core shaft.

According to another aspect, there is provided a gas turbine engine for an aircraft comprising: an engine core comprising a turbine, a compressor, and a core shaft connecting the turbine to the compressor; a fan located upstream of the engine core, the fan comprising a plurality of fan blades; a nacelle surrounding the gas turbine engine, the nacelle comprising an inner surface at least partly defining a bypass duct located radially outside of the engine core; and a bypass duct outlet guide vane (OGV) extending radially across the bypass duct between an outer surface of the engine core and the inner surface of the nacelle, wherein the bypass duct outlet guide vane extends between a radially inner tip and a radially outer tip and has a leading edge and a trailing edge relative to the direction of gas flow through the bypass duct, an outer wall axis is defined joining the radially outer tip of the trailing edge of the bypass duct outlet guide vane and the rearmost tip of the inner surface of the nacelle, wherein the outer wall axis lies in a longitudinal plane containing the centreline of the gas turbine engine, an outer bypass duct wall angle is defined as the angle between the outer wall axis and the centreline, and the outer bypass duct wall angle is in a range between −15 to 1 degrees.

By providing the bypass duct wall angle in this range a more compact exhaust system may be provided. By using the angle range above the length of the nacelle between the bypass OGV and the rearmost inner tip of the nacelle inner wall may be reduced. This may provide a shorter length of nacelle which may provide a reduction in drag compared to known gas turbine engines, or which would be achieved if the nacelle dimensions were scaled proportionately when increasing the size of the gas turbine engine. The bypass duct wall angle may be lower (i.e. more negative) than that of known gas turbine engines.

The outer bypass duct wall angle may be in a range between −10 degrees and 0 degrees, for example −5 degrees and 0 degrees. The outer bypass duct wall angle may be in a range between −4 degrees and −1 degrees. The outer bypass duct wall angle may be in the range of −0.5 degrees to −4 degrees; this may be for an engine with a fan tip radius in the range from 110 cm to 150 cm. The outer bypass duct wall angle may be in a range between −1 degrees and −5 degrees, for example −2.5 degrees to −4 degrees; this may be for an engine with a fan tip radius in the range from 155 cm to 200 cm.

A negative value of the outer bypass duct wall angle may correspond to the outer wall axis sloping towards the centreline of the gas turbine engine.

A bypass duct outlet guide vane radius, measured radially between the engine centreline and the radially outer tip of the trailing edge of the bypass OGV, may be in a range from 90 cm to 210 cm. Optionally, for example for an engine with a fan tip radius in the range from 110 cm to 150 cm, the bypass duct outlet guide vane radius may be in the range from 90 cm to 150 cm, optionally 110 cm to 135 cm. Optionally, for example for an engine with a fan tip radius in the range from 155 cm to 200 cm, the bypass duct outlet guide vane radius may be in the range from 160 cm to 210 cm, optionally 170 cm to 200 cm.

The gas turbine engine may further comprise a gearbox that receives an input from the core shaft and outputs drive to the fan so as to drive the fan at a lower rotational speed than the core shaft. The gearbox may have a gear ratio in the ranges defined elsewhere herein, for example 3.2 to 5 or 3.2 to 3.8.

The rearmost inner tip of the nacelle inner wall may be movable in use of the gas turbine engine to provide a variable area bypass duct exhaust nozzle (also referred to as a fan nozzle). The outer wall axis may be defined based on the position of the rearmost tip of the inner surface of the nacelle during cruise conditions. Cruise conditions may be as defined in connection with any other aspect.

The gas turbine engine of this aspect may further have an outer bypass to fan ratio and/or inner bypass to fan ratio as defined in the previous relevant aspects of any of the above statements.

A fan tip radius of the fan may be measured between a centreline of the engine and an outermost tip of each fan blade at its leading edge; and the nacelle may surround the fan and the engine core and define a bypass exhaust nozzle, the bypass exhaust nozzle having an outer radius.

An outer bypass to fan ratio of:

$$\frac{\text{the outer radius of the bypass exhaust nozzle}}{\text{the fan tip radius}}$$

may be in the range from 0.6 to 1.05. The outer bypass to fan ratio may be in the range from 0.60 to 1.05. The outer bypass to fan ratio may be in the range from 0.65 to 1.00. The outer bypass to fan ratio may be lower than 1.05, optionally lower than 1.02, and further optionally lower than 1.00. The outer bypass to fan ratio may be in the range from 0.80 to 1.00. The outer bypass to fan ratio may be in the range from 0.9 to 1.0, and optionally in the range from 0.90 to 1.00. Optionally, for example for an engine with a fan tip radius in the range from 110 cm to 150 cm, the outer bypass to fan ratio may be in the range 0.95 to 1.00, optionally equal to or around 0.97, for example being in the range from 0.96 to 0.98. Optionally, for example for an engine with a fan tip radius in the range from 155 cm to 200 cm, outer bypass to fan ratio may be in the range 0.91 to 0.98, optionally equal to or around 0.95, for example being in the range from 0.94 to 0.96. The outer bypass to fan ratio may be lower than that for known aircraft gas turbine engines.

The bypass exhaust nozzle may have an exit plane, which may be a radial plane. The outer radius of the bypass exhaust nozzle may be measured at the axial position of the exit plane of the bypass exhaust nozzle. The outer radius of the bypass exhaust nozzle may be measured at the axial position of the rearmost tip of the nacelle.

The outer radius of the bypass exhaust nozzle may be the radial distance between the centreline of the engine and an inner surface of the nacelle at the axial position of the rearmost tip of the nacelle. The outer radius of the bypass exhaust nozzle may be in the range of 100 cm to 200 cm, and optionally 100 cm to 190 cm. The outer radius of the bypass exhaust nozzle may be defined as half the diameter of the bypass exhaust nozzle as described above. Optionally, for example for an engine with a fan tip radius in the range from 95 cm to 150 cm, the outer radius of the bypass exhaust nozzle may be in the range from 100 cm to 145 cm. Optionally, for example for an engine with a fan tip radius in the range from 155 cm to 200 cm, the outer radius of the bypass exhaust nozzle may be in the range from 145 cm to 190 cm.

The bypass exhaust nozzle may have an inner radius. An inner bypass to fan ratio of:

$$\frac{\text{the inner radius of the bypass exhaust nozzle}}{\text{the fan tip radius}}$$

may be in the range from 0.4 to 0.65. The inner bypass to fan ratio may be lower than that for known aircraft gas turbine engines. The inner bypass to fan ratio may be in the range from 0.5 to 0.6, and optionally in the range from 0.50 to 0.60. The inner bypass to fan ratio may be in the range from 0.40 to 0.65. The inner bypass to fan ratio may be lower than 0.65, and optionally lower than 0.64, and optionally lower than 0.62. The inner bypass to fan ratio may be in the range from 0.54 to 0.64. Optionally, for example for an engine with a fan tip radius in the range from 110 cm to 150 cm, the inner bypass to fan ratio may be in the range of from 0.57 to 0.63, for example 0.57 to 0.62, for example around 0.59, for example being in the range from 0.58 to 0.60. Optionally, for example for an engine with a fan tip radius in the range from 155 cm to 200 cm, the inner bypass to fan ratio may be in the range from 0.5 to 0.6, and optionally from 0.52 to 0.58, optionally 0.53 to 0.55.

The bypass exhaust nozzle may have an exit plane, which may be a radial plane. The inner radius of the bypass exhaust nozzle may be measured at the axial position of the exit plane of the bypass exhaust nozzle. The inner and outer radii may therefore be measured in the same radial plane. The inner and outer radii of the bypass exhaust nozzle may therefore be measured at the exit of the bypass exhaust nozzle.

The inner radius of the bypass exhaust nozzle may be measured at the axial position of the rearmost tip of the nacelle. The inner radius of the bypass exhaust nozzle may be the radial distance between the centreline of the engine and an outer surface of the engine core at the axial position of the rearmost tip of the nacelle. The inner radius of the bypass exhaust nozzle may be in the range from 50 cm to 125 cm, and optionally from 65 cm to 110 cm, optionally from 75 cm to 110 cm. Optionally, for example for an engine with a fan tip radius in the range from 110 cm to 150 cm, the inner radius of the bypass exhaust nozzle may be in the range from 70 cm to 90 cm. Optionally, for example for an engine with a fan tip radius in the range from 155 cm to 200 cm, the inner radius of the bypass exhaust nozzle may be in the range from 80 cm to 120 cm, for example 90 cm to 120 cm.

According to another aspect, there is provided a gas turbine engine for an aircraft comprising: an engine core comprising a turbine, a compressor, and a core shaft connecting the turbine to the compressor; a fan located upstream of the engine core, the fan comprising a plurality of fan blades extending radially from a hub, each fan blade having a leading edge and a trailing edge; and wherein: the turbine comprises a lowest pressure turbine stage having a row of rotor blades, each of the rotor blades extending radially and having a leading edge and a trailing edge; the gas turbine engine has a fan tip axis that joins: a radially outer tip of the leading edge of one of the plurality of fan blades; and the radially outer tip of the trailing edge of one of the rotor blades of the lowest pressure stage of the turbine, the fan tip axis lying in a longitudinal plane which contains a centreline of the gas turbine engine, and a fan tip axis angle is defined as the angle between the fan tip axis and the centreline, and the fan tip axis angle is in a range between 10 to 20 degrees.

By providing a fan tip axis angle (also referred to as a fan axis angle) in this range the gas turbine engine may have a large fan diameter to provide improved propulsive efficiency, whilst also having a relatively small diameter core. The may help to aid installation of the engine beneath the wing of an aircraft. A relatively smaller diameter core may allow the engine to be mounted relatively further aft on the aircraft, and so may allow the centre of gravity of the engine to be moved closer to the wing structure. The range of the fan tip axis angle defined above may allow improved engine mounting compared to known gas turbine engines, or where engine components are scaled proportionally with increasing fan diameter. The fan axis angle may be higher than that of known gas turbine engines.

The fan axis angle may be in a range of 12 degrees and 17 degrees, for example 13 degrees to 16 degrees.

The fan tip radius, measured as the radial distance from the engine centreline to the radially outer tip of the leading edge of one of the plurality of fan blades, may be in a range from 95 cm to 200 cm, and optionally may be from 110 cm to 150 cm or from 155 cm to 200 cm.

The fan axis angle may be in a range between 13 and 15 degrees—this may be for an engine with a fan tip radius in the range from 110 cm to 150 cm. The fan axis angle may be in a range between 13.5 degrees and 15.5 degrees—this may be for an engine with a fan tip radius in the range from 155 cm to 200 cm.

The turbine radius at the lowest pressure rotor stage, measured/defined as the radial distance from the engine centreline to the radially outer tip of the trailing edge of one of the rotor blades of the lowest pressure stage of the turbine, may be in the range from 45 cm to 85 cm. Optionally, for example for an engine with a fan tip radius in a range from 110 cm to 150 cm, the turbine radius at the lowest pressure rotor stage may be in the range from 50 cm to 60 cm. Optionally, for example for an engine with a fan tip radius in a range from 155 cm to 200 cm, the turbine radius at the lowest pressure rotor stage may be in the range from range from 60 cm to 85 cm.

The gas turbine engine may further comprise a gearbox that receives an input from the core shaft and outputs drive to the fan so as to drive the fan at a lower rotational speed than the core shaft.

The gas turbine engine may comprise more than one turbine. The turbine may be a first turbine, the compressor may be a first compressor, and the core shaft may be a first core shaft. The engine core may further comprise a second turbine, a second compressor, and a second core shaft connecting the second turbine to the second compressor. The second turbine, second compressor, and second core shaft are arranged to rotate at a higher rotational speed than the first core shaft.

According to another aspect, there is provided a gas turbine engine for an aircraft comprising: an engine core comprising a turbine, a compressor, and a core shaft connecting the turbine to the compressor; and a fan located upstream of the engine core, the fan comprising a plurality of fan blades extending radially from a hub, each fan blade having a leading edge and a trailing edge; and a gearbox (30) that receives an input from the core shaft (26) and outputs drive to the fan (23) so as to drive the fan (23) at a lower rotational speed than the core shaft (26); and wherein: the turbine comprises a lowest pressure turbine stage having a row of rotor blades, each of the rotor blades extending radially and having a leading edge and a trailing edge; a fan-turbine radius difference is measured as the radial distance between: a point on a circle swept by a radially outer tip of the trailing edge of each of the rotor blades of the lowest pressure stage of the turbine; and a point on a circle swept by a radially outer tip of the leading edge of each of fan blades, and a fan speed to fan-turbine radius ratio defined as:

$$\frac{\text{the maximum take-off rotational speed of the fan (in rpm)}}{\text{fan-turbine radius difference (in mm)}}$$

is in a range of 0.8 rpm/mm to 5 rpm/mm.

By configuring the geometry of the gas turbine engine so that the fan-turbine radius difference is within the range above the loading on the pylon which connects the gas turbine engine to the wing of an aircraft may be reduced. By defining the fan speed to fan-turbine radius difference ratio in this way a reduction in fan rotational speed may reduce the restraining torque required for the pylon to restrain the gas turbine engine for relative rotation. Moreover, defining the ratio in this range may also provide a smaller relative core diameter, allowing the gas turbine engine to be mounted closer to the wing. This may also reduce the restraining torque on the pylon. The fan speed to fan-turbine radius may be lower than that of known gas turbine engines.

The fan speed to fan-turbine radius ratio may be in a range between 1.5 rpm/mm to 4.0 rpm/mm. The fan speed to fan-turbine radius ratio may be in a range between 1.5 rpm/mm to 3.6 rpm/mm. The fan speed to fan-turbine radius ratio may be in a range between 2.9 rpm/mm and 3.8 rpm/mm, for example 3.4 rpm/mm and 3.6 rpm/mm—this may be for an engine with a fan tip radius in the range from 110 cm to 150 cm. The fan speed to fan-turbine radius ratio may be in a range between 1.2 rpm/mm and 2 rpm/mm, for example 1.5 rpm/mm and 1.7 rpm/mm—this may be for an engine with a fan tip radius in the range from 155 cm to 200 cm.

The fan-turbine radius difference may be in a range between 55 cm (i.e. 550 mm) to 120 cm (i.e. 1200 mm). Optionally, for example for an engine with a fan tip radius in the range from 110 cm to 150 cm, the fan-turbine radius difference may be in a range between 55 cm (i.e. 550 mm) to 90 cm (i.e. 900 mm), for example 65 cm to 85 cm. Optionally, for example for an engine with a fan tip radius in the range from 155 cm to 200 cm, the fan-turbine radius difference may be in a range between 90 cm (i.e. 900 mm) to 120 cm (i.e. 1200 mm), for example 95 cm to 115 cm.

The maximum take-off rotational fan speed may be in a range between 1450 rpm to 3020 rpm. Optionally, for example for an engine with a fan tip radius in the range from 110 cm to 150 cm, the maximum take-off rotational fan speed may be in a range between 2100 rpm to 3000 rpm, optionally 2300 rpm to 2900 rpm. Optionally, for example for an engine with a fan tip radius in the range from 155 cm to 200 cm, the maximum take-off rotational fan speed may be in a range between 1450 rpm to 1910 rpm, optionally 1500 rpm to 1800 rpm.

In embodiments in which the rotor (of the lowest pressure rotor stage) is shrouded, the radially outer tip of the trailing edge of each of the rotor blades may be defined at the underside of the shroud. In embodiments in which the rotor (of the lowest pressure rotor stage) is unshrouded, the radially outer tip of the trailing edge of each of the rotor blades may be the blade tip of the rotor blade.

The turbine may be the lowest pressure turbine of a plurality of turbines provided in the core. The turbine stage may be the axially most rearward turbine stage and/or the most downstream turbine stage.

The gearbox may have a gear ratio in the range of from 3.2 to 5, for example 3.2 to 4.2, for example 3.2 to 3.8.

The gas turbine engine of this aspect may further have a fan axis angle as defined in the previous relevant aspect or any of the above statements.

In another aspect, the present application provides a method of operating an aircraft comprising a gas turbine engine comprising: an engine core comprising a turbine, a compressor, and a core shaft connecting the turbine to the compressor; and a fan located upstream of the engine core, the fan comprising a plurality of fan blades extending radially from a hub, each fan blade having a leading edge and a trailing edge; and wherein: the turbine comprises a lowest pressure turbine stage having a row of rotor blades, each of the rotor blades extending radially and having a leading edge and a trailing edge; a fan-turbine radius difference is measured as the radial distance between: a point on a circle swept by a radially outer tip of the trailing edge of each of the rotor blades of the lowest pressure stage of the turbine; and a point on a circle swept by a radially outer tip of the leading edge of each of fan blades, wherein the method comprises controlling the aircraft such that a fan speed to fan-turbine radius ratio is defined as:

$$\frac{\text{the maximum take-off rotational speed of the fan}}{\text{fan-turbine radius difference}}$$

is in a range between 0.8 rpm/mm to 5 rpm/mm.

The gas turbine engine of this aspect may further have a fan axis angle as defined in the previous relevant aspect or any of the above statements According to another aspect there is provided a gas turbine engine for an aircraft, and arranged to be mounted beneath a wing of the aircraft, the engine comprising:

an engine core comprising a turbine, a compressor, and a core shaft connecting the turbine to the compressor, the turbine comprising a lowest pressure rotor stage, the turbine having a turbine diameter;

a fan located upstream of the engine core, the fan comprising a plurality of fan blades extending from a hub; and a gearbox that receives an input from the core shaft and outputs drive to the fan so as to drive the fan at a lower rotational speed than the core shaft. A downstream blockage ratio of:

$$\frac{\text{the turbine diameter at an axial location of the lowest pressure rotor stage}}{\text{ground plane to wing distance}}$$

is in the range from 0.2 to 0.3.

The present aspect relates to a gas turbine arranged to provide a specified downstream blockage when mounted on the wing of an aircraft, the downstream blockage providing a measure of how much of the vertical space beneath a wing of an aircraft is taken up by the gas turbine engine. The skilled person would appreciate that having a relatively low turbine diameter towards the rearward end of the engine, as compared to distance from the aircraft wing on which the engine is to be mounted to the ground plane, may allow more space for a pylon structure arranged to mount the engine to the wing. A lower downstream blockage may therefore be preferable. In general, aircraft engines are mounted under aircraft wings, by means of a pylon (also referred to as an airframe strut) connected between a rearward portion of the engine and an underside of the wing. The turbine diameter at the axial position of the lowest pressure rotor may be used as a measure of engine size towards the rear of the engine.

The skilled person would appreciate that the ground plane is the plane on which the aircraft would land—i.e. the plane of the ground when the aircraft has landed/before take-off/whilst taxiing. The distance between the ground plane and the wing may therefore be measured between the ground (e.g. a runway) and the wing whilst the aircraft is parked. The skilled person would appreciate that the ground plane is generally the plane in which the lowest part of each landing gear is located whilst the aircraft is on the ground. The skilled person would appreciate that the distance between the ground plane and the wing may be measured to the leading edge centre line of the aircraft wing.

The downstream blockage ratio may be lower than that of known aircraft gas turbine engines. The downstream blockage ratio may be in the range from 0.20 to 0.30. The downstream blockage ratio may be in the range from 0.20 to 0.29. The downstream blockage ratio may be in the range from 0.20 to 0.28, and optionally from 0.22 to 0.28. Optionally, for example for an engine with a fan tip radius in the range from 110 cm to 150 cm, the downstream blockage ratio may be in the range from 0.23 to 0.27. Optionally, for example for an engine with a fan tip radius in the range from 155 cm to 200 cm, downstream blockage ratio may be in the range from 0.24 to 0.28.

The distance between the ground plane and the wing may be measured to centre point of a leading edge of the wing. The distance between the ground plane and the wing may be measured along a line perpendicular to the ground plane and passing through and perpendicular to an axial centre line of the engine.

The turbine diameter at the axial location of the lowest pressure rotor stage may be measured adjacent blade tips of rotor blades of the lowest pressure rotor stage. The turbine diameter at the axial location of the lowest pressure rotor stage may be in the range from 70 cm to 170 cm. Optionally, for example for an engine with a fan tip radius in the range from 110 cm to 150 cm, the turbine diameter at the lowest pressure rotor stage may be in the range from 100 cm to 130 cm, optionally 110 cm to 120 cm. Optionally, for example for an engine with a fan tip radius in the range from 155 cm to 200 cm, the turbine diameter at the lowest pressure rotor stage may be in the range from 120 cm to 170 cm.

The hub and fan blades of the fan together define a fan face having a fan diameter, and the engine has an engine length. An engine ratio may be defined as:

$$\frac{(2 \times \text{the fan radius/the engine length})}{\text{the downstream blockage ratio}}$$

The engine ratio may be in the range from 2.5 to 4. The engine ratio may be in the range from 2.5 to 4.0. The engine ratio may be greater than 2.5. The engine ratio may be greater than 3.0. The engine ratio may be in the range of from 2.7 to 3.7, for example 2.8 to 3.5.

The engine length may be measured as the axial distance between a forward region of the fan and a rearward region of the turbine. The engine length may be measured along a centreline of the engine from an axial position of an intersection of the leading edge of each fan blade and the hub of the fan to an axial position of a trailing edge mean radius point of one of the rotor blades provided in the lowest pressure stage of the turbine.

The engine length may be in the range from 200 cm to 500 cm, and optionally from 230 cm to 470 cm, optionally 300 cm to 450 cm. Optionally, for example for an engine with a fan tip radius in the range from 110 cm to 150 cm (for example 120 cm to 140 cm), the engine length may be in the range from 230 cm to 370 cm, optionally 300 to 360 cm. Optionally, for example for an engine with a fan tip radius in the range from 155 cm to 200 cm (for example 165 cm to 190 cm), the engine length may be in the range from 370 cm to 470 cm, optionally 390 cm to 450 cm.

The fan radius (also referred to as a fan tip radius) may be measured between an engine centreline and a tip of a fan blade at its leading edge and the fan diameter may be twice the radius of the fan. The diameter of the fan, equal to twice the radius of the fan may be greater than (or on the order of) any of: 220 cm, 230 cm, 240 cm, 250 cm, 260 cm, 270 cm, 280 cm, 290 cm, 300 cm, 310 cm, 320 cm, 330 cm, 340 cm, 350 cm, 360 cm, 370 cm, 380 cm or 390 cm. In some embodiments, the fan diameter may be in the range from 220 cm to 300 cm. In some embodiments, the fan diameter may be in the range from 310 cm to 400 cm.

The turbine diameter at the lowest pressure rotor stage may be measured at the axial location of blade tip trailing edges of rotor blades of the lowest pressure rotor stage. In embodiments in which the rotor (of the lowest pressure rotor stage) is shrouded, the turbine diameter of the turbine at the lowest pressure rotor stage may be measured to the underside of the shroud (as this defines the edge of the gas flow path). In embodiments in which the rotor (of the lowest pressure rotor stage) is unshrouded, the turbine diameter of the turbine at the lowest pressure rotor stage may be measured to the blade tips of the rotor.

The gas turbine engine may comprise more than one turbine. The turbine may be a first turbine, the compressor may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

A quasi-non-dimensional mass flow rate, Q, may be defined as:

$$Q = W\frac{\sqrt{T0}}{P0 \cdot A_{flow}}$$

where:
W is mass flow rate through the fan in Kg/s;
T0 is average stagnation temperature of the air at the fan face in Kelvin;
P0 is average stagnation pressure of the air at the fan face in Pa; and
$A_{flow}$ is the flow area of the fan face in m².
A Q ratio of:
the downstream blockage ratio×quasi non dimensional mass flow rate Q may be in a range from 0.005 Kgs$^{-1}$N$^{-1}$K$^{1/2}$ to 0.011 Kgs$^{-1}$N$^{-1}$K$^{1/2}$.
The Q ratio may be in a range from 0.0050 Kgs$^{-1}$N$^{-1}$K$^{1/2}$ to 0.0110 Kgs$^{-1}$N$^{-1}$K$^{1/2}$, or optionally from 0.005 Kgs$^{-1}$N$^{-1}$K$^{1/2}$ to 0.010 Kgs$^{-1}$N$^{-1}$K$^{1/2}$. The Q ratio may be in a range from 0.006 Kgs$^{-1}$N$^{-1}$K$^{1/2}$ to 0.009 Kgs$^{-1}$N$^{-1}$K$^{1/2}$.

A specific thrust may be defined as net engine thrust divided by mass flow rate through the engine; and at engine cruise conditions, it may be that:

0.029 Kgs$^{-1}$N$^{-1}$K$^{1/2}$≤Q≤0.036 Kgs$^{-1}$N$^{-1}$K$^{1/2}$; and

70 Nkg$^{-1}$s≤specific thrust≤110 Nkg$^{-1}$s.

At cruise conditions, it may be that: 0.032 Kgs$^{-1}$N$^{-1}$K$^{1/2}$≤Q≤0.036 Kgs$^{-1}$N$^{-1}$K$^{1/2}$. At cruise conditions, it may be that: 0.033 Kgs$^{-1}$N$^{-1}$K$^{1/2}$≤Q≤0.035 Kgs$^{-1}$N$^{-1}$K$^{1/2}$.

According to another aspect, there is provided an aircraft comprising a wing and a gas turbine engine mounted beneath the wing of the aircraft. The engine comprises:

an engine comprising a turbine, a compressor, and a core shaft connecting the turbine to the compressor, the turbine comprising a plurality of rotor stages including a lowest pressure rotor located furthest downstream, the turbine having a turbine diameter;

a fan located upstream of the engine core, the fan comprising a plurality of fan blades; and a gearbox that receives an input from the core shaft and outputs drive to the fan so as to drive the fan at a lower rotational speed than the core shaft. A downstream blockage ratio of:

$$\frac{\text{the turbine diameter at an axial location of the lowest pressure rotor}}{\text{ground plane to wing distance}}$$

is in the range from 0.2 to 0.3.

The engine may be as described for the preceding aspect.

According to another aspect, there is provided a gas turbine engine for an aircraft and arranged to be mounted beneath a wing of the aircraft. The engine has an engine length and comprises:

an engine core comprising a turbine, a compressor, and a core shaft connecting the turbine to the compressor, the turbine comprising a lowest pressure rotor stage, the turbine having a turbine diameter;

a fan located upstream of the engine core, the fan comprising a plurality of fan blades extending from a hub, the hub and fan blades of the fan together defining a fan face having a fan tip radius; and a gearbox that receives an input from the core shaft and outputs drive to the fan so as to drive the fan at a lower rotational speed than the core shaft. A downstream blockage ratio is defined as:

$$\frac{\text{the turbine diameter at an axial location of the lowest pressure rotor}}{\text{ground plane to wing distance}}$$

An engine blockage ratio of:

$$\frac{(2 \times \text{the fan radius/the engine length})}{\text{the downstream blockage ratio}}$$

is in the range from 2.5 to 4.

The engine blockage ratio may equivalently be represented as:

$$\frac{2 \times \text{the fan tip radius} \times \text{ground plane to wing distance}}{\text{engine length} \times \text{turbine diameter at an axial location of the lowest pressure rotor}}$$

The skilled person would appreciate that a larger fan diameter (and therefore a larger fan tip radius) may improve propulsive efficiency, but that simply mounting a larger fan on a known gas turbine engine may cause other difficulties or inefficiencies. Having a shorter engine length may allow an engine with a larger fan to be installed closer to a wing of the aircraft, i.e. further rearwards; this may reduce the moment exerted on the wing by the (potentially larger and heavier) engine. Similarly, reducing the turbine diameter may allow an engine with a larger fan to be installed higher up (maintaining intake ground clearance) whilst maintaining adequate vertical depth for a pylon structure arranged to connect the engine to the wing. The engine blockage ratio may be higher than that of known aircraft gas turbine engines.

The engine blockage ratio may be in the range from 2.5 to 4.0, optionally 2.7 to 3.7. The engine blockage ratio may be greater than 2.5. The engine blockage ratio may be greater than 3.0.

The downstream blockage ratio may be as described in the preceding aspect. The downstream blockage ratio may be in the range from 0.2 to 0.3. The downstream blockage ratio may be in the range from 0.20 to 0.30. The downstream blockage ratio may be in the range from 0.20 to 0.29. The downstream blockage ratio may be in the range from 0.22 to 0.28.

The distance between the ground plane and the wing may be measured to centre point of a leading edge of the wing. The distance between the ground plane and the wing may be measured along a line perpendicular to the ground plane and passing through and perpendicular to an axial centre line of the engine.

The turbine diameter at the axial location of the lowest pressure rotor stage may be measured adjacent blade tips of rotor blades of the lowest pressure rotor stage. The turbine diameter at the axial location of the lowest pressure rotor stage may be in the range from 70 cm to 170 cm. Optionally, for example for an engine with a fan tip radius in the range from 110 cm to 150 cm, the turbine diameter at the lowest pressure rotor stage may be in the range from 100 cm to 130 cm, optionally 110 cm to 120 cm. Optionally, for example for an engine with a fan tip radius in the range from 155 cm to 200 cm, the turbine diameter at the lowest pressure rotor stage may be in the range from 120 cm to 170 cm.

The engine length may be measured as the axial distance between a forward region of the fan and a rearward region of the turbine. The engine length may be measured along a centreline of the engine from an axial position of an intersection of the leading edge of each fan blade and the hub of the fan to an axial position of a trailing edge mean radius point of one of the rotor blades provided in the lowest pressure stage of the turbine.

The engine length may be in the range from 200 cm to 500 cm, and optionally from 230 cm to 470 cm, optionally 300 cm to 450 cm. Optionally, for example for an engine with a fan tip radius in the range from 110 cm to 150 cm (for example 120 cm to 140 cm), the engine length may be in the range from 230 cm to 370 cm, optionally 300 to 360 cm. Optionally, for example for an engine with a fan tip radius in the range from 155 cm to 200 cm (for example 165 cm to 190 cm), the engine length may be in the range from 370 cm to 470 cm, optionally 390 cm to 450 cm.

The fan tip radius may be measured between an engine centreline and a tip of a fan blade at its leading edge. A fan diameter equal to twice the fan tip radius may be greater than (or on the order of) any of: 220 cm, 230 cm, 240 cm, 250 cm, 260 cm, 270 cm, 280 cm, 290 cm, 300 cm, 310 cm, 320 cm, 330 cm, 340 cm, 350 cm, 360 cm, 370 cm, 380 cm or 390 cm.

The turbine may be a first turbine, the compressor may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

A quasi-non-dimensional mass flow rate, Q, may be defined as:

$$Q = W \frac{\sqrt{T0}}{P0 \cdot A_{flow}}$$

where:
W is mass flow rate through the fan in Kg/s;
T0 is average stagnation temperature of the air at the fan face in Kelvin;
P0 is average stagnation pressure of the air at the fan face in Pa; and
$A_{flow}$ is the flow area of the fan face in m².
A Q ratio of:
the downstream blockage ratio×quasi non dimensional mass flow rate Q may be in a range from 0.005 $Kgs^{-1}N^{-1}K^{1/2}$ to 0.011 $Kgs^{-1}N^{-1}K^{1/2}$.

The Q ratio may be in a range from 0.005 $Kgs^{-1}N^{-1}K^{1/2}$ to 0.010 $Kgs^{-1}N^{-1}K^{1/2}$, from 0.0050 $Kgs^{-1}N^{-1}K^{1/2}$ to 0.0110 $Kgs^{-1}N^{-1}K^{1/2}$, or optionally from 0.0050 $Kgs^{-1}N^{-1}K^{1/2}$ to 0.0100 $Kgs^{-1}N^{-1}K^{1/2}$. The Q ratio may be in a range from 0.006 $Kgs^{-1}N^{-1}K^{1/2}$ to 0.009 $Kgs^{-1}N^{-1}K^{1/2}$.

A specific thrust may be defined as net engine thrust divided by mass flow rate through the engine; and at engine cruise conditions, it may be that:
0.029 $Kgs^{-1}N^{-1}K^{1/2} \leq Q \leq 0.036$ $Kgs^{-1}N^{-1}K^{1/2}$; and
70 $Nkg^{-1}s \leq$ specific thrust $\leq 110$ $Nkg^{-1}s$.

At cruise conditions, it may be that: 0.032 $Kgs^{-1}N^{-1}K^{1/2} \leq Q \leq 0.036$ $Kgs^{-1}N^{-1}K^{1/2}$. At cruise conditions, it may be that: 0.033 $Kgs^{-1}N^{-1}K^{1/2} \leq Q \leq 0.035$ $Kgs^{-1}N^{-1}K^{1/2}$.

According to another aspect, there is provided an aircraft comprising a wing and a gas turbine engine mounted beneath the wing of the aircraft. The engine has an engine length and comprises:
an engine core comprising a turbine, a compressor, and a core shaft connecting the turbine to the compressor, the turbine comprising a lowest pressure rotor stage, the turbine having a turbine diameter;
a fan located upstream of the engine core, the fan comprising a plurality of fan blades extending from a hub, the hub and fan blades of the fan together defining a fan face having a fan tip radius; and
a gearbox that receives an input from the core shaft and outputs drive to the fan so as to drive the fan at a lower rotational speed than the core shaft. A downstream blockage ratio is defined as:

$$\frac{\text{the turbine diameter at an axial location of the lowest pressure rotor}}{\text{ground plane to wing distance}}$$

An engine blockage ratio of:

$$\frac{(2 \times \text{the fan tip radius/the engine length})}{\text{the downstream blockage ratio}}$$

is in the range from 2.5 to 4.

The downstream blockage ratio may be in the range from 0.2 to 0.3. The engine may be as described for the preceding aspect.

In another aspect, there is provided a gas turbine engine for an aircraft and arranged to be mounted beneath a wing of the aircraft, the gas turbine engine comprising:
an engine core comprising a turbine, a compressor, and a core shaft connecting the turbine to the compressor, the turbine comprising a lowest pressure rotor stage, the turbine having a turbine diameter;
a fan located upstream of the engine core, the fan comprising a plurality of fan blades extending from a hub, an annular fan face being defined at a leading edge of the fan; and wherein:
a downstream blockage ratio is defined as the ratio of:

$$\frac{\text{the turbine diameter at an axial location of the lowest pressure rotor stage}}{\text{ground plane to wing distance}}$$

and a quasi-non-dimensional mass flow rate Q is defined as:

$$Q = W \frac{\sqrt{T0}}{P0 \cdot A_{flow}}$$

where:
W is mass flow rate through the fan in Kg/s;
T0 is average stagnation temperature of the air at the fan face in Kelvin;
P0 is average stagnation pressure of the air at the fan face in Pa; and
$A_{flow}$ is the flow area of the fan face in m²
and wherein a Q ratio of:
the downstream blockage ratio×Q
is in a range from 0.005 $Kgs^{-1}N^{-1}K^{1/2}$ to 0.011 $Kgs^{-1}N^{-1}K^{1/2}$. The values of Q used to calculate the Q ratio as referred to herein may be at cruise conditions.

By defining the Q ratio in this range a large mass flow may be achieved while also minimising the downstream blockage. The Q ratio may be lower than that of a known gas turbine engine. The Q ratio may be in a range from 0.0050 $Kgs^{-1}N^{-1}K^{1/2}$ to 0.0110, or to 0.0100 $Kgs^{-1}N^{-1}K^{1/2}$. The Q ratio may be in a range from 0.005 $Kgs^{-1}N^{-1}K^{1/2}$ to 0.010 $Kgs^{-1}N^{-1}K^{1/2}$. The Q ratio may be in a range from 0.006 $Kgs^{-1}N^{-1}K^{1/2}$ to 0.009 $Kgs^{-1}N^{-1}K^{1/2}$.

The downstream blockage ratio may be in a range from 0.2 to 0.3. The downstream blockage ratio may be in a range from 0.20 to 0.29. The downstream blockage ratio may be in a range from 0.22 to 0.28.

The distance between the ground plane and the wing may be measured to a centre point of a leading edge of the wing. The distance between the ground plane and the wing may be measured along a line perpendicular to the ground plane and passing through and perpendicular to an axial centreline of the engine.

The turbine diameter at the axial location of the lowest pressure rotor stage may be measured adjacent blade tips of rotor blades of the lowest pressure rotor stage. The turbine diameter at the axial location of the lowest pressure rotor stage may be in the range from 70 cm to 170 cm. Optionally, for example for an engine with a fan tip radius in the range from 110 cm to 150 cm, the turbine diameter at the lowest pressure rotor stage may be in the range from 100 cm to 120 cm. Optionally, for example for an engine with a fan tip radius in the range from 155 cm to 200 cm, the turbine diameter at the lowest pressure rotor stage may be in the range from 120 cm to 170 cm. The turbine diameter at the lowest pressure rotor stage may be measured at the axial location of blade tip trailing edges of rotor blades of the lowest pressure rotor stage. The turbine diameter of the turbine at the lowest pressure rotor stage may be measured:
(i) when the rotor is shrouded, to the underside of the shroud; or
(ii) when the rotor is unshrouded, to the blade tips of the rotor.

A specific thrust may be defined as net engine thrust divided by mass flow rate through the engine; and at engine cruise conditions it may be that:
0.029 $Kgs^{-1}N^{-1}K^{1/2} \leq Q \leq 0.036$ $Kgs^{-1}N^{-1}K^{1/2}$; and/or
70 $Nkg^{-1}s$ specific thrust ≤ 110 $Nkg^{-1}s$.

It may be that at cruise conditions: 0.032 $Kgs^{-1}N^{-1}K^{1/2} \leq Q \leq 0.036$ $Kgs^{-1}N^{-1}K^{1/2}$. It may be that at cruise conditions: 0.033 $Kgs^{-1}N^{-1}K^{1/2} \leq Q \leq 0.035$ $Kgs^{-1}N^{-1}K^{1/2}$.

The ratio of the radius of fan blade at its hub to the radius of the fan blade at its tip may be less than 0.33.

At cruise conditions, the specific thrust may be less than 100 $Nkg^{-1}s$. Cruise conditions may be as defined elsewhere herein.

The gas turbine engine may comprise a gearbox that receives an input from the core shaft and outputs drive to the fan so as to drive the fan at a lower rotational speed than the core shaft.

The turbine may be a first turbine, the compressor may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In another aspect, there is provided an aircraft comprising a wing and a gas turbine engine mounted beneath the wing of the aircraft, the engine comprising: an engine core comprising a turbine, a compressor, and a core shaft connecting the turbine to the compressor, the turbine comprising a lowest pressure rotor stage, the turbine having a turbine diameter; and a fan located upstream of the engine core, the fan comprising a plurality of fan blades extending from a hub, an annular fan face being defined at a leading edge of the fan wherein: a downstream blockage ratio is defined as the ratio of:

$$\frac{\text{the turbine diameter at an axial location of the lowest pressure rotor stage}}{\text{ground plane to wing distance}}$$

and a quasi-non-dimensional mass flow rate Q is defined as:

$$Q = W \frac{\sqrt{T0}}{P0 \cdot A_{flow}}$$

where:
W is mass flow rate through the fan in Kg/s;
T0 is average stagnation temperature of the air at the fan face in Kelvin;
P0 is average stagnation pressure of the air at the fan face in Pa; and
$A_{flow}$ is the flow area of the fan face in m²
and wherein a Q ratio of:
the downstream blockage ratio×Q
is in a range from 0.005 $Kgs^{-1}N^{-1}K^{1/2}$ to 0.011 $Kgs^{-1}N^{-1}K^{1/2}$.

The aircraft may comprise two wings, with one or more gas turbine engines mounted beneath each wing; the or each gas turbine engine may have the features of any of the statements related to the previous aspect.

According to another aspect, there is provided a method of operating an aircraft comprising a gas turbine engine comprising: an engine core comprising a turbine, a compressor, and a core shaft connecting the turbine to the compressor, the turbine comprising a lowest pressure rotor stage, the turbine having a turbine diameter; and a fan located upstream of the engine core, the fan comprising a plurality of fan blades extending from a hub, an annular fan face being defined at a leading edge of the fan, wherein: a downstream blockage ratio is defined as the ratio of:

$$\frac{\text{the turbine diameter at an axial location of the lowest pressure rotor stage}}{\text{ground plane to wing distance}}$$

and a quasi-non-dimensional mass flow rate Q is defined as:

$$Q = W \frac{\sqrt{T0}}{P0 \cdot A_{flow}}$$

where:
W is mass flow rate through the fan in Kg/s;
T0 is average stagnation temperature of the air at the fan face in Kelvin;
P0 is average stagnation pressure of the air at the fan face in Pa; and
$A_{flow}$ is the flow area of the fan face in m²
the method comprises controlling the aircraft such that a Q ratio of: the downstream blockage ratio×Q is in a range from 0.005 $Kgs^{-1}N^{-1}K^{1/2}$ to 0.011 $Kgs^{-1}N^{-1}K^{1/2}$.

The gas turbine engine may have the features of any of the statements related to the previous two aspects.

The skilled person will appreciate that a feature described above in relation to any one of the aspects may be applied, mutatis mutandis, to any other aspect of the invention. For example, in various embodiments any two or more of the conditions for ratios as defined above, and optionally all specified ratio ranges, may apply to any given aspect or embodiment. All aspects may apply to an engine of some embodiments. Furthermore, any feature described below may apply to any aspect and/or may apply in combination with any one of the claims.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox is a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 5, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. The gear ratio may be in the range of from 3.2 to 4.2 and optionally in the range 3.2 to 3.8, 3.3 to 3.8 or 3.4 to 3.7. A higher gear ratio may be more suited to "planetary" style gearbox. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5, or 20. The bypass ratio may be in an inclusive range bounded by any two of the values in the previous sentence (i.e. the values may form upper or lower bounds). The bypass ratio may be in the range of from 11 to 20, and optionally in the range from 13 to 20 or 14 to 20.

The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein according to any aspect may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance-between top of climb and start of descent). Cruise conditions thus define an operating point of the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise conditions. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures, in which.

Figure 1:
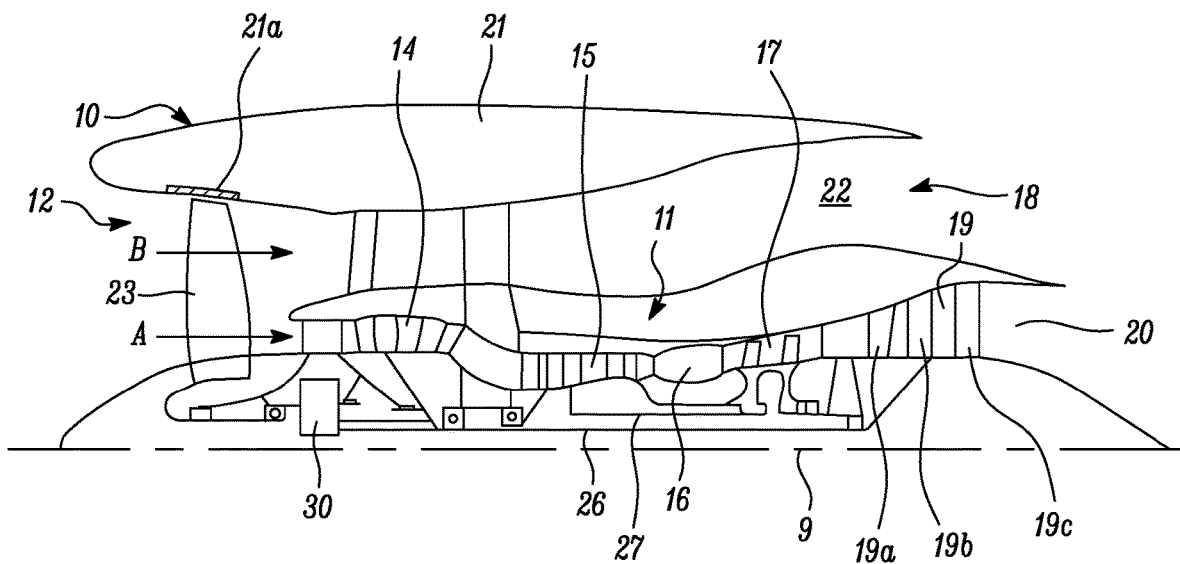
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
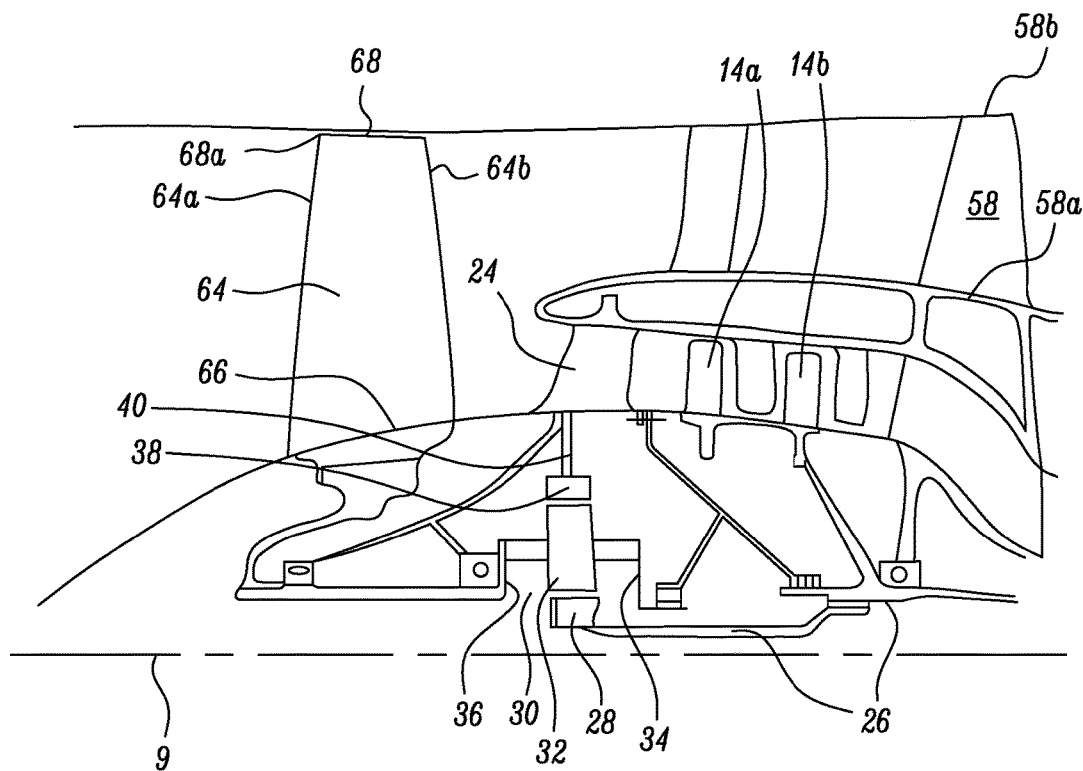
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3A:
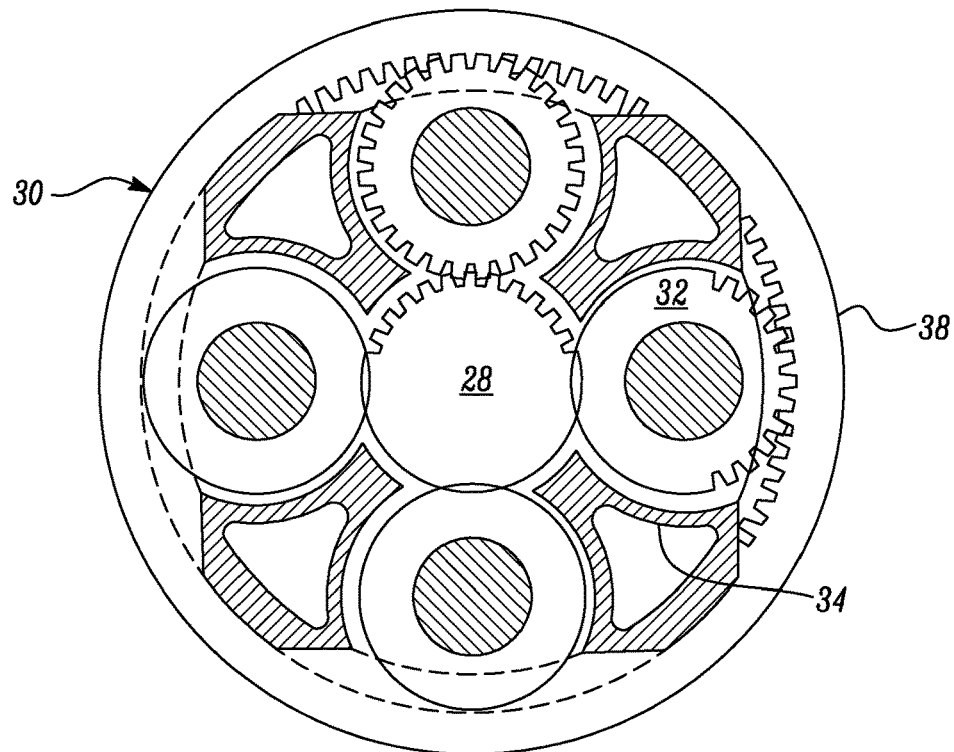
FIG. 3A is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine 10 shown in FIG. 1 has a split flow nozzle 18, 20 meaning that the flow through the bypass duct 22 has its own nozzle 18 that is separate to and radially outside the core engine nozzle 20. However, this is not limiting, and various aspects of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Referring again to FIGS. 1 and 2, the lowest pressure compressor 14 comprises one or more compressor stages. In the embodiment shown in FIG. 1, the lowest pressure compressor 14 comprises two compressor stages. Each stage of the compressor may comprise a row of rotor blades 14a, 14b and a row of stator vanes, which may be variable stator vanes (in that their angle of incidence may be variable). The row of rotor blades and the row of stator vanes may be axially offset from each other.

The one or more compressor stages may comprise a lowest pressure stage, and may further comprise one or more compressor stages of increasing pressure to a highest pressure compressor stage. The lowest pressure compressor stage 14a may be located furthest upstream along the gas flow path within the lowest pressure compressor 14. The further higher pressure stages may be spaced axially along the gas flow path through the compressor in a downstream (rearward) direction.

The lowest pressure turbine 19 similarly comprises one or more turbine stages. In the embodiment shown in FIG. 1, the lowest pressure turbine 19 comprises one stage. Each turbine stage may comprise a row of rotor blades 19b and a row of stator vanes 19a, 19c, which may be variable stator vanes (in that their angle of incidence may be variable). The row of rotor blades and the row of stator vanes may be axially offset from each other.

The one or more turbine stages forming the lowest pressure turbine 19 may comprise a highest pressure stage, and may further comprise one or more turbine stages of decreasing pressure to a lowest turbine pressure stage. The lowest pressure turbine stage may be located furthest downstream within the lowest pressure turbine 19. The further pressure stages are spaced axially in an upstream (forward) direction along the gas flow path through the turbine. In embodiments with only one stage, the single stage is the lowest pressure stage.

Figures 15A, 15B:
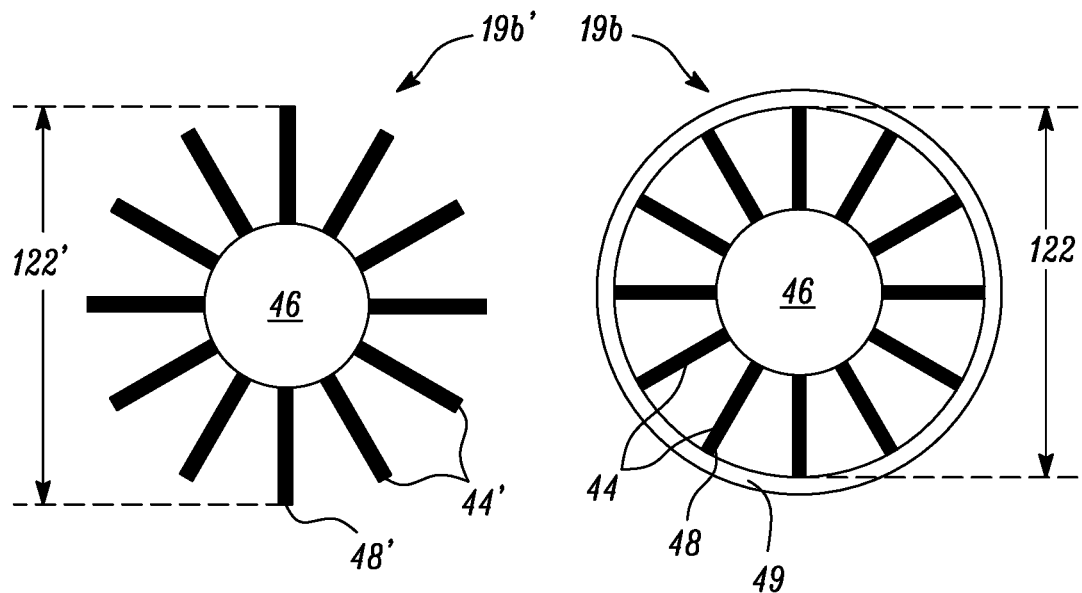
FIG. 15A is a schematic sectional view of an unshrouded turbine rotor in a radial plane.
FIG. 15B is a schematic sectional view of a shrouded turbine rotor in a radial plane.
Figure 16:
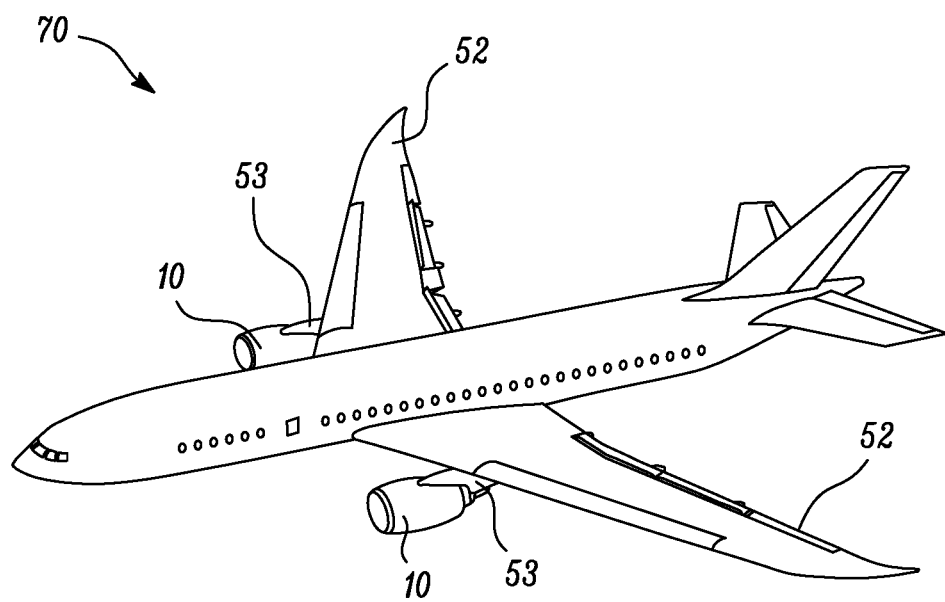
FIG. 16 is a schematic view of an aircraft comprising two gas turbine engines.

Each row of rotor blades provided in the lowest pressure compressor 14 and the lowest pressure turbine 19 may form an annular array of rotor blades 44 carried by a respective rotor hub 46 (or rotor disc), as shown by way of example in FIGS. 15A and 15B. Each of the rotor blades 44 may be coupled to the hub 46 via a root received in a corresponding slot in a peripheral edge of the hub. Each rotor blade 44 may be defined as having a radial span extending from the root 46 (or hub) at a radially inner gas-washed location, or 0% span position, to an outer most radial tip 48 at a 100% span position. The radius at the hub and the radius at the tip may both be measured at the leading edge (or axially forward-most) part of the rotor blade. The radial span each rotor blade 44 refers to the gas-washed portion of the rotor blade, i.e. the portion radially outside any platform at which it is coupled to the hub.

Each of the rotor blades 44 forming the compressor or turbine stages 19b may have a leading edge mean radius point (or mid blade span) and a trailing edge mean radius point. The mean radius point is defined as the midpoint between the 0% span position and the 100% span position. It may be measured at the rotor blade leading edge (axially forward-most edge) or trailing edge (axially rearward-most edge) to give the leading edge mean radius point and the trailing edge mean radius point respectively.

The fan 23 comprises an annular array of fan blades 64 extending from a hub 66. Each fan blade 64 may be defined as having a radial span extending from a root 66 received in a slot in the fan hub 66 at a radially inner gas-washed location, or 0% span position, to a tip 68 at a 100% span position. The ratio of the radius of the fan blade 64 at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade 64 at the fan hub 66 to the radius of the fan blade at the tip 68 may be in an inclusive range bounded by any two of the values in the previous sentence (i.e. the values may form upper or lower bounds). These ratios may commonly be referred to as the hub-to-tip ratio. The fan blade 64 has a leading edge 64a and a trailing edge 64b defined along the direction of gas flow through the engine. The radius at the fan hub 66 and the radius at the tip 68 may both be measured at the leading edge 64a (or axially forward-most) part of the blade. The hub-to-tip ratio refers to the gas-washed portion of the fan blade, i.e. the portion radially outside any platform by which each fan blade is coupled to the hub.

Figure 5A:
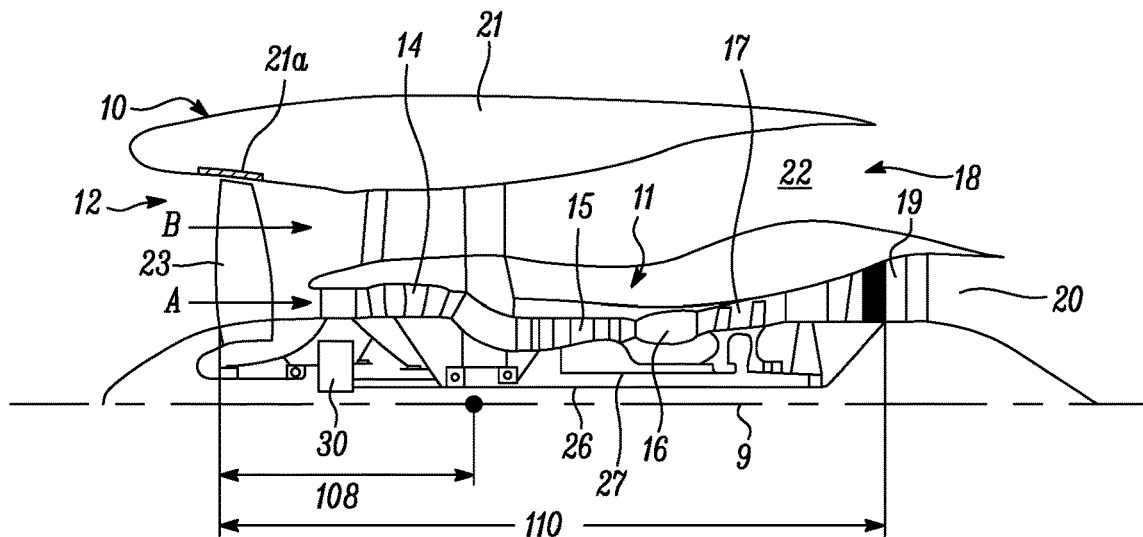
FIG. 5A is a sectional view of the gas turbine engine of FIG. 1 with marked engine dimensions suitable for use in calculating an engine length to CoG ratio.
Figure 5B:
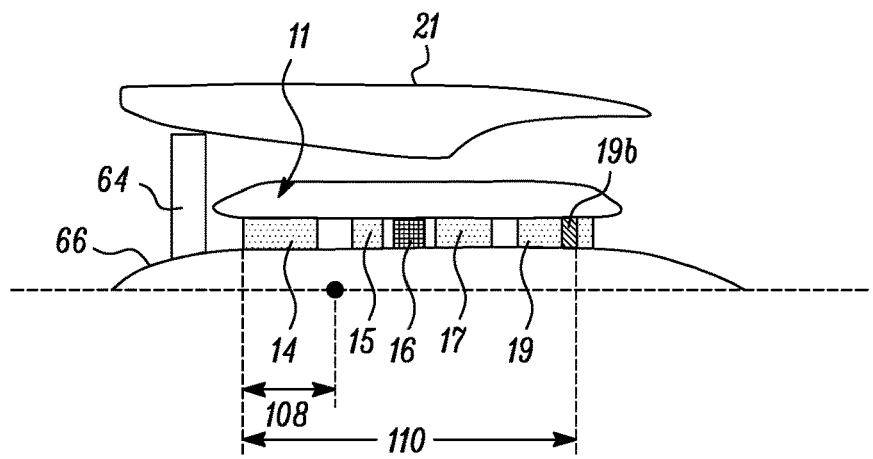
FIG. 5B is a schematic sectional view of a generic gas turbine engine with marked engine dimensions corresponding to those marked in FIG. 5A.

The gas turbine engine may be described by one or more of the following parameters:

Engine Length:

Referring to FIGS. 5A and 5B, the gas turbine engine 10 of the embodiments being described has an engine length (labelled 110 in the figures) defined as the axial distance between: the intersection of the leading edge 64a of one of the fan blades 64 and the hub 66; and the trailing edge mean radius point of one of the rotor blades 44 provided in the lowest pressure stage 19b of the lowest pressor turbine 19.

In the embodiments being described, the engine length 110 is in the range from 200 cm to 500 cm, and more particularly from 300 cm to 450 cm. In an embodiment comprising a fan 23 with a fan tip radius 102 in the range from 110 cm to 150 cm, the engine length 110 may be in the range from 300 cm to 360 cm. In an embodiment comprising a fan 23 with a fan tip radius 102 in the range from 155 cm to 200 cm, the engine length 110 may be in the range from 370 cm to 470 cm, or from 390 cm to 470 cm.

Figure 4A:
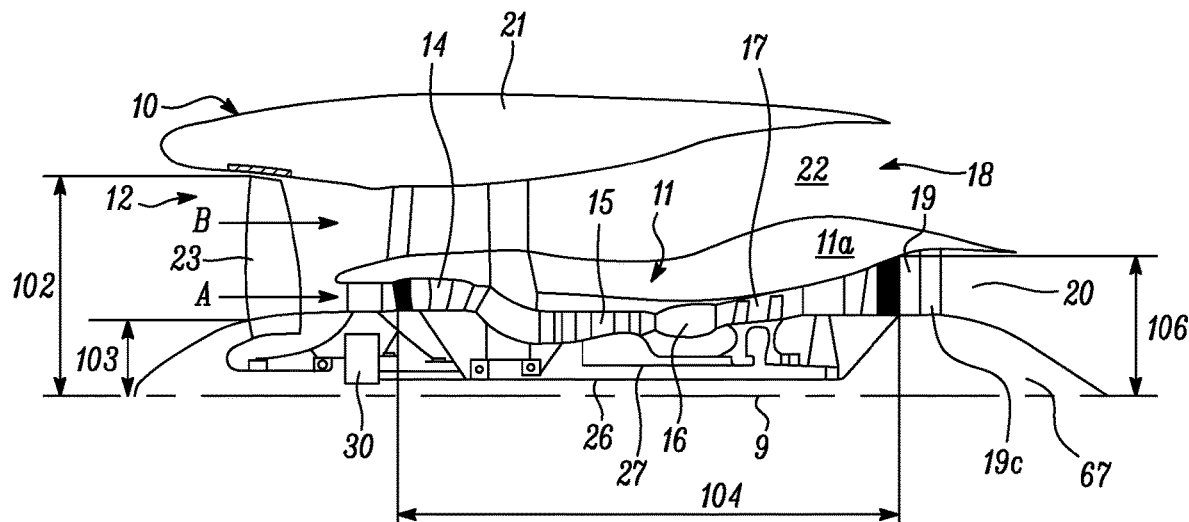
FIG. 4A is a sectional view of the gas turbine engine of FIG. 1 with marked engine dimensions suitable for use in calculating an engine area ratio.
Figure 4B:
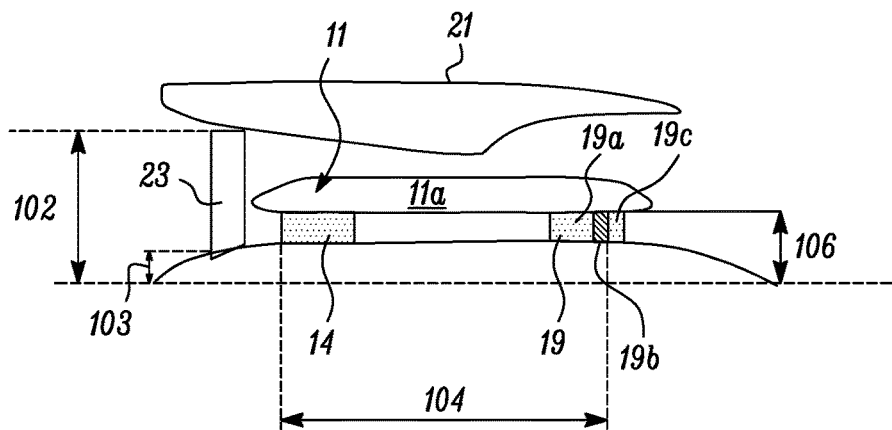
FIG. 4B is a schematic sectional view of a generic gas turbine engine with marked engine dimensions corresponding to those marked in FIG. 4A.

Core Length:

Referring to FIGS. 4A and 4B, the gas turbine engine 10 has a core length 104 defined as the axial distance between a forward region of the low pressure compressor 14 and a rearward region of the low pressure turbine 19, and more specifically the axial distance between the mean radius point (mid blade span) of the first stage of the low pressure compressor 14 blade leading edge and the mean radius point (mid blade span) of the lowest pressure turbine rotor stage 19b blade trailing edge of the low pressure turbine 19.

The first stage of the low pressure compressor 14 is shown in black in FIG. 4A, at the forward end of the core length 104. The lowest pressure turbine rotor stage 19b of the low pressure turbine 19 is also shown in black, at the rearward end of the core length 104.

In the embodiments being described, the core length 104 is measured along a centreline 9 of the engine 10 from a mean radius point of the first stage of the compressor blade leading edge to a mean radius point of the lowest pressure turbine rotor stage 19b blade trailing edge of the turbine 19.

The core length is in the range from 150 cm to 350 cm in the embodiment being described, and more specifically in the range from 160 cm to 320 cm. In an embodiment comprising a fan 23 with a fan tip radius in the range from 110 cm to 150 cm, the core length may be in the range from 160 cm to 260 cm. In an embodiment comprising a fan 23 with a fan tip radius in the range from 155 cm to 200 cm, the core length may be in the range from 240 cm to 320 cm.

Fan Tip Radius:

The radius 102 of the fan 23, also referred to as the fan tip radius 102, or $R_{fan\ tip}$, may be measured between the engine centreline 9 and the tip 68a of a fan blade 64 at its leading edge 64a (in a radial direction). The fan diameter may simply be defined as twice the radius 102 of the fan 23.

In the embodiments being described, the fan tip radius 102 is in the range from 95 cm to 200 cm, or from 110 cm to 200 cm. In some embodiments, the fan tip radius is in the range from 95 cm to 150 cm or from 110 cm to 150 cm. In some alternative embodiments, the fan tip radius is in the range from 155 cm to 200 cm.

In some embodiments, the fan diameter is in the range from 190 cm to 300 cm, or 220 cm to 300 cm. In some alternative embodiments, the fan diameter is in the range from 310 cm to 400 cm.

Fan Face Area:

The fan face area, $A_{fan\ face}$, is defined as the circular area swept by the fan blade tips 68 at the axial position of the fan blade leading edge 64$a$ tip. The fan face area is measured in a radial plane. The skilled person will appreciate that $A_{fan\ face}$ is at least substantially equivalent to the area within the inner surface of the nacelle 21 at the axial position of the leading edge blade tips (as the blade tip leading edges are arranged to lie very close to the inner surface of the nacelle) for the engine 10 being described.

In the embodiment being described, nacelle inner radius at the axial position of the leading edge blade tips 68$a$ is arranged to be slightly larger than the fan tip radius 102, such that the fan 23 can fit within the nacelle 21 without the blade tips 68 rubbing the nacelle 21. More particularly, in the embodiment being described the engine 10 comprises an engine fancasing 21$a$ adjacent the blade tips 68$a$; the nacelle 21 is mounted on/around the engine fancasing 21$a$ such that the engine fancasing 21$a$ effectively forms an inner part of the nacelle 21 once assembled. The fan casing inner radius at the axial position of the leading edge blade tips 68$a$ is arranged to be slightly larger than the fan tip radius 102, such that the fan 23 can fit within the engine fancasing 21$a$ without the blade tips 68 rubbing the fan casing 21$a$. In the embodiments shown in the Figures, the engine fancasing 21$a$ extends only in the region of the fan 23. In alternative embodiments, the fancasing 21$a$ may extend rearwardly, for example to the axial location of a bypass duct outlet guide vane (OGV) 58.

In use, fan geometry may change, for example due to aerodynamic and centrifugal running loads the fan 23 may expand more than the nacelle 21 and/or more than the fancasing 21$a$; the nacelle inner radius may therefore be selected to accommodate the fan 23 in its expanded state. The skilled person would appreciate that the change in fan radius 102 is relatively small compared to the total fan radius, for example being around 0.1-3 mm for a radius of 95 cm or above, and that values for the ratios disclosed herein are therefore not substantially affected by whether fan radius 102 is measured when cold, or taken in use, or indeed whether nacelle inner radius at the axial position of the fan blade tip leading edges is used in the place of a measurement of the radius of the fan 23 itself.

The fan face area may be defined as follows:

$$A_{fan\ face} = \pi R_{fan\ tip}^2$$

Where $R_{fan\ tip}$ is the radius 102 of the fan 23 at the leading edge (i.e. at the tips 68$a$ of the leading edge 64$a$ of the fan blades 64).

In the embodiment being described, the area is defined in a radial plane (at the axial location of the leading edge tip 68$a$), and can therefore be calculated using the fan tip radius 102. In alternative embodiments, fan blade curvature may be taken into account when calculating fan face area.

In some embodiments, the fan diameter is in the range from 220 cm to 300 cm and the fan face area is in the range of 2.8 m² to 7.1 m². In some alternative embodiments, the fan diameter is in the range from 310 cm to 400 cm and the fan face area is in the range of 7.5 m² to 12.6 m².

Fan Flow Area:

The fan flow area, $A_{flow}$, is defined as the annular area between fan blade tips 68 and the hub 66 at the axial position of the fan blade leading edge tip 68$a$. The fan flow area is measured in a radial plane. The skilled person will appreciate that $A_{flow}$ is at least substantially equivalent to the area of the annulus formed between the hub 66 of the fan 23 and the inner surface of the nacelle 21 immediately adjacent the leading edge blade tips (as the blade tip leading edges 64$a$ are arranged to lie very close to the inner surface of the nacelle 21—noting the above comments about the fancasing 21$a$) for the fan engine 10 being described, and is therefore equivalent to the fan face area minus the area taken by the hub 66.

As referred to herein, the flow area of the fan ($A_{flow}$) is defined as:

$$A_{flow} = \pi(R_{fan\ tip}^2 - R_{hub}^2)$$

Where:

$R_{fan\ tip}$ is the radius 102 (in metres) of the fan 23 at the leading edge (i.e. at the tips 68$a$ of the leading edge of the fan blades 64);

$R_{hub}$ is the distance 103 (in metres) between the centreline of the engine and the radially inner point on the leading edge of the fan blade (i.e. of radially inner point of the gas-washed surface of the fan blade)—this is equivalent to the radius of the hub 66 of the fan 23 at the point at which the leading edge of each blade 64 is connected thereto, and may be referred to as the hub radius.

In one embodiment, the ratio of the radius of fan blade 64 at its hub 66 to the radius of the fan blade at its tip 68 may be less than 0.33.

In the embodiment being described, the flow area is defined in a radial plane, and can therefore be calculated using the fan tip radius 102 and the hub radius 103.

Position of Centre of Gravity:

The gas turbine engine 10 has a position of centre of gravity (CoG) (labelled as 108 in FIGS. 5A and 5B) defined as the axial distance between: the intersection of a leading edge 64$a$ of one of the fan blades 64 and the fan hub 66; and the centre of gravity of the engine 10. The centre of gravity may be measured for the engine 10 including the nacelle 21 and any components it surrounds, and does not include any attaching hardware (such as a pylon 53) provided to mount the nacelle 21 or other support structure.

In the embodiment being described, the CoG position is between 100 cm and 230 cm from the intersection of a leading edge 64$a$ of one of the fan blades 64 and the fan hub 66.

In some embodiments, the fan diameter is in the range from 220 cm to 300 cm (i.e. a fan tip radius in the range from 110 cm to 150 cm) and the CoG position is in the range from 140 cm to 180 cm. In some alternative embodiments, the fan diameter is in the range from 310 cm to 400 cm (i.e. fan tip radius of 155 cm to 200 cm) and the CoG position is in the range from 160 cm to 230 cm.

Gearbox Location:

In embodiments with a gearbox 30, the gas turbine 10 has a gearbox location (labelled as 112 in FIGS. 6A and 6B) corresponding to a relative position of the gearbox 30 along the engine length 110. The gearbox location 112 may be measured between: the intersection of a leading edge 64$a$ of one of the fan blades 64 and the hub 66; and a radial centre plane of the gearbox 30, the radial centre plane being at the midpoint between the front face of a most forward gear mesh of the gearbox and the rear face of a most rearward gear mesh of the gearbox. In the embodiment being described having an epicyclic gearbox 30, the gearbox location 112 may be defined as the axial distance between: the intersection of a leading edge 64a of one of the fan blades 64 and the hub 66; and a radial plane intersecting the axial centre point of the ring gear 38 of the gearbox 30.

In the embodiment being described, the gearbox location is between 50 cm and 110 cm from the intersection of a leading edge 64a of one of the fan blades 64 and the fan hub 66.

In some embodiments, the fan diameter is in the range from 220 cm to 300 cm and the gearbox location 112 is in the range from 50 cm to 80 cm. In some alternative embodiments, the fan diameter is in the range from 310 cm to 400 cm and the gearbox position 112 is in the range from 80 cm to 110 cm.

Figure 11A:
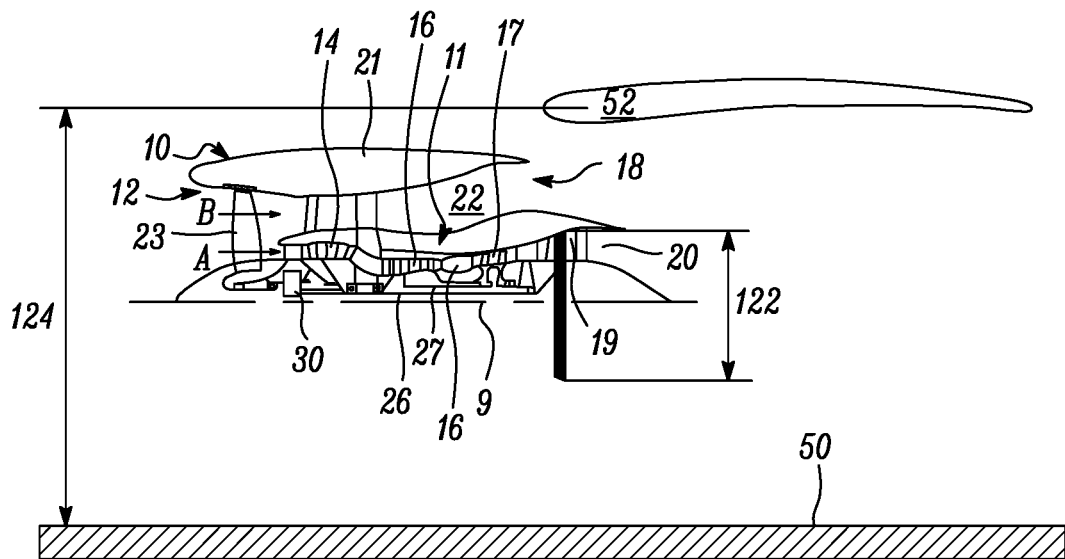
FIG. 11A is a sectional view of the gas turbine engine of FIG. 1 in context between the ground and a wing of the aircraft, with marked engine dimensions suitable for use in calculating downstream blockage.
Figure 11B:
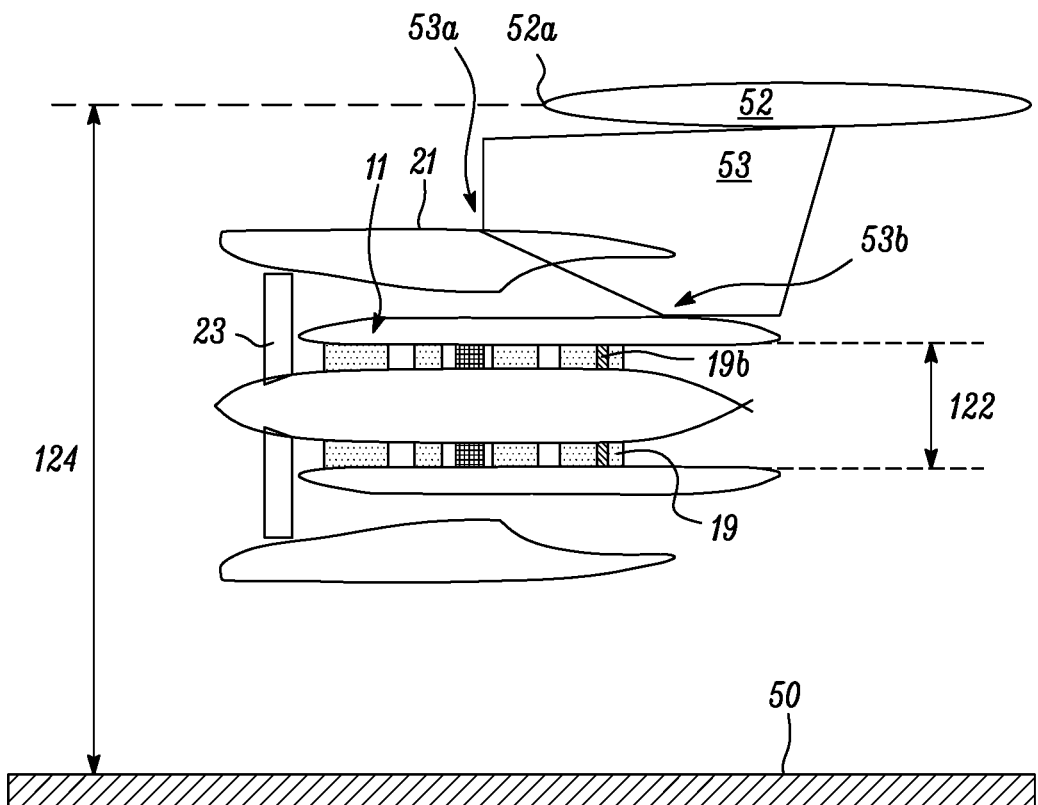
FIG. 11B is a schematic sectional view of a generic gas turbine engine with marked engine dimensions corresponding to those marked in FIG. 11A.

Diameter of Turbine at Lowest Pressure Rotor Stage (Turbine Diameter):

Referring to FIGS. 11A and 11B, the gas turbine engine 10 has a diameter 122 of the low pressure turbine 19 at its lowest pressure rotor stage 19b. This may be referred to as the "turbine diameter" herein. The skilled person will appreciate that the diameter of the turbine 19 may vary along the length of the turbine 19, and that a particular axial position (in this case that of the lowest pressure rotor stage 19b) is therefore identified to define a specific diameter value.

The skilled person would appreciate that the lowest pressure rotor stage 19b is the rearmost rotor stage of the turbine 19, and that the rearmost rotor stage 19b of the turbine 19 would be referred to as the lowest pressure rotor stage of the turbine 19 even when the engine 10 is not in use; i.e. even when pressure does not vary substantially across the engine.

In the embodiment being described the diameter 122 at the lowest pressure rotor stage 19b is measured at the axial location of blade tip trailing edges of rotor blades 44 of the lowest pressure rotor stage 19b. The turbine diameter 122 is defined as the diameter at the point of intersection between the lowest pressure rotor stage blade 44 trailing edge and the outer edge of the gas path annulus.

On a shrouded turbine blade 44 such as that of the embodiment being described (illustrated in FIG. 15B), the underside of the shroud 49 defines the turbine diameter 122 (where "underside" is defined as the surface of the shroud closest to engine centre), as the shroud 49 provides an edge to the gas path annulus. Whilst the blade 44 extends into the shroud 49 in the embodiment being described, so as to facilitate mounting of the shroud 49 on the blades 44, the point at which the blade 44 enters the shroud 49 may be thought of as the blade tip 48, as it is the radially outermost part of the blade 44 exposed to the gas flow. On a shroudless rotor 19b', i.e. a turbine 19 without a shroud mounted on the blades, such as that illustrated in FIG. 15A, the tips 48 of the blades 44 define the diameter 122'.

In the embodiment shown in FIGS. 4A, 11A and 11B, the turbine 19 has only one rotor 19b (i.e. one row of rotor blades 44, at a specific axial location), and so the only rotor of the turbine 19 is the lowest pressure rotor stage of the turbine. The rotor 19b is located between two stators 19a, 19c. The rearmost stator 19c may also be referred to as an Outlet Guide Vane (OGV). In alternative embodiments, multiple rotors may be present within the turbine 19. The lowest pressure rotor stage of the turbine 19b is the rearmost rotor stage of the turbine 19 in such embodiments, as the skilled person will appreciate that pressure decreases along the length of the turbine 19, from front to back. In such embodiments, the turbine 19 comprises a plurality of rotor stages including a lowest pressure rotor stage located furthest downstream.

The turbine 19 of the embodiment being described comprises a turbine casing. The rotor(s) 19b and stators 19a, 19c are mounted within the casing. In the embodiment being described the turbine diameter 122 is at least substantially equal to an inner diameter of the turbine—i.e. shroud width and/or blade tip to casing spacing is small relative to the turbine diameter 122. In the embodiment being described, the engine 10 comprises a casing 11a around the engine core 11, and the turbine casing is provided by a part of the core casing 11a. In alternative embodiments, the turbine casing may be separate.

The diameter 122 of the low pressure turbine 19 at its lowest pressure rotor stage 19b (shown in FIG. 11A) is equal to twice the radius 106 of the low pressure turbine 19 at its lowest pressure rotor stage (shown in FIG. 4A). The radius 106 of the low pressure turbine 19 at its lowest pressure rotor stage 19b is the distance between the engine centreline and the point of intersection between the lowest pressure rotor stage blade trailing edge and the outer edge of the gas path annulus (which is the underside of the shroud for the shrouded rotor of the embodiment being described, but would be defined by the blade tips in embodiments with an unshrouded rotor).

In the embodiment being described, the turbine diameter 122 at the lowest pressure rotor stage is in the range from 70 cm to 170 cm. In embodiments with an engine 10 with a fan tip radius 102 in the range from 110 cm to 150 cm, the turbine diameter 122 at the lowest pressure rotor stage may be in the range from 100 cm to 120 cm. In embodiments with an engine 10 with a fan tip radius 102 in the range from 155 cm to 200 cm, the turbine diameter 122 at the lowest pressure rotor stage may be in the range from 120 cm to 170 cm.

Bypass Exhaust Nozzle Outer Radius:

The bypass duct 22 has a bypass exhaust nozzle 18 as air drawn in through the fan 23 and bypassing the core 11 passes through the bypass duct 22 and out of the bypass exhaust nozzle 18, the bypass exhaust nozzle may be referred to as a fan nozzle 18. The bypass exhaust nozzle outer radius 114 may therefore be referred to as the fan nozzle outer radius 114. In the embodiment being described, an inner surface of the nacelle 21 defines the outer surface of the bypass exhaust nozzle 18.

Figure 7A:
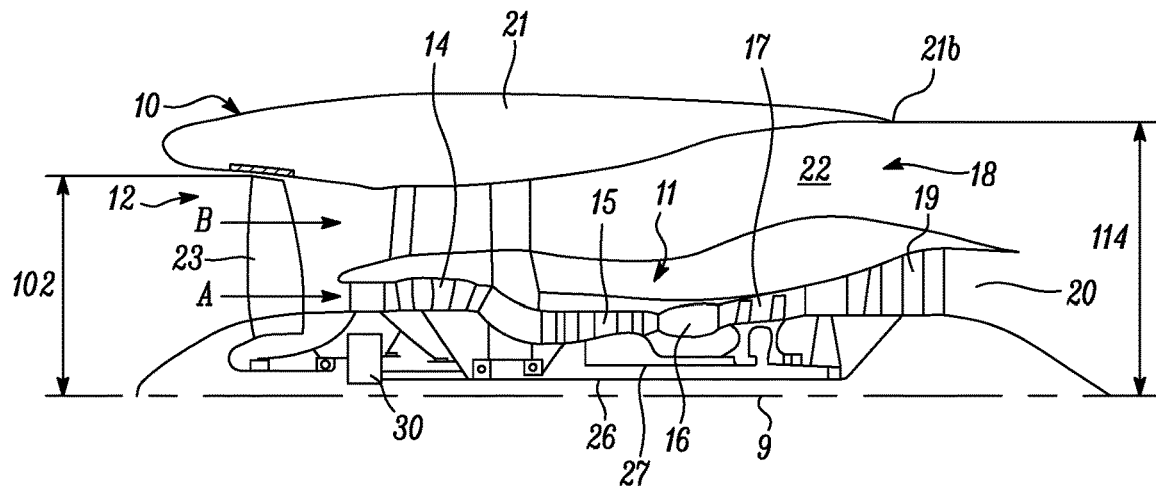
FIG. 7A is a sectional view of the gas turbine engine of FIG. 1 with marked engine dimensions suitable for use in calculating an outer bypass to fan ratio.
Figure 7B:
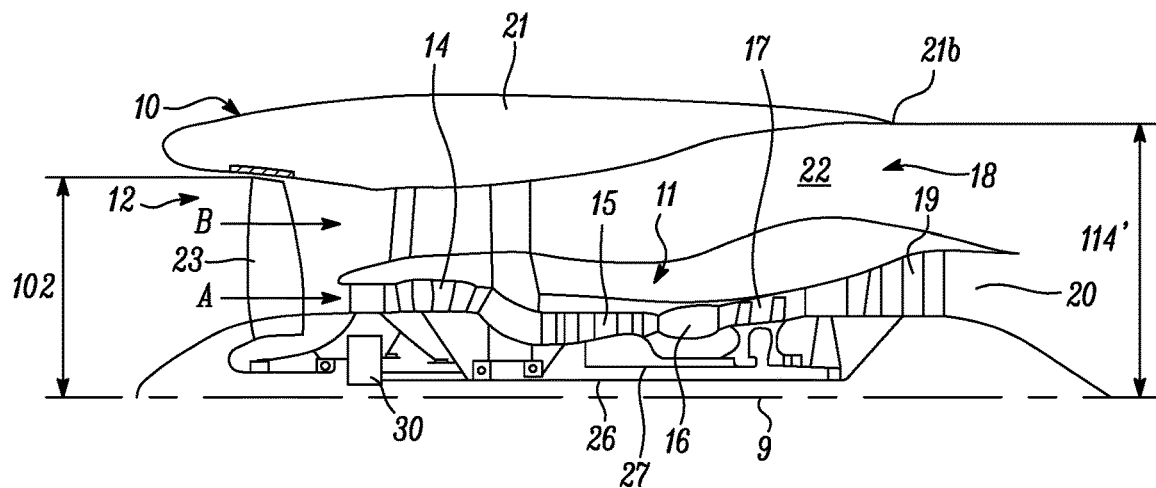
FIG. 7B is a sectional view of a different gas turbine engine having a different nacelle shape, with marked engine dimensions suitable for use in calculating an outer bypass to fan ratio.
Figure 7C:
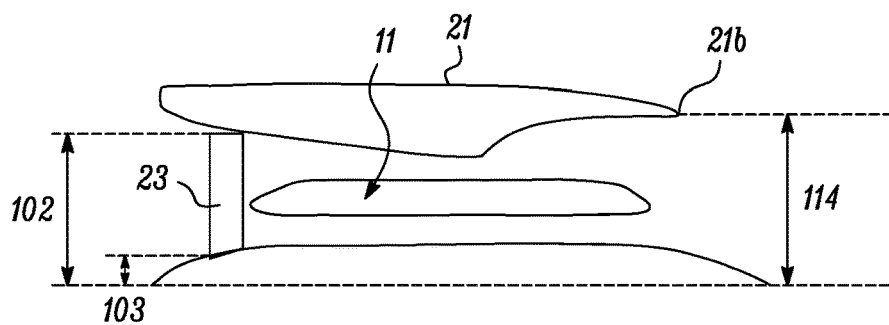
FIG. 7C is a schematic sectional view of a generic gas turbine engine with marked engine dimensions corresponding to those marked in FIG. 7A.

The bypass exhaust nozzle outer radius 114, shown in FIGS. 7A to C, is defined as the radius at the outer edge of the bypass exhaust nozzle exit. The radius 114 is measured from the engine centre line 9 to the rearmost tip 21b of the inner surface of the nacelle 21, in a radial plane. The radial plane may be referred to as an exit plane 54 of the bypass exhaust nozzle 18. The bypass exhaust nozzle 18 ends where the nacelle 21 ends, making the rearmost tip 21b of the nacelle 21 the axial position of the exit from the bypass exhaust nozzle 18 in the embodiment being described.

In the embodiments being described, the outer radius 114 of the bypass exhaust nozzle 18 is in the range of 100 cm to 200 cm, and particularly in the range 100 cm to 190 cm. In embodiments with an engine 10 with a fan tip radius 102 in the range from 110 cm to 150 cm, the outer radius 114 of the bypass exhaust nozzle 18 may be in the range from 100 cm to 145 cm. In embodiments with an engine 10 with a fan tip radius 102 in the range from 155 cm to 200 cm, the outer radius 114 of the bypass exhaust nozzle 18 may be in the range from 145 cm to 190 cm.

Bypass Exhaust Nozzle Inner Radius:

The bypass exhaust nozzle inner radius 116 may also be referred to as the fan nozzle inner radius 116. The bypass exhaust nozzle inner radius 116 is defined as the radius at the inner edge of the bypass exhaust nozzle exit. The radius 116 is measured from the engine centre line 9 to the point on the engine core 11 in the same axial position as the rearmost tip 21b of the inner surface of the nacelle 21, in the same radial plane (which may be referred to as the exit plane 54 of the bypass exhaust nozzle 18). The bypass exhaust nozzle 18 ends where the nacelle 21 ends, meaning that the rearmost tip of the nacelle 21 defines the axial position of the exit from the bypass exhaust nozzle 18.

In the embodiments being described, the inner radius 116 of the bypass exhaust nozzle 18 is in the range from 50 cm to 125 cm, and optionally from 65 cm to 110 cm. In embodiments comprising an engine 10 with a fan tip radius 102 in the range from 110 cm to 150 cm, the inner radius 116 of the bypass exhaust nozzle 18 may be in the range from 65 cm to 90 cm. In embodiments comprising an engine 10 with a fan tip radius 102 in the range from 155 cm to 200 cm, the inner radius 116 of the bypass exhaust nozzle 18 may be in the range from 80 cm to 110 cm.

Figure 3B:
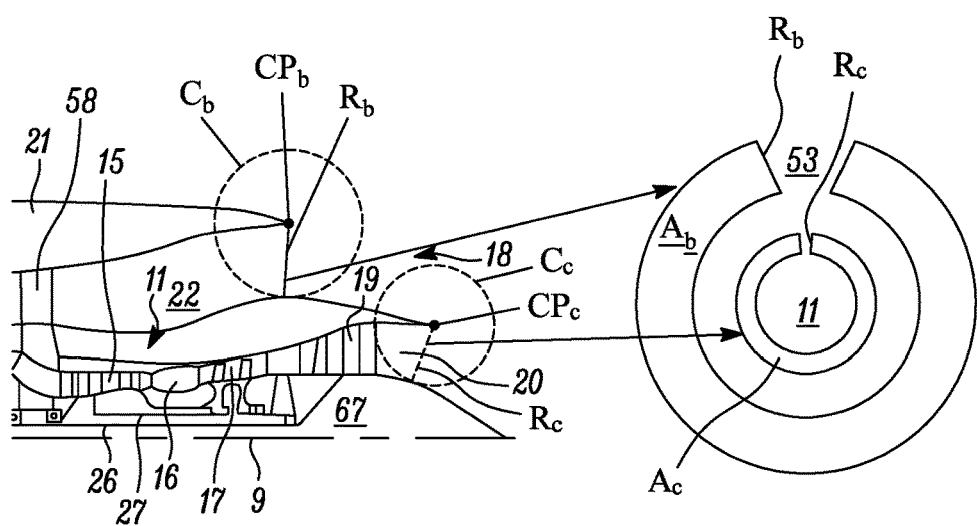
FIG. 3B is a sectional view of the gas turbine engine of FIG. 1 with nozzle parameters marked.

Bypass Exhaust Nozzle Flow Area:

The flow area $A_b$ of the bypass exhaust nozzle 18 at the nozzle exit may be defined as shown in FIG. 3B. A minimum distance $R_b$ across the nozzle 18 experienced by the bypass gas flow (B) is identified by superposing a circle $C_b$ with a centre point $CP_b$ at the rearmost tip of the nacelle 21 and expanding that circle until it makes contact with the inner annulus line of the bypass duct 22 (i.e. the outer surface of the engine core 11).

The area, $A_b$, experienced by the flow is defined based on rotating that minimum distance $R_b$ around the circumference, so forming an angled, approximately annular area, and subtracting the blocked area (in this embodiment blocked by the pylon 53, as illustrated on the right-hand side of FIG. 3B, which shows a view (not to scale) of the nozzle area in a rearward-facing radial plane).

The skilled person would appreciate that, in the embodiment shown, the minimum distance $R_b$ across the nozzle 18 is angled with respect to the radius of the engine 10, i.e. not perpendicular to the engine centreline 9, and that the minimum distance $R_b$ is therefore not equal to the difference between the inner radius 116 of the bypass exhaust nozzle 18 and the outer radius 114 of the bypass exhaust nozzle 18, and is not measured in the same plane as those radii. In alternative embodiments, the circle $C_b$ may make contact with the engine core 11 at the same axial position as the rearmost tip of the nacelle 21—in such embodiments, the minimum distance $R_b$ would be equal to the difference between the inner radius 116 of the bypass exhaust nozzle 18 and the outer radius 114 of the bypass exhaust nozzle 18.

The flow area, $A_b$ of the bypass exhaust nozzle at the bypass duct exhaust nozzle exit is between 1.9 m² and 5.8 m² in the embodiment being described. In embodiments with an engine 10 with a fan tip radius 102 in the range from 110 cm to 150 cm, the flow area of the bypass duct exhaust nozzle at the bypass duct nozzle exit may be in the range from 1.9 m² to 4.5 m². In embodiments with an engine 10 with a fan tip radius 102 in the range from 155 cm to 200 cm, the flow area of the bypass duct exhaust nozzle at the bypass duct exhaust nozzle exit may be in the range from 4.5 m² to 5.8 m².

Core Exhaust Nozzle Flow Area:

The flow area $A_c$ of the core exhaust nozzle 20 at the nozzle exit may be defined as for that of the bypass exhaust nozzle 18, as shown in FIG. 3B. A minimum distance $R_c$ across the nozzle 20 experienced by the gas flow is identified by superposing a circle $C_c$ with a centre point $CP_c$ at the rearmost tip of the engine core casing/inner fixed structure 11a, and expanding that circle until it makes contact with the inner annulus line of the core nozzle 20 (i.e. the outer surface of the exhaust cone 67).

The area, $A_c$, experienced by the flow is then defined based on rotating that minimum distance $R_c$ around the circumference, so forming an angled, approximately annular area, and subtracting the blocked area (in this embodiment blocked by the pylon 53, as illustrated on the right-hand side of FIG. 3B, which shows a view of the nozzle area in a rearward-facing radial plane). In the embodiment shown, the minimum distance $R_c$ across the nozzle 20 is angled with respect to the radius of the engine 10, i.e. not perpendicular to the engine centreline 9. In alternative embodiments, the minimum distance $R_c$ may be a radial distance.

In the embodiment being described, the flow area, $A_c$, of the core exhaust nozzle at the core exhaust nozzle exit is between 0.4 m² and 1.3 m². In embodiments with an engine (10) with a fan tip radius (102) in the range from 110 cm to 150 cm, the flow area of the core exhaust nozzle at the core exhaust nozzle exit may be in the range from 0.4 m² to 0.6 m². In embodiments with an engine (10) with a fan tip radius (102) in the range from 155 cm to 200 cm, the flow area of the core exhaust nozzle at the core exhaust nozzle exit may be in the range from 0.6 m² to 1.3 m².

Figure 12A:
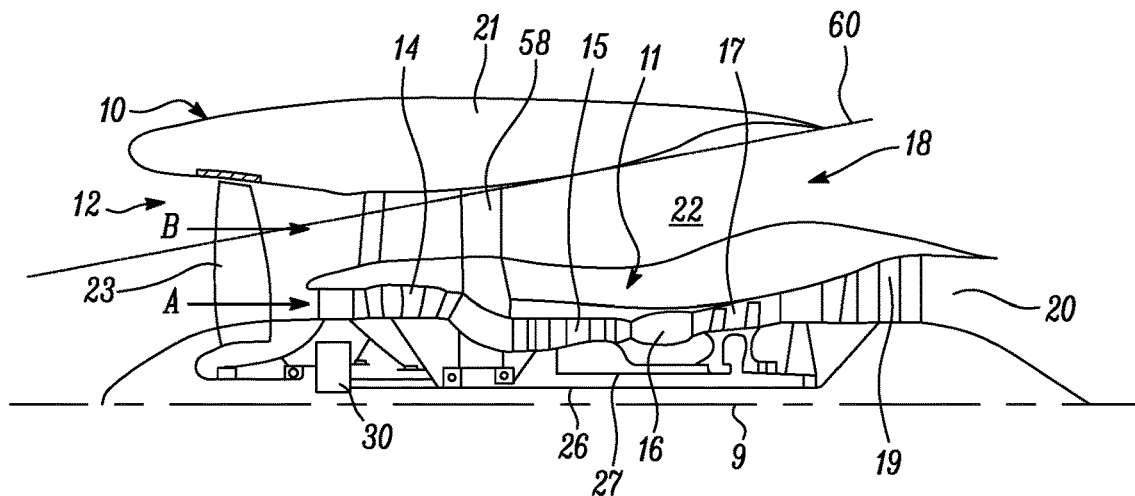
FIG. 12A is a sectional view of the gas turbine engine of FIG. 1 with marked engine dimensions suitable for use in calculating an outer bypass duct wall angle.

Outer Bypass Duct Wall Angle:

The bypass duct 22 is partly defined by an outer wall formed by the inner surface of the nacelle 21 as illustrated in FIG. 12A. In this embodiment, a bypass duct outlet guide vane (OGV) 58 is provided that extends radially across the bypass duct 22 between an outer surface of the engine core 11 (e.g. the core casing 11a) and the inner surface of the nacelle 21. The OGV extends between a radially inner tip 58a and a radially outer tip 58b (see FIG. 12C) and has a leading (or upstream) edge and a trailing (or downstream) edge relative to the direction of gas flow B through the bypass duct 22.

An outer wall axis 60 is defined joining the radially outer tip 58b of the trailing edge of the bypass duct outlet guide vane 58 and the rearmost tip 21b of the inner surface of the nacelle 21. The outer wall axis 60 lies in a longitudinal plane containing the centreline 9 of the gas turbine engine. In the described embodiment, the outer wall axis 60 is defined based on fixed nacelle (e.g. fan duct) geometry. The rearmost tip 21b of the inner surface of the nacelle 21 therefore remains in a constant position relative to the OGV. In other embodiments, the gas turbine engine 10 may have a variable area fan nozzle as described above. In such embodiments, the rearmost tip of the inner surface of the nacelle 21 (and so the outer wall axis 60) may be movable during use of the engine. The outer wall axis 60 may be defined based on the position of the rearmost tip 21b of the inner surface of the nacelle during cruise conditions. The cruise conditions may be as described elsewhere herein.

Figure 12B:
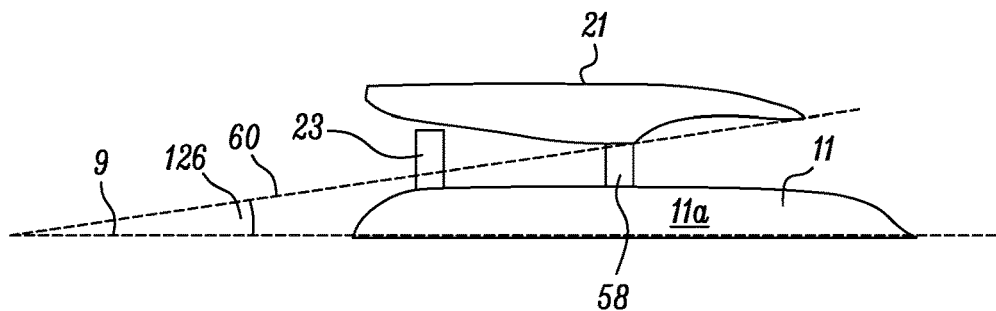
FIG. 12B is a schematic sectional view of a generic gas turbine engine with marked engine dimensions corresponding to those marked in FIG. 12A.
Figure 12C:
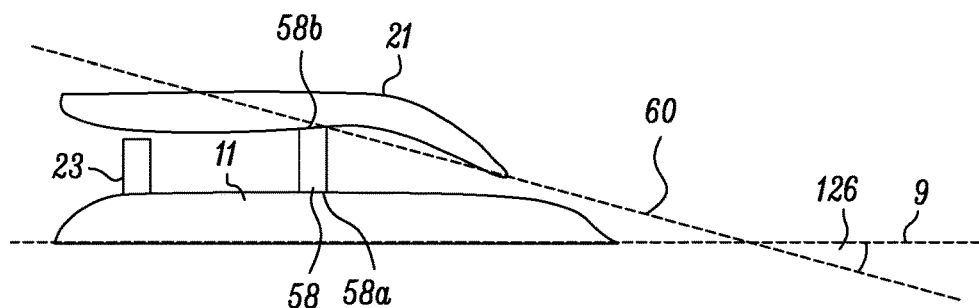
FIG. 12C is a schematic sectional view of a generic gas turbine engine with marked engine dimensions corresponding to another bypass duct wall angle.

The outer bypass duct (BPD) wall angle 126 is defined by the angle between the outer wall axis 60 and the centreline 9 of the engine as illustrated in FIGS. 12A, 12B and 12C. A positive value of the BPD wall angle 126 corresponds to the outer wall axis 60 sloping away from the engine centre line 9 when moving in a rearward direction along the axis, i.e. the rearmost tip of the inner surface of the nacelle 21 is further from the engine centre line 9 than the radially outer tip of the trailing edge of the bypass OGV. A positive BPD wall angle is illustrated in FIGS. 12A and 12B. A negative value of the BPD wall angle corresponds to the outer wall axis 60 sloping towards the engine centreline 9 when moving rearward along the axis. A negative BPD wall angle is illustrated in FIG. 12C. In this case the rearmost tip of the inner surface of the nacelle 21 is closer to the engine centre line 9 than the radially outer tip of the trailing edge of the bypass OGV.

A bypass duct outlet guide vane radius, measured radially between the engine centreline 9 and the radially outer tip 58b of the trailing edge of the bypass OGV, may be in a range from 90 cm to 210 cm. For example, for an engine 10 with a fan tip radius 102 in the range from 110 cm to 150 cm, the bypass duct outlet guide vane radius may be in the range from 90 cm to 150 cm, or more specifically from 110 cm to 135 cm. For an engine 10 with a fan tip radius 102 in the range from 155 cm to 200 cm, the bypass duct outlet guide vane radius may be in the range from 160 cm to 210 cm, or more specifically from 170 cm to 200 cm.

Figure 9A:
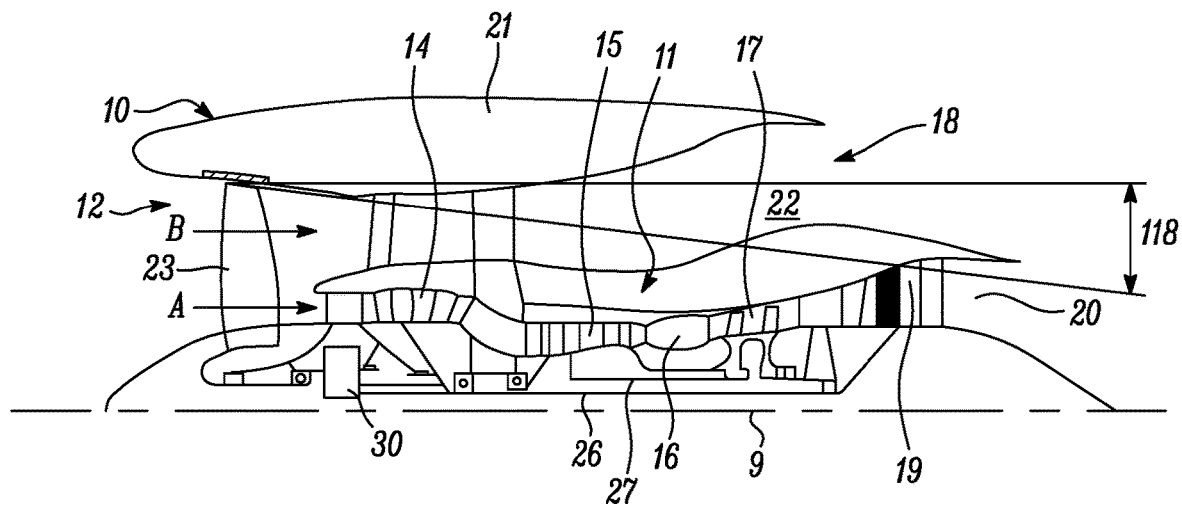
FIG. 9A is a sectional view of the gas turbine engine of FIG. 1 with marked engine dimensions suitable for use in calculating a fan axis angle ratio.
Figure 9B:
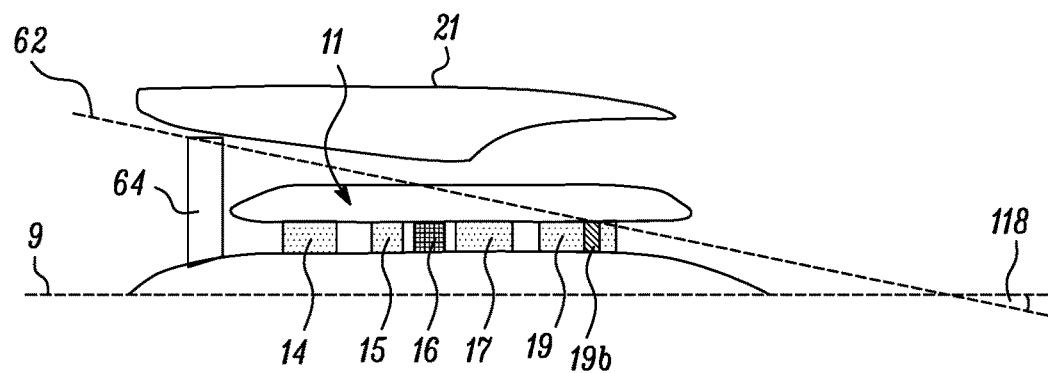
FIG. 9B is a schematic sectional view of a generic gas turbine engine with marked engine dimensions corresponding to those marked in FIG. 9A.

Fan Axis Angle:

Referring to FIGS. 9A and 9B, the gas turbine engine 10 has a fan axis angle 118 related to the angle between the outer radial tip 68 of the fan blades 64 and the outer radial tip 48 of the rotor blades 44 of the lowest pressure stage 19b of the low pressure turbine 19. A fan tip axis 62 lies in a common plane with the engine centreline 9. The fan tip axis 62 joins the radially outer tip 68a of the leading edge 64a of the fan blade 64 and the radially outer tip of the trailing edge of one of the rotor blades 44 of the lowest pressure stage 19b of the low pressure turbine 19.

The fan axis angle 118 is defined as the angle between the fan tip axis 62 and the engine centreline 9 as illustrated in FIG. 9B.

As described elsewhere herein, the rotor blades 44 of the lowest pressure stage 19b of the lowest pressure turbine 19 may be shrouded or unshrouded. If the rotor blades 44 are shrouded, the outer radial tip of the rotor blades is taken to be the underside of the shroud 49 (which provides the edge of the gas-flow annulus). If the rotor blades 44' are unshrouded, it is the blade tips 48' of the rotor 19b'.

Figure 10A:
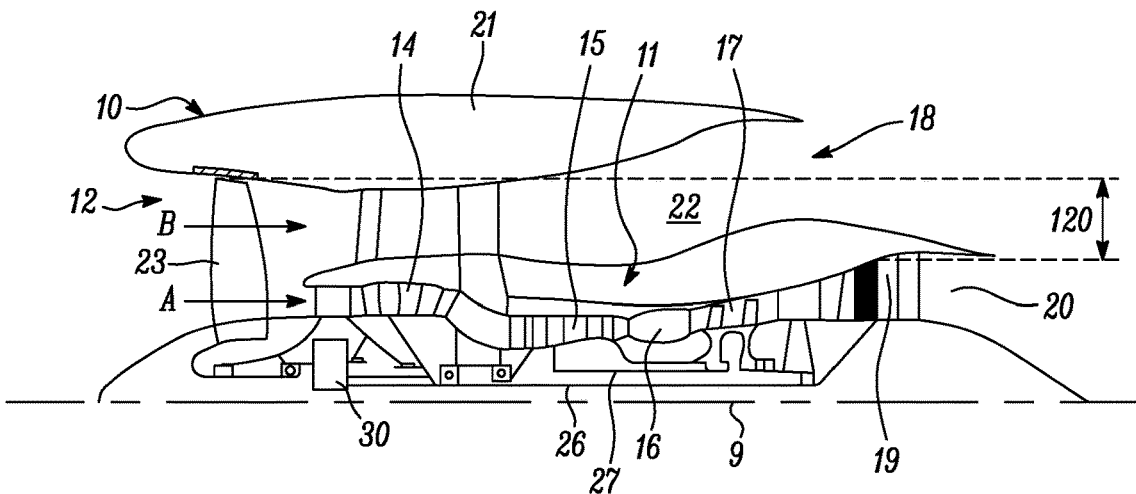
FIG. 10A is a sectional view of the gas turbine engine of FIG. 1 with marked engine dimensions suitable for use in calculating a fan speed to fan-turbine radius difference ratio.
Figure 10B:
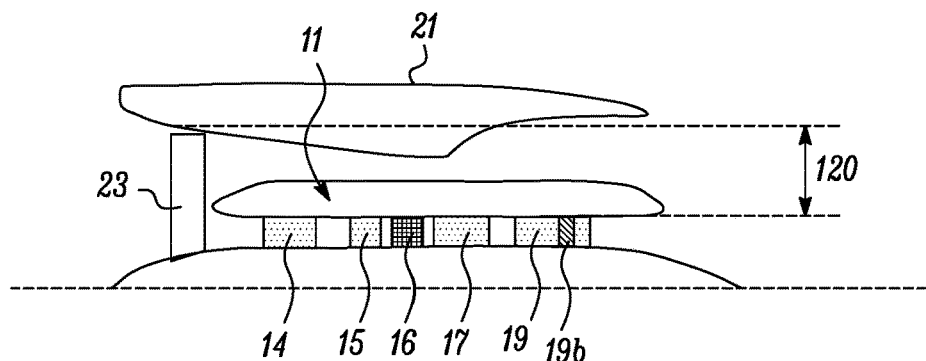
FIG. 10B is a schematic sectional view of a generic gas turbine engine with marked engine dimensions corresponding to those marked in FIG. 10A.

Fan-Turbine Radius Difference:

Referring to FIGS. 10A and 10B, the gas turbine engine 10 has a fan-turbine radius difference 120 defined as a radial distance between: a point of a circle intersecting (e.g. swept by) the radially outer tip 48 of the trailing edge of the rotor blades 44 of the lowest pressure stage 19b of the low pressure turbine 19; and a point on a circle intersecting (e.g. swept by) the radially outer tip 68a of the leading edge 64a of the fan blades 64.

The fan-turbine radius difference 120 may be in a range from 50 cm to 120 cm. The fan-turbine radius difference 120 may be in a range between 55 cm to 85 cm, for example for an engine 10 with a fan tip radius 102 in the range from 110 cm to 150 cm. The fan-turbine radius difference 120 may be in a range between 90 cm to 120 cm, for example for an engine 10 with a fan tip radius 102 in the range from 155 cm to 200 cm.

As described above, the rotor blades 44 of the lowest pressure stage 19b of the lowest pressure turbine 19 may be shrouded or unshrouded. If the rotor blades 44 are shrouded, the outer radial tip of the rotor blades 48 is taken to be the underside of the shroud 49 (the edge of the gas-flow annulus). If the rotor blades 44' are unshrouded, it is the blade tips 48' of the rotor 19b'.

Distance Between Ground Plane and Wing:

In the embodiments being described, the distance 124 is measured with respect to the ground 50, as shown in FIGS. 11A and 11B—a ground plane is defined as the plane 50 on which the aircraft 70 would rest after landing/before take-off—e.g. the surface of a runway or floor of a hangar. The skilled person would appreciate that, in most embodiments, aircraft landing gear would be extended and in contact with the ground plane 50. The vertical distance between the ground 50 and the wing 52 is measured.

As the wing 52 varies in height along the axial direction in the embodiments being described (due to its aerofoil shape), an axial position is selected for this measurement—in the embodiment being described, the axial location of the leading edge 52a of the wing 52 is selected. In particular, the ground to wing distance 124, as defined herein, is the vertical distance between the ground plane 50 and the centre point of the wing's leading edge 52a. The distance 124 between the ground plane 50 and the wing 52 is therefore measured to the centre point 52a of the leading edge 52a of the wing 52.

As the wing 52 varies in height along its length in the embodiment being described, from aircraft 70 to wing tip, a location along the length of the wing 52 is also selected for the measurement. In the embodiment being described, the selected location is directly above the engine centreline 9 (the engine axis 9). The distance 124 between the ground plane 50 and the wing 52 is therefore measured along a line perpendicular to the ground plane 50 and passing through, and in at least this embodiment perpendicular to, an axial centre line of the engine 10.

The skilled person will appreciate that the ground to wing distance 124 may also vary depending on loading of the aircraft 70. As used herein, maximum take-off weight (MTOW) is assumed for the definition of the ground to wing distance 124.

Maximum Take-Off Weight:

The MTOW of an aircraft 70 may also be referred to as maximum gross take-off weight (MGTOW) or maximum take-off mass (MTOM) of an aircraft 70. The MTOW is the maximum weight at which a pilot is allowed to attempt to take off, due to structural or other limitations. The skilled person will appreciate that maximum Take-Off Weight (MTOW) for an aircraft 70 is a standard parameter issued with an aircraft's certification, and that the MTOW can therefore be trivially identified for any commercial aircraft 70, and can be determined according to standard practices for any aircraft 70.

Downstream Blockage:

Downstream blockage provides a measure of how much of the space beneath a wing 52 of an aircraft 70 is taken up by the gas turbine engine 10. In the embodiments being described, the downstream blockage is measured with respect to the ground plane 50. Herein, a downstream blockage ratio is defined as:

$$\frac{\text{the turbine diameter (122) at an axial location of the lowest pressure rotor stage (19b)}}{\text{distance between ground plane and wing (124)}}$$

The turbine diameter 122 and distance 124 between the ground plane 50 and wing 52 are as defined above.

Quasi Non-Dimensional Mass Flow Rate (Q):

A quasi non-dimensional mass flow rate Q is defined as:

$$Q = W \frac{\sqrt{T0}}{P0 \cdot A_{flow}}.$$

Where:
W is mass flow rate through the fan in Kg/s;
T0 is average stagnation temperature of the air at the fan face in Kelvin;
P0 is average stagnation pressure of the air at the fan face in Pa; and
$A_{flow}$ is the flow area of the fan in m², as defined above.
The parameters W, T0, P0 and $A_{flow}$ are all shown schematically in FIG. 14A.

At cruise conditions of the gas turbine engine 10 (which may be as defined elsewhere herein), the value of Q is, for example, in the range of from 0.029 to 0.036 $Kgs^{-1}N^{-1}K^{1/2}$. Cruise conditions may be as defined elsewhere herein.

Figure 14A:
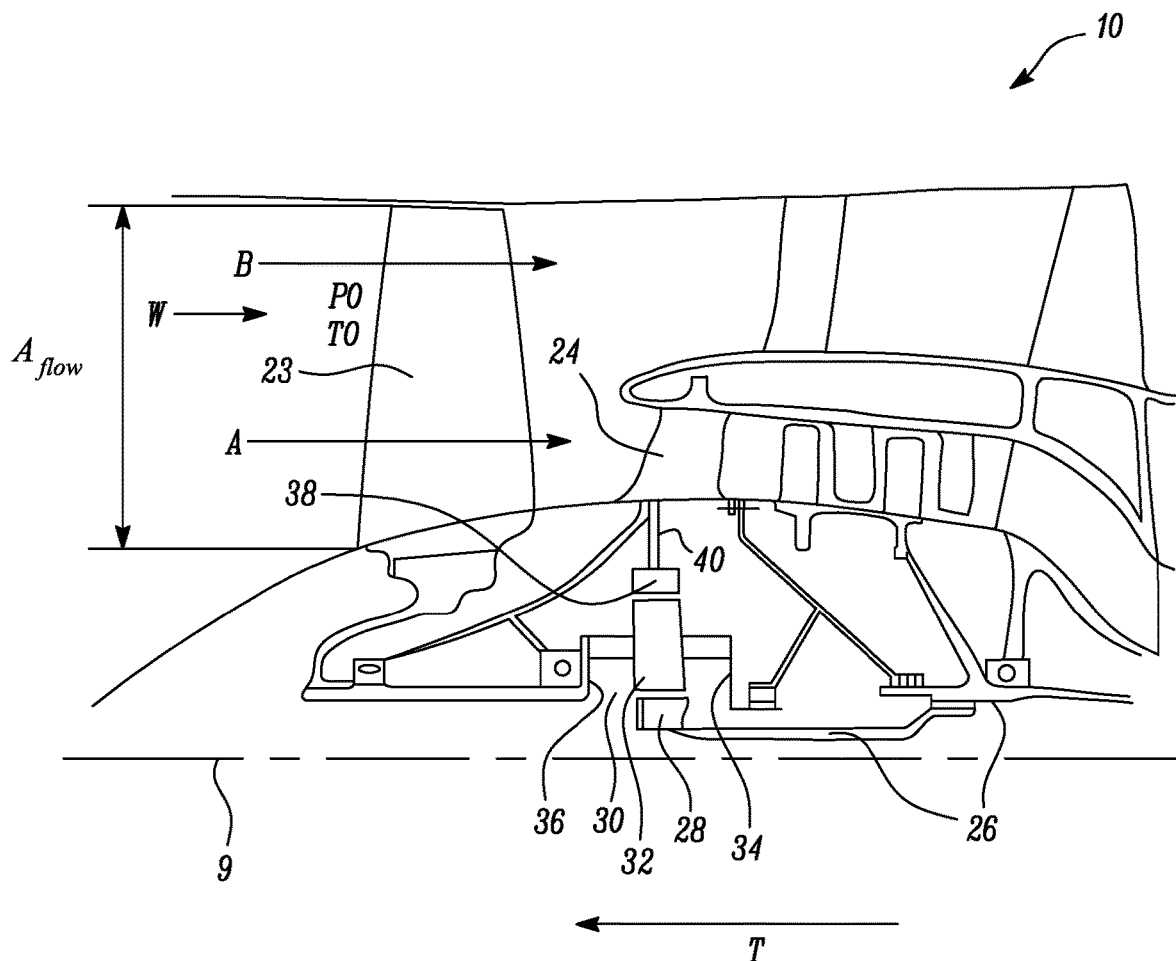
FIG. 14A is a schematic sectional view of the gas turbine engine of FIG. 1 with marked engine dimensions suitable for use in calculating a quasi non-dimensional mass flow rate (Q)

Also at cruise conditions, the gas turbine engine 10 generates a thrust T (which may be referred to as a cruise thrust), shown schematically in FIG. 14A. This thrust may be equal to the thrust required to maintain the cruise forward speed of an aircraft 70 to which the gas turbine engine 10 is attached, divided by the number of engines 10 provided to the aircraft.

At cruise conditions, the thrust, T, divided by the mass flow rate, W, through the engine (which is equal to the mass flow rate W at the fan inlet) is, for example, in the range of from 70 $Nkg^{-1}s$ to 110 $Nkg^{-1}s$.

Pressure Ratio of Bypass Exhaust Nozzle:

The bypass exhaust nozzle 18 may also be referred to as the fan nozzle 18. The skilled person will appreciate that a nozzle pressure ratio (NPR) is generally defined as:

$$\frac{\text{total pressure at nozzle exit}}{\text{ambient pressure of surroundings}}$$

The pressure ratio of the bypass exhaust nozzle 18 is therefore:

$$\frac{\text{total pressure at bypass nozzle exit}}{\text{ambient pressure}}$$

The location of the exit from the bypass exhaust nozzle 18 is as described above, and as shown in FIGS. 13A and 13B. In particular, an exit plane 54 is defined at the exit of the bypass exhaust nozzle 18. The exit plane 54 is defined as the annular, radial plane extending across the bypass exhaust nozzle 18 at the axial location of the rearward tip of the nacelle 21. The total pressure at the bypass nozzle exit, $P_{BE}$, is defined at this plane—i.e. the sum of the static and dynamic pressures at the nozzle exit 54 of the bypass exhaust nozzle 18 is determined as the total pressure $P_{BE}$.

The skilled person would appreciate that pressures throughout the engine 10 may be modelled from aerodynamic principles, and/or one or more pressure sensors (e.g. in the form of a pressure rake) may be located within the bypass nozzle 18 or elsewhere in the bypass duct 22 to record actual local pressures, and the pressure at the bypass nozzle exit plane 54 may be determined from those measurements.

A known value based on aircraft altitude may be used for the ambient pressure, $P_{Amb}$.

The total pressure used to calculate the bypass exhaust nozzle pressure ratio is the total pressure under cruise conditions, as defined above. Cruise conditions may be as defined elsewhere herein.

Pressure Ratio of Core Nozzle:

The skilled person will appreciate that a nozzle pressure ratio (NPR) is defined as:

$$\frac{\text{total pressure at nozzle exit}}{\text{ambient pressure of surroundings}}$$

The pressure ratio of the core nozzle 20 is therefore:

$$\frac{\text{total pressure at core nozzle exit}}{\text{ambient pressure}}$$

Figure 13A:
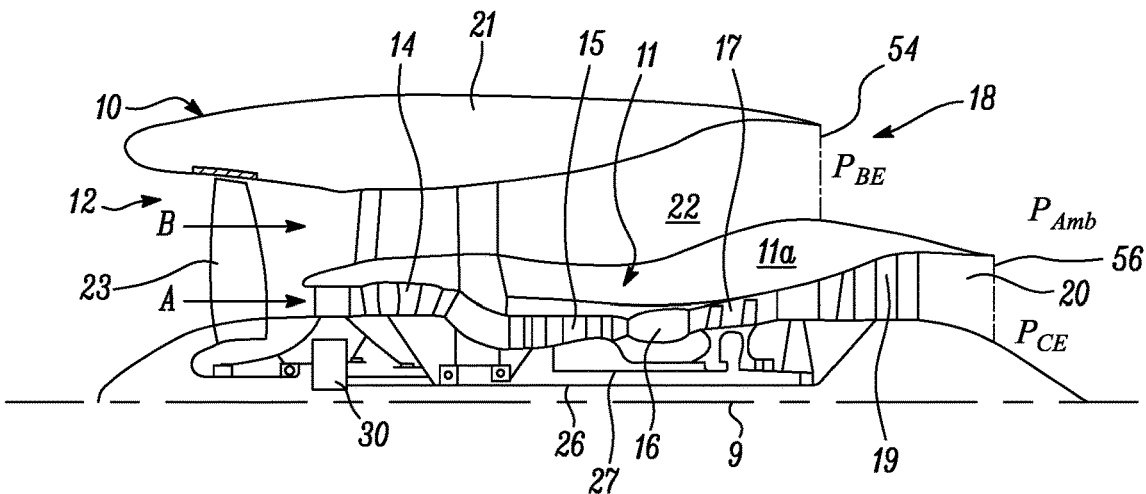
FIG. 13A is a sectional view of the gas turbine engine of FIG. 1 with marked engine dimensions suitable for use in calculating a bypass to core ratio.

The location of the exit from the core nozzle 20 is at the axial position defined by the rearmost tip of the core casing 11a/inner fixed structure 11a, as shown in FIG. 13A. The location of the exit from the core exhaust nozzle 20 is as described above, and as shown in FIGS. 13A and 13B. In particular, an exit plane 56 is defined at the exit of the core exhaust nozzle 20. The exit plane 56 is defined as the annular, radial plane extending across the core exhaust nozzle 20 at the axial location of the rearward tip of the core casing 11a. The total pressure at the core nozzle exit, $P_{CE}$, is defined at this plane—i.e. the sum of the static and dynamic pressures at the nozzle exit 56 of the core exhaust nozzle 20 is determined as the total pressure $P_{CE}$.

In the embodiment being described, the exit plane 56 for the core nozzle 20 is rearward of the exit plane 54 of the bypass exhaust nozzle 18, as the core casing 11a extends further rearward than the nacelle 21. In alternative embodiments, the exit planes 56, 54 may be closer, may be coplanar, or the order of the planes may be reversed.

The skilled person would appreciate that pressures throughout the engine 10 may be modelled from aerodynamic principles, and/or one or more pressure sensors (e.g. in the form of a pressure rake) may be located within the core nozzle 20 to record actual local pressures, and the pressure at the core nozzle exit plane 56 may be determined from those measurements.

A known value based on aircraft altitude may be used for the ambient pressure, $P_{Amb}$. The same value may be used as for the pressure ratio of the bypass exhaust nozzle 18. The skilled person would appreciate that the same value for ambient pressure is generally used for both ratios.

As referred to herein, the pressure at a plane (for example total pressure at bypass nozzle exit or total pressure at core nozzle exit) may be taken as the mean value over that plane.

The total pressure used to calculate the core exhaust nozzle pressure ratio is the total pressure under cruise conditions, as defined above. Cruise conditions may be as defined elsewhere herein.

Maximum Take-Off Fan Rotational Speed

The rotational speed of the fan 23 may vary during use of the gas turbine engine 10. The fan 23 may have a maximum take-off (MTO) rotational speed (e.g. in rpm) corresponding to the maximum speed at which it rotates during take-off of an aircraft 70 to which the gas turbine engine 10 is mounted.

The maximum take-off rotational fan speed may be in a range between 1450 rpm to 3020 rpm. For an engine 10 with a fan tip radius 102 in the range from 110 cm to 150 cm, the maximum take-off rotational fan speed may be in a range between 2100 rpm to 3020 rpm or 1970 rpm to 3020 rpm. For an engine 10 with a fan tip radius 102 in the range from 155 cm to 200 cm, the maximum take-off rotational fan speed may be in a range between 1450 rpm to 1910 rpm.

It has been found that the parameters defined above may be combined in any one or more of the following ratios in order to provide an improved gas turbine engine:

Engine Area Ratio

An engine area ratio may be defined as:

$$\frac{\text{the fan face area } (A_{fan\ face})}{\text{the turbine diameter (122)} \times \text{the core length (104)}}$$

The turbine diameter 122 as used in this ratio is the diameter 122 of the turbine 19 at the axial position of the lowest pressure rotor stage 19b, as defined above. The skilled person would appreciate that the lowest pressure rotor stage 19b is the rearmost rotor stage of the turbine 19, and that the rearmost rotor stage 19b of the turbine 19 would be referred to as the lowest pressure rotor stage of the turbine 19 even when the engine 10 is not in use; i.e. even when pressure does not vary substantially across the engine.

The fan face area ($A_{fan\ face}$ as defined above) may be thought of as providing an indication of an area of the engine 10 in a radial plane. The turbine diameter 122 multiplied by the core length 104 may be thought of as an effective area of the engine core 11 in an axial plane.

Figure 4C:
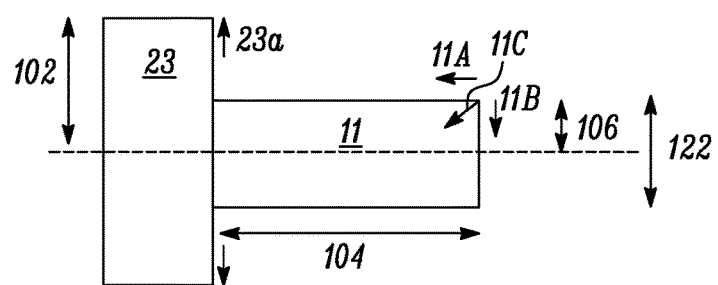
FIG. 4C is a schematic sectional view of a generic engine core and fan with marked engine dimensions corresponding to those marked in FIG. 4A.

The skilled person would appreciate that having a larger fan tip radius 102, and therefore a larger fan face area, may improve propulsive efficiency, for example for a given thrust level. An increase of fan radius is illustrated by arrows 23a in FIG. 4C. Such an increase would increase the engine area ratio if the engine core 11 were unchanged, or have no effect on the engine area ratio were the core 11 scaled to match the larger fan 23. However, the skilled person would appreciate that an engine 10 simply scaled up for a larger fan 23 could potentially increase drag and difficulty of installation, for example increasing downstream blockage.

In the embodiments being described, the engine core 11 is made smaller than it would be if simply scaled up for a larger fan 23, so reducing the engine area ratio. The skilled person would appreciate that reducing the core size may comprise reducing the core length 104, as illustrated by arrow 11A in FIG. 4C, reducing the turbine diameter 122, as illustrated by arrow 11B in FIG. 4C, or reducing both, as illustrated by arrow 11C in FIG. 4C. The skilled person will appreciate that core length 104 and diameter 122 may be traded off against each other to optimally reduce engine core size given various constraints.

In the embodiment being described, both core length 104 and turbine diameter 122 are reduced relative to fan radius 102 as the size of the fan 23 is increased, as compared to known engines. The engine area ratio is therefore higher than that of current aircraft engines.

In the embodiment being described, the engine area ratio is in the range from 1.7 to 3, more particularly in the range from 1.70 to 3.00. In the embodiment being described, the engine area ratio is greater than 1.70. In the embodiment being described, the engine area ratio is in the range from 1.9 to 3, more particularly in the range from 2 to 3, and more particularly in the range from 2.1 to 2.5. In various embodiments, the fan tip radius 102 is in the range from 110 cm to 150 cm, and the engine area ratio is in the range from 1.7 to 2.7. In alternative embodiments, the fan tip radius 102 is in the range from 155 cm to 200 cm, and optionally wherein the engine area ratio is in the range from 2 to 3. In the embodiment being described with respect to FIG. 4A, the fan tip radius 102 is greater than 170 cm.

In the embodiment being described, the turbine diameter 122 varies along the length of the turbine 19. In the embodiment being described, the turbine diameter 122 at the lowest pressure rotor stage 19b has a value in one or more of the absolute ranges defined above for turbine diameter.

In the embodiment being described, the ratio of the fan tip radius 102 to the turbine diameter 122 at the lowest pressure rotor stage 19b is in the range of 0.8 to 2.1, inclusive.

In the embodiment being described, the engine core length 104 has a value in one or more of the absolute ranges defined above for core length.

In the embodiment being described, the ratio of the fan tip radius 102 to the core length 104 is in the range of 0.3 to 1.

In the embodiment being described, the gas turbine engine 10 comprises a gearbox 30 connected between the core shaft 26 and the fan 23, the gearbox 30 being arranged to receive an input from the core shaft 26 and to provide an output to drive the fan 23 at a lower rotational speed than the core shaft 26. In alternative embodiments, there may be no gearbox. In the embodiment being described, the gearbox has a gear ratio in the range of from 3 to 5, and more particularly in the range of from 3.2 to 3.8.

In the embodiment being described, the turbine 19 is a first turbine 19 and the engine 10 comprises a second turbine 17 arranged to rotate at a higher rotational speed. In alternative embodiments, only one turbine 19, or more than two turbines 17, 19 may be present.

In the embodiment being described, a fan axis angle 118 is defined as described above. The fan axis angle 118 is defined as the angle between the fan tip axis 62 and the centreline 9 of the engine as shown in FIGS. 9A and 9B. A positive value of the fan axis angle 118 corresponds to the fan tip axis 62 sloping towards the engine centreline 9 when moving in a rearward direction along the axis as illustrated in FIG. 9B, i.e. the radially outer tip 68a of the leading edge 64a the plurality of fan blades 64 is further from the engine centreline 9 compared to the radially outer tip of the trailing edge of the rotor blades 19a of the lowest pressure stage of the turbine 19.

In the embodiment being described, the fan axis angle is in a range between 10 to 20 degrees. By providing a fan axis angle 118 in this range the gas turbine engine 10 may have a large fan diameter to provide improved propulsive efficiency, whilst also having a relatively small diameter core 11. In the embodiment being described, the fan axis angle 118 is in a range from 12 degrees to 16 degrees, more specifically from 13 or 14 to 15 degrees, and particularly around 14.5 degrees.

Bypass to Core Ratio

A bypass to core ratio may be defined as:

$$\frac{\text{bypass exhaust nozzle pressure ratio}}{\text{core exhaust nozzle pressure ratio}}$$

Figure 13B:
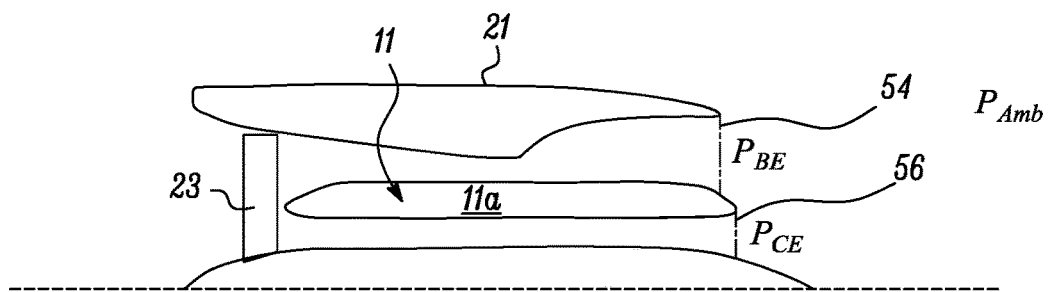
FIG. 13B is a schematic sectional view of a generic gas turbine engine with marked engine dimensions corresponding to those marked in FIG. 13A.

In the embodiment being described with respect to FIGS. 13A and 13B, the bypass to core ratio is configured to be in the range from 1.1 to 2 under aircraft cruise conditions, and more specifically in the range from 1.1 to 2.0 and more specifically from 1.10 to 2.00.

In alternative or additional embodiments, the bypass to core ratio may fall within one or more of the following ranges under aircraft cruise conditions: from 1.10 to 2.00; above 1.15; and/or from 1.2 to 1.5. In embodiments with an engine 10 with a fan tip radius 102 in the range from 110 cm to 150 cm, the bypass to core ratio may be in the range from 1.0 to 1.4 or from 1.1 to 1.3. In embodiments with an engine 10 with a fan tip radius 102 in the range from 155 cm to 200 cm, the bypass to core ratio may be in the range from 1.3 to 1.6.

In the embodiment being described, the bypass to core ratio can be simplified to the below, as described above, which may be referred to as an extraction ratio:

$$\frac{\text{total pressure at bypass exhaust nozzle exit (54)}}{\text{total pressure at core exhaust nozzle exit (56)}}$$

The total pressures at the bypass nozzle exit 54 and core nozzle exit 56 may be defined and determined as described above.

In the embodiment being described, the engine core 11 comprises a casing 11a located radially between the core nozzle 20 and the bypass duct 22. In the embodiment being described, an outer surface of the casing 11a provides an inner surface of the bypass exhaust duct 22 and bypass nozzle 18, and an inner surface of the casing 11a provides an outer surface of the core nozzle 20.

In the embodiment being described, the bypass ratio at cruise conditions is in the range of from 11 to 20, and more particularly in the range from 13 to 20 or 14 to 20.

In the embodiment being described, the core nozzle exit is defined as an exit plane 56 of the core exhaust nozzle 20 (for the purpose of defining pressures), the exit plane 56 extending from a rearmost point of the engine core casing 11a towards a centreline of the engine 10. In the embodiment being described, the exit plane 56 is defined as a radial plane, perpendicular to an axis of the engine 10, for the purpose of defining pressures.

In the embodiment being described, the bypass nozzle exit is defined as an exit plane 54 of the bypass duct exhaust nozzle 18 (for the purpose of defining pressures), the exit plane 54 extending from a rearmost point of the nacelle 21 towards a centreline of the engine 10. In the embodiment being described, the exit plane 54 is defined as a radial plane, perpendicular to an axis of the engine 10, for the purpose of defining pressures.

In the embodiment being described, the diameter of the bypass exhaust nozzle 18 at the bypass exhaust nozzle exit 54 has a value in one or more of the absolute ranges defined above for bypass exhaust nozzle diameter.

In the embodiment being described, the flow area $A_b$ of the bypass exhaust nozzle 18 at the bypass exhaust nozzle exit 54 is in the range from 2 m² to 6 m², and more particularly from 1.9 m² to 5.8 m². In the embodiment being described, the flow area $A_c$ of the core exhaust nozzle 20 at the core exhaust nozzle exit 56 is in the range from 0.4 m² to 1.3 m². In the embodiment being described, the flow areas are measured in a plane at an angle to the radial exit planes 54, 56. In alternative embodiments, the flow areas $A_b$, $A_c$ may or may not be in the exit planes 54, 56 depending on the angle of the minimum distance $R_b$, $R_c$ as discussed above with respect to FIG. 3B.

In the embodiment being described, a ratio of bypass exhaust nozzle 18 flow area at the bypass exhaust nozzle exit 54 to flow area of the core exhaust nozzle 20 at the core exhaust nozzle exit 56 is in the range from 4 to 6, and more particularly in the range from 5 to 6.

In the embodiment being described, the bypass exhaust nozzle 18 and the core exhaust nozzle 20 are both convergent nozzles. In alternative embodiments, one or both of the bypass exhaust nozzle 18 and the core exhaust nozzle 20 may be convergent-divergent nozzles.

In the embodiment being described, the gas turbine engine 10 further comprises a gearbox 30 connected between the core shaft 26 and the fan 23, the gearbox 30 being arranged to receive an input from the core shaft 26 and provide an output to drive the fan at a lower rotational speed than the core shaft 26. In the embodiment being described, the gearbox 30 has a gear ratio in the range of from 3 to 5, and more particularly of 3.2 to 3.8. In alternative embodiments, no gearbox may be provided or the gear ratio may differ.

In the embodiment being described, the fan tip radius 102 is greater than 170 cm. In alternative or additional embodiments, the fan tip radius 102 may be greater than or on the order of any of: 110 cm, 115 cm, 120 cm, 125 cm, 130 cm, 135 cm, 140 cm, 145 cm, 150 cm, 155 cm, 160 cm, 165 cm, 170 cm, 175 cm, 180 cm, 185 cm, 190 cm or 195 cm.

In the embodiment being described, the fan 23 is particularly large; the skilled person would appreciate that the larger fan 23 may facilitate the larger pressure difference between the bypass and core exhaust nozzles 18, 20, provided that other engine parameters are adjusted appropriately. In alternative embodiments, the fan 23 may not be relatively large and other engine parameters may be adjusted to provide the desired ratio of pressures.

In the embodiment being described, the turbine 19 is a first turbine 19 and the engine 10 comprises a second turbine 17 arranged to rotate at a higher rotational speed. In alternative or additional embodiments, the engine 10 may only have a single turbine 19, or may have more than two turbines 17, 19, for example having three or four turbines.

Figure 13C:
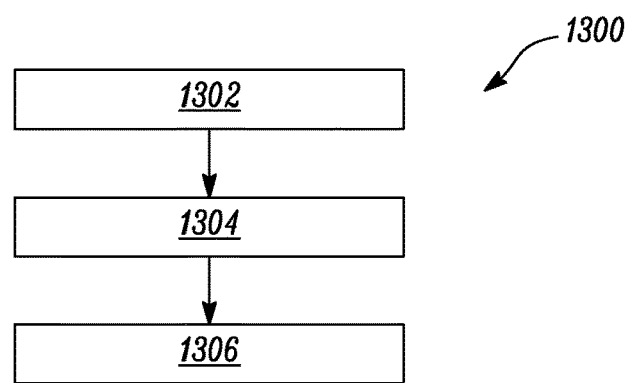
FIG. 13C illustrates a method of an embodiment.

FIG. 13C illustrates a method 1300 of operating an aircraft 70 comprising a gas turbine engine 10 as described above. The method comprises taking off 1302, reaching cruise conditions 1304, and controlling 1306 the aircraft 70 such that the bypass to core ratio remains in the range from 1.1 to 2 during cruise.

The bypass to core ratio may more specifically be within any of the ranges defined above. The method 1300 may include controlling the gas turbine engine 10 according to any of the other parameters defined herein.

Engine Length to CoG Ratio

A centre of gravity (CoG) position ratio may be defined as:
the centre of gravity position (108)/the engine length (110).

The engine length 110 may be measured as the axial distance between a forward region of the fan 23 and a rearward region of the lowest pressure turbine 19. In the embodiment being described, the engine length 110 is measured as the axial distance between: the intersection of the leading edge 64a of one of the plurality of fan blades 64 and the hub 66; and a mean radius point of the trailing edge of one of the rotor blades 44 of the lowest pressure turbine stage of the turbine 19b as defined above. The mean radius point is the midpoint between a 0% span position and a 100% span position of the rotor blade 44.

In the embodiment being described the gas turbine engine 10 has a single turbine 19 referred to as the lowest pressure turbine 19. In other embodiments, a plurality of turbines may be provided. The engine length 110 is measured to a rotor of the lowest pressure stage 19b of the lowest pressure turbine 19 of the turbines provided, and so corresponds to the most rearward turbine rotor in the direction of gas flow.

In the embodiment being described, the position of centre of gravity 108 is measured as the axial distance between the intersection of the leading edge 64a of one of the plurality of fan blades 64 and the hub 66; and the centre of gravity of the gas turbine engine 10 as defined above.

If a larger fan radius 102 is used, for example to improve propulsive efficiency, such an increase may have an effect on the relative position of the centre of gravity of the engine 10 should the engine components simply be scaled proportionally with the fan radius 102. This may cause problems with mounting of the engine 10 to an aircraft wing 52 as the engine centre of gravity may be moved longitudinally away from the wing 52. This may increase the load applied to a mounting pylon 53 connecting the engine 10 and the wing 52.

In the embodiment shown in FIGS. 5A and 5B the centre of gravity position ratio is in a range from 0.43 to 0.6. The skilled person will appreciate that the embodiments shown in FIGS. 5A and 5B are provided by way of examples falling within this range. More specifically, the centre of gravity position ratio may be in a range from 0.45 to 0.6 and more specifically from 0.46 to 0.6. Yet more specifically, the centre of gravity position ratio may be in a range from 0.47 to 0.49 or may be in range from 0.45 to 0.48. The ranges in the previous sentence may, for example, be for a gas turbine engine 10 with a fan tip radius 102 in the range from 110 cm to 150 cm or from 155 cm to 200 cm respectively.

The absolute values of the engine length 110 and centre of gravity position 108 may be as defined elsewhere herein.

Defining the centre of gravity position ratio within the above ranges may allow the centre of gravity to be located further rearwards compared to the overall length of the engine 10. This may allow the centre of gravity to be located at a position closer to a front mounting position 53a of the engine 10 (i.e. the position of a forward connection to a pylon 53; in the embodiment being described the engine 10 is arranged to be connected to a pylon 53 in two places, comprising a forward engine mount 53a connecting the nacelle 21 to the pylon 53 and a rearward engine mount 53b connecting the core casing 11a to the pylon 53. The skilled person would appreciate that more, fewer, and/or different mounting positions may be used in other embodiments). This may help to reduce or minimise mounting loads compared to centre of gravity position ratios found in known gas turbine engines or which would be achieved with a proportional scaling of engine architecture. Other advantageous effects such as reducing bending of the engine core 11 and deflection of the interconnecting shafts within the core may also be provided by defining the centre of gravity position ratio as defined above.

By defining the centre of gravity position ratio within the range defined above the centre of gravity may be moved closer to a support structure (such as the pylon 53 of the embodiment being described) linking the engine core 11 and the nacelle 21. In the described embodiment, the centre of gravity may be moved to a position in line (or close to in line) to the fixed structure 24. This may reduce the force transmitted by the fixed structure 24 to support the engine core 11.

A fan speed to centre of gravity ratio of:
the centre of gravity position ratio×maximum take off rotational fan speed may be in a range from 600 rpm to 1350 rpm., and more specifically from 650 rpm to 1276 rpm. For example for an engine 10 with a fan tip radius 102 in the range from 110 cm to 150 cm, the fan speed to centre of gravity ratio may be 925 rpm to 1350 rpm. For an engine 10 with a fan tip radius 102 in the range from 155 cm to 200 cm, the fan speed to centre of gravity ratio may be 650 rpm to 910 rpm.

The maximum take-off rotational fan speed may be as defined elsewhere herein.

In the embodiment being described, the gas turbine engine 10 further comprises a gearbox 30 connected between the core shaft 26 and the fan 23, the gearbox 30 being arranged to receive an input from the core shaft 26 and providing an output to drive the fan at a lower rotational speed than the core shaft 26. In alternative embodiments, no gearbox may be provided.

Figure 5C:
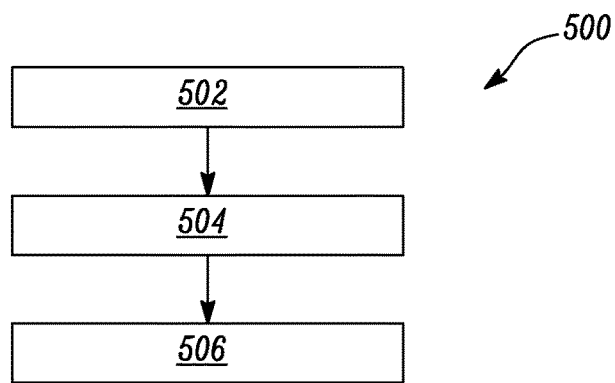
FIG. 5C illustrates a method of an embodiment.

FIG. 5C illustrates a method 500 of operating an aircraft 70 comprising a gas turbine engine 10 as described above.

The method comprises taking off 502, reaching cruise conditions 504, and controlling 506 the aircraft 70 such that the centre of gravity position ratio is in a range from 0.43 to 0.6, and using the engine to provide thrust to the aircraft for take-off so that during take-off the fan speed to centre of gravity ratio has a maximum value in a range as described and/or claimed herein, for example from 600 rpm to 1350 rpm.

The centre of gravity position ratio and/or the fan speed to centre of gravity ratio may more specifically be within any of the ranges defined above (e.g. fan speed to centre of gravity ratio of 650 rpm to 1350 rpm). The method 500 may include controlling the gas turbine engine 10 according to any of the other parameters defined herein.

Gearbox Location to Engine Length Ratio

A gearbox location ratio may be defined as:
gearbox location (112)/engine length (110)

Figure 6A:
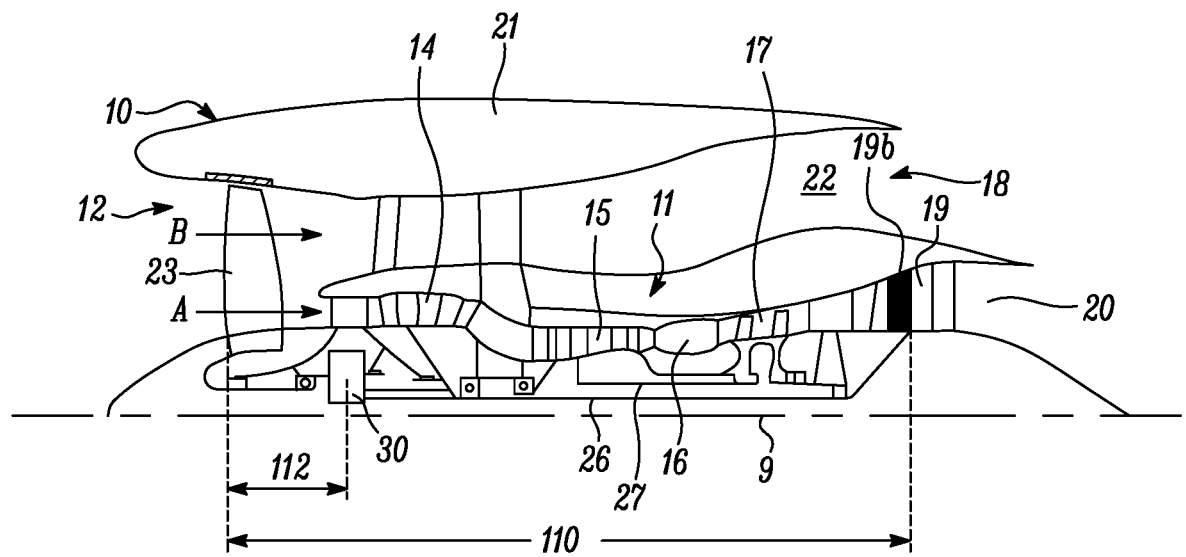
FIG. 6A is a sectional view of the gas turbine engine of FIG. 1 with marked engine dimensions suitable for use in calculating a gearbox location to engine length ratio.
Figure 6B:
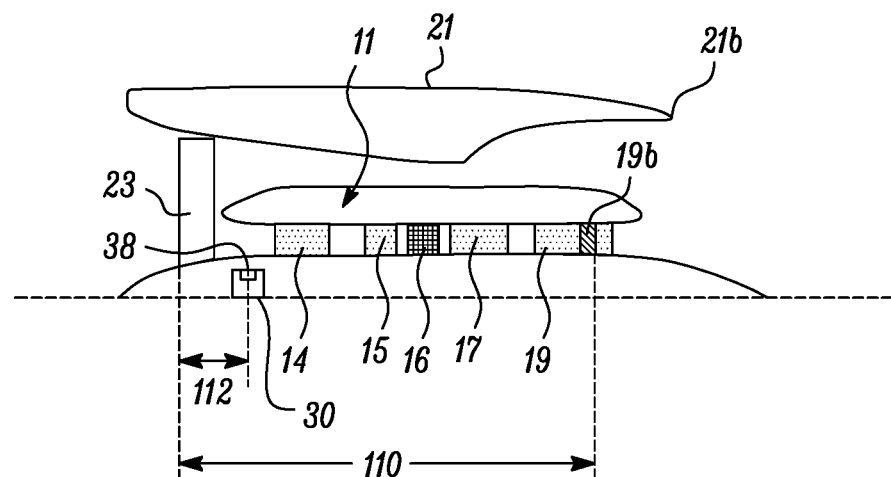
FIG. 6B is a schematic sectional view of a generic gas turbine engine with marked engine dimensions corresponding to those marked in FIG. 6A.

The engine length 110 may be measured as the axial distance between a forward region of the fan 23 and a rearward region of the lowest pressure turbine 19 (see FIGS. 6A and 6B).

In the embodiment being described, the engine length 110 is measured as the axial distance between: the intersection of the leading edge 64a of one of the plurality of fan blades 64 and the hub 64; and a mean radius point of the trailing edge of one of the rotor blades 44 of the lowest pressure turbine stage 19b of the lowest pressure turbine 19 as defined above. The mean radius point is the midpoint between a 0% span position and a 100% span position of the rotor blade 44.

In the embodiment being described the gas turbine engine 10 has a single turbine 19 referred to as the lowest pressure turbine. In other embodiments, a plurality of turbines may be provided. The engine length 110 is measured to a rotor of the lowest pressure stage 19b of the lowest pressure turbine 19 of the turbines provided, and so corresponds to the most rearward turbine rotor in the direction of gas flow.

In the embodiment being described the gearbox location 112 is measured as the axial distance between: the intersection of a leading edge 64a of one of the fan blades 64 and the hub 66; and a radial plane intersecting the axial centre point of the ring gear 38 of the gearbox 30 as defined above.

The gearbox 30 may contribute a large amount of the total mass of the engine 10. Its position along the length of the engine 10 may therefore have a significant effect on the location of the centre of gravity. Should the components of the engine be scaled proportionally with an increased fan size the relative position of the gearbox 30 may not provide a suitable centre of gravity position 108 to allow efficient mounting of the engine 10 to an aircraft wing 52.

In the embodiment shown in FIGS. 6A and 6B the gearbox location ratio is in a range from 0.19 to 0.45. The skilled person will appreciate that the embodiments shown in FIGS. 6A and 6B are provided by way of examples falling within this range. In one embodiment, the gearbox location ratio may be in a range from 0.19 to 0.3, and more specifically may be in a range from 0.19 to 0.25 or from 0.19 to 0.23. In one embodiment, the gearbox location ratio may be in a range from 0.19 to 0.23; this may be, for example, for an engine 10 with a fan tip radius 102 in the range from 110 cm to 150 cm. In another embodiment, the gearbox location ratio may be equal to or around 0.23; for example, in the range from 0.20 to 0.25—this may be, for example, for an engine with a fan tip radius 102 in the range from 155 cm to 200 cm.

The absolute values of the gearbox location 112 and engine length 110 may be as defined elsewhere herein.

Defining the gearbox location ratio in the ranges above may allow or facilitate control of the centre of gravity and assist engine mounting. A gearbox location ratio within the above range may cause an overall engine centre of gravity to be moved rearwards within the engine 10. This may allow the centre of gravity to be moved closer to the front mounting position 53a of the engine 10, and reduce front mounting loads compared to known gas turbine engines 10 or which would be achieved with a proportional scaling of engine architecture. As already discussed, controlling the position of the centre of gravity in this way may also reduce bending of the engine core 11 and deflection of the core shaft 26.

The choice of material from which the fan blades 64 are made may have an impact on the choice of gearbox location ratio. In the described embodiment, the fan blades comprise a main body portion and a leading edge portion. In embodiments where the main body portion of the fan blades 64 is formed at least partly from a composite material the gearbox location may be in a range between 50 cm to 110 cm and more specifically in a range between 80 cm to 110 cm. The gearbox location ratio may be equal to or around 0.23 (e.g. in the range from 0.20 to 0.25) where composite fan blades are used—this may be for an engine with a fan tip radius in the range from 155 cm to 200 cm.

In other embodiments, the fan blades 64 may be formed at least partly from a metal or metal alloy. In one embodiment, the main body portion is formed from a metal alloy. The metal alloy may be, for example, aluminium-lithium alloy. In such embodiments the gearbox location may be in a range between 50 and 110 cm and more specifically may be in a range between 50 cm and 80 cm. The gearbox location ratio may be in a range from 0.19 to 0.23 where metallic fan blades are used. This may be, for example, for an engine with a fan tip radius in the range from 110 cm to 150 cm.

Outer Bypass to Fan Ratio

An outer bypass to fan ratio may be defined as:

$$\frac{\text{the outer radius (114) of the bypass exhaust nozzle (18)}}{\text{the fan tip radius (102)}}$$

In the embodiments being described, the outer bypass to fan ratio is in the range from 0.6 to 1.05, and more particularly from 0.65 to 1.00. In various alternative embodiments, the outer bypass to fan ratio may be lower than 1.05, optionally lower than 1.02, and further optionally lower than 1.00.

The fan tip radius 102 and the outer radius 114 of the bypass exhaust nozzle 18 are both as defined above—each radius is measured in a radial plane, perpendicular to the axis of the engine 10. In embodiments with a fan tip radius 102 in the range from 110 cm to 150 cm, the outer bypass to fan ratio may be in the range from 0.95 to 1, and more particularly 0.96 to 0.98. In embodiments with a fan tip radius 102 in the range from 155 cm to 200 cm, the outer bypass to fan ratio may be in the range from 0.91 to 0.98, optionally 0.94 to 0.96.

In the embodiment being described, the engine 10 comprises a nacelle 21 and the fan tip radius 102 is approximately equal to the inner radius of the nacelle 21 adjacent the fan (in a forward region of the engine 10). The outer radius 114 of the bypass exhaust nozzle 18 is equivalent to the inner radius of the nacelle 21 at the rearmost tip 21b of the nacelle 21 (in a rearward region of the engine 10). The outer bypass to fan ratio therefore provides a measure of engine size variation from front to back.

Figure 8A:
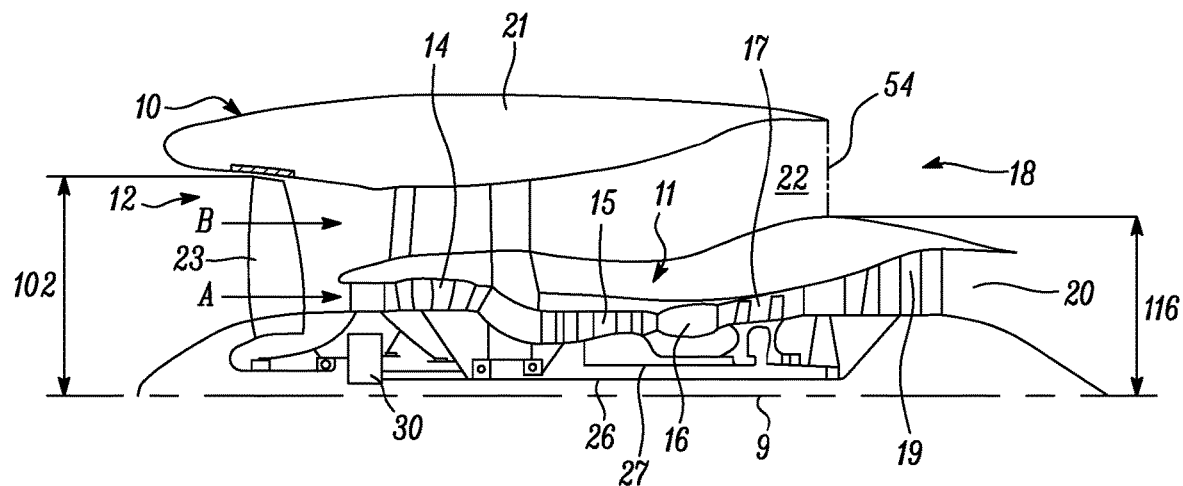
FIG. 8A is a sectional view of the gas turbine engine of FIG. 1 with marked engine dimensions suitable for use in calculating an inner bypass to fan ratio.
Figure 8B:
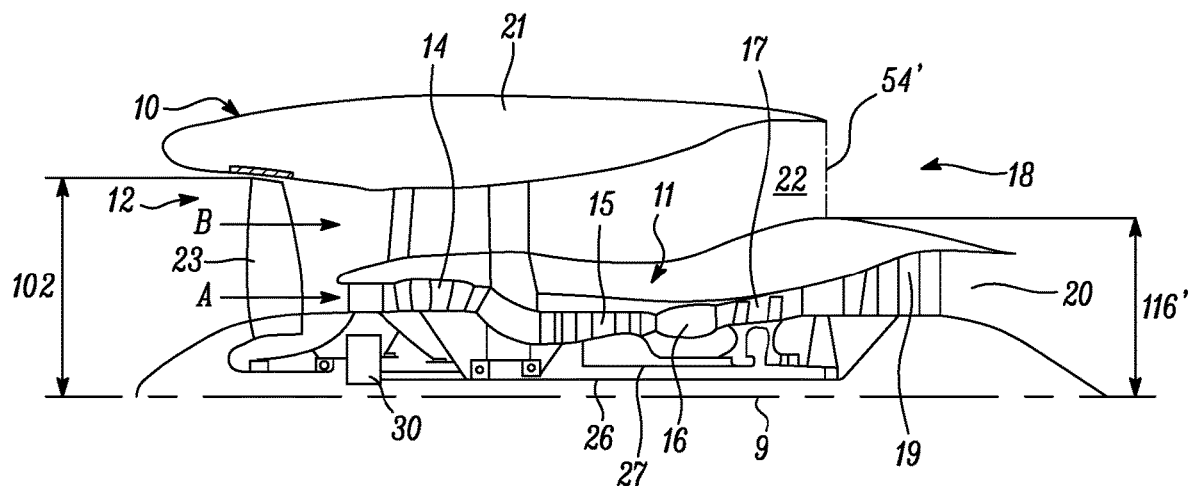
FIG. 8B is a schematic sectional view of a generic gas turbine engine with marked engine dimensions corresponding to those marked in FIG. 8A.

In the embodiments being described, the bypass exhaust nozzle 18 has an exit plane 54 (marked in FIGS. 8A, 8B and 13A). The exit plane 54 is in a radial plane of the engine 10, perpendicular to the engine centreline 9. The exit plane 54 extends inwardly from the rearmost tip of the nacelle 21. A flow area of the bypass exhaust nozzle 18 is approximately defined by the annular section of the exit plane 54 between the inner surface of the nacelle 21 and the outer surface of the engine core 11 (i.e. the open part of the exit plane within the bypass duct 22/nozzle 18, the nozzle 18 being the outlet of the duct 22, noting from the definitions above that the minimum distance $R_b$ across the nozzle 18 experienced by the bypass gas flow (B) may in fact be different from the radial nozzle width).

In the embodiments being described, the outer radius 114 of the bypass exhaust nozzle 18 is measured at the axial position of the exit plane 54 of the bypass exhaust nozzle 18, which corresponds to the axial position of the rearmost tip of the nacelle 21. The outer radius 114 of the bypass exhaust nozzle 18 is therefore the radial distance between the centreline 9 of the engine 10 and an inner surface of the nacelle 21 at the axial position of the rearmost tip 21b of the nacelle 21.

In the embodiments being described, the outer radius 114 of the bypass exhaust nozzle 18 is approximately equal to, or smaller than, the fan tip radius 102. In the embodiment shown in FIG. 7A, the outer radius 114 of the bypass exhaust nozzle 18 is approximately equal to, but slightly larger than, the fan tip radius 102, giving an outer bypass to fan ratio of 1.05 (Figures may not be to scale).

In the embodiment shown in FIG. 7B, the outer radius 114' of the bypass exhaust nozzle 18 is smaller than the fan tip radius 102, giving an outer bypass to fan ratio of less than 1, more particularly between 0.9 and 1, and more particularly of around 0.96 (figures may not be to scale).

The skilled person will appreciate that, in the embodiments shown in FIGS. 7A and 7B, the engine core 11 and fan 23 are identical, and that the difference in the outer bypass to fan ratio is due to the different nacelle shape and in particular to the inner surface of the nacelle 21 curving inwards/towards the engine centre line towards the back of the engine 10 in the embodiment shown in FIG. 7B as opposed to curving outward/away from the engine centre line towards the back of the engine 10 in the embodiment shown in FIG. 7A.

In the embodiment shown in FIG. 7A, an outer radius of the nacelle 21 is approximately constant along the engine length 110, curving inward slightly in the front and rear end regions only. By contrast, in the embodiment shown in FIG. 7B, the outer radius of the nacelle 21 decreases from an axial mid-point of the nacelle 21 towards the rear portion. The nacelle 21 is also thinner than that of the embodiment shown in FIG. 7A, so providing a lower nacelle outer radius/diameter and a narrower overall engine 10 compared to size of the fan 23. The bypass exhaust duct 22 and exhaust nozzle 18 are therefore narrower in the embodiment shown in FIG. 7B.

The skilled person would appreciate that the relatively narrower and rearwardly inwardly-curving nacelle 21 may allow more room for a pylon structure 53 connecting a rear portion of the engine 10 to an aircraft wing 52.

In alternative or additional embodiments, fan 23 parameters may be varied to change the outer bypass to fan ratio, in addition to or instead of changes to the nacelle 21.

Further, in various embodiments, parameters of the engine core 11 may be varied so as to adjust bypass exhaust duct 22 and exhaust nozzle 18 widths/flow areas independently of nacelle 21 radius (e.g. by making the inner radius 116 of the bypass exhaust nozzle 18 smaller).

FIG. 7C provides a schematic illustration of an engine 10 having an outer bypass to fan ratio in the range from 0.6 to 1.05. The skilled person will appreciate that the embodiments shown in FIGS. 7A and 7B are provided by way of examples falling within this range.

The skilled person would appreciate that having a relatively narrow bypass exhaust nozzle 18, as compared to fan size 102, may reduce drag produced by the engine 10 in use. Further, the skilled person would appreciate that the relatively narrow bypass exhaust nozzle 18, and an optionally correspondingly lower outer nacelle radius, may create a more compact exhaust system, which may allow or facilitate under-wing installation of a larger engine 10 on an aircraft 70.

In the embodiment being described, the gas turbine engine 10 further comprises a gearbox 30 connected between the core shaft 26 and the fan 23, the gearbox 30 being arranged to receive an input from the core shaft 26 and provide an output to drive the fan at a lower rotational speed than the core shaft 26. In the embodiment being described, the gearbox 30 has a gear ratio in the range of from 3 to 5, and more particularly of 3.2 to 3.8. In alternative embodiments, no gearbox may be provided or the gear ratio may differ.

Inner Bypass to Fan Ratio

An inner bypass to fan ratio may be defined as:

$$\frac{\text{the inner radius of the bypass exhaust nozzle (18)}}{\text{the fan tip radius (102)}}$$

In the embodiments being described, the inner bypass to fan ratio is in the range 0.4 to 0.65, and more particularly from 0.40 to 0.65. In embodiments having an engine 10 with a fan tip radius 102 in the range from 110 cm to 150 cm, the inner bypass to fan ratio may be in the range from 0.57 to 0.63, for example being in the range from 0.58 to 0.60. In embodiments having an engine 10 with a fan tip radius 102 in the range from 155 cm to 200 cm, the inner bypass to fan ratio may be in the range from 0.5 to 0.6, and optionally from 0.52 to 0.58.

The fan tip radius 102 and the inner radius 116 of the bypass exhaust nozzle 18 are both as defined above each radius is measured in a radial plane, perpendicular to the axis 9 of the engine 10. The inner radius 116 is measured in the same plane as the outer radius 114.

The fan tip radius 102 is approximately equal to the inner radius of the nacelle 21 adjacent the fan (in a forward region of the engine 10). The inner radius 116 of the bypass exhaust nozzle 18 is equivalent to the outer radius of the engine core 11 at the axial position of the rearmost tip 21b of the nacelle 21 (in a rearward region of the engine 10). The inner bypass to fan ratio therefore provides a measure of engine size variation from front to back, differing from that of the outer bypass to fan ratio in that dimensions of the nacelle 21 are less important than those of the engine core 11.

In the embodiments being described, the bypass exhaust nozzle 18 has an exit plane 54 (marked in FIGS. 8A, 8B and 13A). The exit plane 54 is in a radial plane of the engine 10, perpendicular to the engine centreline 9. The exit plane 54 extends inwardly from the rearmost tip of the nacelle 21. A flow area of the bypass exhaust nozzle 18 is approximately defined by the annular section of the exit plane 54 between the inner surface of the nacelle 21 and the outer surface of the engine core 11 (i.e. the open part of the exit plane within the bypass duct 22/nozzle 18, the nozzle 18 being the outlet of the duct 22, noting from the definitions above that the minimum distance $R_b$ across the nozzle 18 experienced by the bypass gas flow (B) may in fact be different from the radial nozzle width).

In the embodiments being described, the inner radius 116 of the bypass exhaust nozzle 18 is measured at the axial position of the exit plane 54 of the bypass exhaust nozzle 18, which corresponds to the axial position of the rearmost tip 21b of the nacelle 21. The inner radius 116 of the bypass exhaust nozzle 18 is therefore the radial distance between the centreline of the engine 10 and an outer surface of the engine core 11 at the axial position of the rearmost tip of the nacelle 21/at the axial position of the bypass exhaust nozzle exit plane 54.

In the embodiment being described, the inner radius 116 of the bypass exhaust nozzle 18 is in the range from 50 cm to 125 cm, and more specifically from 65 cm to 110 cm. In embodiments having an engine 10 with a fan tip radius 102 in the range from 110 cm to 150 cm, the inner radius of the bypass exhaust nozzle may be in the range from 65 cm to 90 cm. In embodiments having an engine 10 with a fan tip radius 102 in the range from 155 cm to 200 cm, the inner radius of the bypass exhaust nozzle may be in the range from 80 cm to 110 cm.

In the embodiments being described, the inner radius 116 of the bypass exhaust nozzle 18 is smaller than the fan tip radius 102, for example being around 50% of the fan tip radius. In the embodiment shown in FIG. 8A, the inner radius 116 of the bypass exhaust nozzle 18 is over half of the length of the fan tip radius 102, giving an inner bypass to fan ratio of around 0.6, and more particularly of around 0.64 (figures may not be to scale). In the embodiment shown in FIG. 7B, the inner radius 116' of the bypass exhaust nozzle 18 is smaller than the fan tip radius 102, giving an outer bypass to fan ratio of around 0.6, and more particularly of around 0.62 (figures may not be to scale).

The skilled person will appreciate that, in the embodiments shown in FIGS. 8A and 8B, the engine core 11 and fan 23 are identical, and that the difference in the inner bypass to fan ratio is due to the different nacelle shape and in particular to the nacelle 21 of the embodiment shown in FIG. 8B extending further back along the engine core 11 than that of FIG. 8A, so making the exit plane 54' further back axially along the engine core 11. As the engine core radius decreases further back axially along the engine core 11 in the embodiment shown, the inner radius 116 of the bypass exhaust nozzle 18 is smaller for the embodiment shown in FIG. 8B than for that in FIG. 8A. The skilled person will appreciate that inner radius of the nacelle 21 has no effect on the measurement of the inner radius 116 of the bypass exhaust nozzle 18, but that nacelle length does affect where the exit plane 54 of the bypass exhaust nozzle 18 is located, and therefore where the inner radius 116 of the bypass exhaust nozzle 18 is measured. In alternative or additional embodiments, shape of the engine core 11 may differ such that axial position of the exit plane 54 has no effect, or a different effect, on the inner radius 116 of the bypass exhaust nozzle 18.

Figure 8C:
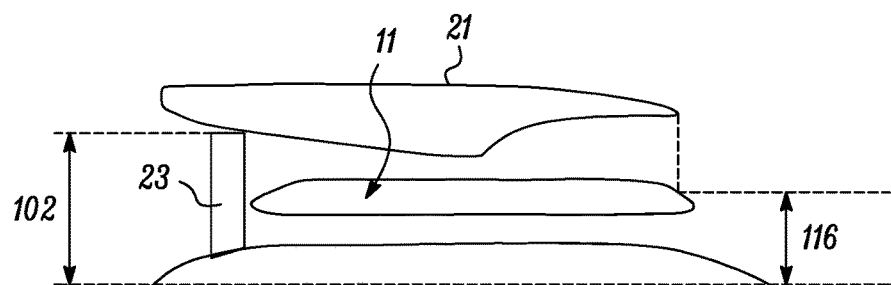
FIG. 8C is a schematic sectional view of a generic gas turbine engine with marked engine dimensions corresponding to those marked in FIG. 8A.

FIG. 8C provides a schematic illustration of an engine 10 having an inner bypass to fan ratio in the range from 0.4 to 0.65. The skilled person will appreciate that the embodiments shown in FIGS. 8A and 8B are provided by way of examples falling within this range.

The skilled person would appreciate that the engine core 11 is situated radially within the bypass exhaust nozzle 18, and that the inner radius 116 of the bypass exhaust nozzle 18 may therefore equivalently be thought of as an outer radius of the engine core 11. More generally, along the length of the engine core 11, the engine core 11 is situated radially within the bypass exhaust duct 22 and an inner radius of the bypass exhaust duct 22 at any given axial location may therefore equivalently be thought of as an outer radius of the engine core 11 at that axial location.

The skilled person would appreciate that having a relatively narrow engine core 11, as compared to fan size 102, may reduce drag produced by the engine 10 in use.

In the embodiment being described, the gas turbine engine 10 further comprises a gearbox 30 connected between the core shaft 26 and the fan 23, the gearbox 30 being arranged to receive an input from the core shaft 26 and provide an output to drive the fan at a lower rotational speed than the core shaft 26. In the embodiment being described, the gearbox 30 has a gear ratio in the range of from 3 to 5, and more particularly of 3.2 to 3.8. In alternative embodiments, no gearbox may be provided or the gear ratio may differ.

Outer Bypass Duct Wall Angle Ratio

An outer bypass duct wall angle 126 is defined as described above. In one embodiment, the outer bypass duct wall angle 126 may be in a range between −15 to +1 degrees. The skilled person would appreciate that FIGS. 12A, 12B and 12C are not to scale and are provided to show how the outer bypass duct wall angle is measured. By providing an outer BPD wall angle in this range a more compact exhaust system may be provided.

In one embodiment, the outer bypass duct wall angle may be negative. In one embodiment, the outer bypass duct wall angle may be in a range between −5 and −1 degrees. By using a negative angle so that the outer wall axis 60 slopes towards the engine centreline 9 a compact exhaust system may be provided. More specifically, the bypass duct wall angle may be in a range between −4.0 to −1.0 degrees.

In one embodiment, the outer bypass duct wall angle 126 may be between −0.5 degrees and −4 degrees—this may be for an engine with a fan tip radius in the range from 110 cm to 150 cm. In one embodiment, the outer bypass duct wall angle may be in a range between −2.5 degrees and −4 degrees—this may be for an engine with a fan tip radius 102 in the range from 155 cm to 200 cm.

The radius of the bypass duct outlet guide vane (OGV) 58 used in embodiments having the bypass duct wall angle 126 defined within the ranges above may be as defined elsewhere herein.

In the embodiment being described, the gas turbine engine 10 further comprises a gearbox 30 connected between the core shaft 26 and the fan 23, the gearbox 30 being arranged to receive an input from the core shaft 26 and providing an output to drive the fan at a lower rotational speed than the core shaft 26. In alternative embodiments, no gearbox may be provided.

Fan Axis Angle

A fan axis angle 118 (also referred to as the fan tip axis angle) is defined as described above. The fan axis angle 118 is defined by the angle between the fan tip axis 62 and the centreline 9 of the engine as shown in FIGS. 9A and 9B. The skilled person would appreciate that FIGS. 9A and 9B are not to scale and are provided to show how the fan axis angle 118 is measured.

A positive value of the fan axis angle 118 corresponds to the fan tip axis 62 sloping towards the engine centreline 9 when moving in a rearward direction along the axis as illustrated in FIG. 9B, i.e. the radially outer tip 68a of the leading edge 64a the plurality of fan blades 64 is further from the engine centreline 9 compared to the radially outer tip of the trailing edge of the rotor blades 19a of the lowest pressure stage of the turbine 19.

In the embodiment being described, the fan axis angle 118 is in a range from 10 to 20 degrees. By providing a fan axis angle 118 in this range the gas turbine engine 10 may have a large fan diameter to provide improved propulsive efficiency, whilst also having a relatively small diameter core 11.

In one embodiment, the fan axis angle may be in a range between 12 degrees to 17 degrees. More specifically, the fan axis angle may be in a range between 13 degrees to 15 degrees. In one embodiment, the fan axis angle may be in a range between 13 degrees and 15 degrees—this may be suitable for an engine with a fan tip radius in the range from 110 cm to 150 cm. In another embodiment, the fan axis angle may be in a range between 13.5 degrees and 15.5 degrees—this may be suitable an engine with a fan tip radius in the range from 155 cm to 200 cm.

In the embodiment being described the gas turbine engine 10 has a single turbine 19 referred to as the lowest pressure turbine. In other embodiments, a plurality of turbines may be provided. The fan axis angle 118 is measured to a rotor of the lowest pressure stage 19b of the lowest pressure turbine 19 of the turbines provided, and so corresponds to the most rearward turbine rotor 19b in the direction of gas flow.

The values of the fan tip radius 102 and the turbine radius in embodiments having the fan axis angle 118 defined in the ranges above may be in the ranges defined elsewhere herein.

In the embodiment being described, the gas turbine engine 10 further comprises a gearbox 30 connected between the core shaft 26 and the fan 23, the gearbox 30 being arranged to receive an input from the core shaft 26 and providing an output to drive the fan at a lower rotational speed than the core shaft 26. In alternative embodiments, no gearbox may be provided.

Fan Speed to Fan-Turbine Radius Difference Ratio

A fan speed to fan-turbine radius difference ratio is defined as:

$$\frac{\text{the maximum take-off rotational speed of the fan}}{\text{fan-turbine radius difference (120)}}$$

The maximum take-off rotational speed of the fan and the fan-turbine radius difference 120 are as defined above, and as illustrated in FIGS. 10A and 10B.

In the embodiment being described in reference to FIGS. 10A and 10B, the fan speed to fan-turbine radius difference ratio is in a range between 0.8 rpm/mm to 5 rpm/mm. As discussed above, this may reduce loading on the pylon 53 which connects the engine 10 to the wing 52 of an aircraft 70.

In one embodiment, the fan speed to fan-turbine radius ratio may be in range between 1.5 rpm/mm to 4.0 rpm/mm. More specifically, the fan speed to fan-turbine radius ratio may be in range between 1.5 rpm/mm to 3.6 rpm/mm. In one embodiment, the fan speed to fan-turbine radius ratio may be in range between 2.93 rpm/mm and 3.8 rpm/mm—this may be for an engine 10 with a fan tip radius 102 in the range from 110 cm to 150 cm. In another embodiment, the fan speed to fan-turbine radius ratio may be in range between 1.2 rpm/mm and 2 rpm/mm—this may be for an engine 10 with a fan tip radius 102 in the range from 155 cm to 200 cm.

The fan-turbine radius difference 120 and the maximum take-off rotational speed of the fan 23 may be in the ranges defined elsewhere herein.

In the embodiment being described, with respect to the fan speed to fan-turbine radius difference ratio, the gas turbine engine 10 has a single turbine 19 referred to as the lowest pressure turbine. In other embodiments, a plurality of turbines may be provided. The fan speed to fan-turbine radius difference ratio is measured to a rotor of the lowest pressure stage 19b of the lowest pressure turbine 19 of the turbines provided, and so corresponds to the most rearward turbine rotor in the direction of gas flow.

The turbine radius 106 at the lowest pressure rotor stage, measured as the radial distance from the engine centreline 9 to the radially outer tip of the trailing edge of one of the rotor blades 44 of the lowest pressure stage 19b of the turbine 19, may be in the range from 45 cm to 85 cm. For an engine 10 with a fan tip radius 102 in a range from 110 cm to 150 cm, the turbine radius 106 at the lowest pressure rotor stage 19b may be in the range from 50 cm to 60 cm. For an engine 10 with a fan tip radius 102 in a range from 155 cm to 200 cm, the turbine radius 106 at the lowest pressure rotor stage 19b may be in the range from range from 60 cm to 85 cm.

In the embodiment being described, the gas turbine engine 10 further comprises a gearbox 30 connected between the core shaft 26 and the fan 23, the gearbox 30 being arranged to receive an input from the core shaft 26 and providing an output to drive the fan 23 at a lower rotational speed than the core shaft 26. In alternative embodiments, no gearbox may be provided.

Figure 10C:
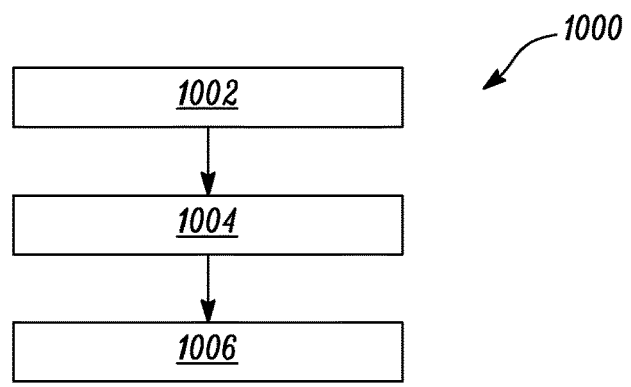
FIG. 10C illustrates a method of an embodiment.

FIG. 10C illustrates a method 1000 of operating an aircraft 70 comprising a gas turbine engine 10 as described above.

The method comprises taking off 1002, reaching cruise conditions 1004, and controlling 1006 the aircraft 70 such that the fan speed to fan-turbine radius ratio is in a range between 0.8 rpm/mm to 5 rpm/mm during take-off. The fan speed to fan-turbine radius ratio may more specifically be within any of the ranges defined above. The method may include controlling the gas turbine engine 10 according to any of the other parameters defined herein.

Downstream Blockage Ratio

FIG. 11A provides a schematic illustration of an engine 10 located under the wing 52 of an aircraft 70. The engine 10 is mounted to the wing by a pylon 53. Any suitable pylon 53 known in the art may be used.

When on the ground, the aircraft 70 is arranged to rest on a ground plane 50. The skilled person would appreciate that lower surfaces of tyres of the aircraft's landing gear (not shown) generally make contact with the ground plane 50. The wing 52 is arranged to lie a distance 124 from the ground plane 50.

In the embodiment being described, the ground-to-wing distance 124 is measured between the ground plane 50 and the centre line of the wing 52 at the leading edge 52a of the wing 52.

The engine 10 is mounted beneath the wing 52, and positioned between the wing 52 and the ground 50 in normal operation. When the aircraft 70 is on the ground 50, the engine 10 is arranged to be below the wing 52 and above the ground plane 50. The skilled person would appreciate that the diameter of the engine 10 is therefore arranged to be smaller than the ground-to-wing distance 124 such that the engine 10 can be mounted beneath the wing 52. The skilled person will appreciate that the diameter of the engine 10 is also arranged to allow space for a pylon 53 to mount the engine to the wing.

In the embodiments being described, the engine 10 is arranged to extend forward of the leading edge 52a of the wing 52. Only a rearward portion of the engine 10 therefore lies directly below the wing 52.

The turbine 19 lies below a forward region of the wing 52 in the embodiment being described, and more specifically below the leading edge 52a of the wing 52. In alternative embodiments, the turbine 19 may lie forward of, or rearward of, the leading edge 52a of the wing 52. The diameter 122 of the turbine 19, and more specifically the diameter 122 of the turbine 19 at the axial position of the lowest pressure rotor 19b as defined above, therefore provides an indication of the amount of vertical space below the wing 52 filled by the engine 10. The turbine diameter 122 is twice the turbine radius 106.

The amount of vertical space between the wing 52 and the ground plane 50 taken up by the engine 10 may be described as a downstream blockage. A downstream blockage ratio as defined above may therefore be calculated as:

$$\frac{\text{the turbine diameter (122) at an axial location of the lowest pressure rotor stage (19}b\text{)}}{\text{distance between ground plane and wing (124)}}$$

In the embodiment being described, the downstream blockage ratio is in the range from 0.2 to 0.3, more particularly in the range from 0.20 to 0.30, in the range from 0.20 to 0.29 and particularly in the range from 0.22 to 0.28. In embodiments with a fan tip radius 102 in the range from 110 cm to 150 cm, the downstream blockage ratio may be in the range from 0.23 to 0.25. In embodiments with a fan tip radius 102 in the range from 155 cm to 200 cm, the downstream blockage ratio may be in the range from 0.27 to 0.29.

In the embodiment being described, the turbine diameter 122 at the axial location of the lowest pressure rotor stage 19b is as defined above and has a value in one or more of the ranges defined above for turbine diameter.

In the embodiment being described, the turbine 19 is a first turbine 19, the compressor is a first compressor 14, and the core shaft is a first core shaft 26, and the engine core 11 further comprises a second turbine 17, a second compressor 15, and a second core shaft 27 connecting the second turbine to the second compressor. In this embodiment, the second turbine, second compressor, and second core shaft 27 are arranged to rotate at a higher rotational speed than the first core shaft 26.

In the embodiment being described, the engine ratio of the engine 10 as defined below falls within the ranges described below. In alternative embodiments with a downstream blockage ratio in the range from 0.2 to 0.3, the engine ratio may not fall within the range from 2.5 to 4—the fan diameter to engine length ratio may therefore not fall in the range from 0.5 to 1.2.

Engine Ratio

An engine ratio may be defined as:

$$\frac{\text{(the fan diameter/the engine length (110))}}{\text{the downstream blockage ratio}} = \frac{\text{(2 × the fan radius (102)/the engine length (110))}}{\text{the downstream blockage ratio}}$$

Where the engine length, fan radius and downstream blockage ratio are all as defined above.

In the embodiment being described, the engine ratio is in the range is in the range from 2.5 to 4, and more specifically in the range from 2.5 to 4.0, and more specifically in the range from 2.7 to 3.7. In the embodiment being described, the engine ratio is greater than 2.5, and more specifically greater than 3.0.

In the embodiment being described, the downstream blockage ratio of the engine 10 as defined above falls within the ranges described above. In alternative embodiments with an engine ratio in the range from 2.5 to 4, the downstream blockage ratio may not fall in the range from 0.2 to 0.3—i.e. the fan diameter to engine length ratio may not fall in the range from 0.5 to 1.2.

In the embodiment being described, the engine length 110 has a value in one or more of the absolute ranges defined above for engine length.

In the embodiment being described, the turbine diameter 122 at the axial location of the lowest pressure rotor stage 19b has a value in one or more of the absolute ranges defined above for turbine diameter.

In the embodiment being described, the turbine 19 is a first turbine 19, the compressor is a first compressor 14, and the core shaft is a first core shaft 26, and the engine core 11 further comprises a second turbine 17, a second compressor 15, and a second core shaft 27 connecting the second turbine to the second compressor. In this embodiment, the second turbine, second compressor, and second core shaft 27 are arranged to rotate at a higher rotational speed than the first core shaft 26.

In the embodiment being described, a Q ratio defined as detailed below is in a range from 0.005 Kgs$^{-1}$N$^{-1}$K$^{1/2}$ to 0.011 Kgs$^{-1}$N$^{-1}$K$^{1/2}$, and more particularly from 0.006 Kgs$^{-1}$N$^{-1}$K$^{1/2}$ to 0.009 Kgs$^{-1}$N$^{-1}$K$^{1/2}$, where the value of Q is taken at cruise conditions.

Downstream Blockage and Q Ratio

In the embodiment illustrated in FIG. 11B, with reference to FIG. 14, a Q ratio of:

the downstream blockage ratio×Q is in a range from 0.005 Kgs$^{-1}$N$^{-1}$K$^{1/2}$ to 0.011 Kgs$^{-1}$N$^{-1}$K$^{1/2}$, wherein the value of Q is taken at cruise conditions.

The downstream blockage ratio and Q are as defined above. By defining the Q ratio in this range a large mass flow may be achieved while also minimising the downstream blockage. The Q ratio may also be represented as:

$$\frac{\text{the turbine diameter (122) at an axial location of the lowest pressure rotor stage (19b)} \times Q}{\text{distance between ground plane and wing (124)}}$$

In one embodiment, the Q ratio may be in a range from 0.005 Kgs$^{-1}$N$^{-1}$K$^{1/2}$ to 0.010 Kgs$^{-1}$N$^{-1}$K$^{1/2}$ specifically the Q ratio may be in a range from 0.006 Kgs$^{-1}$N$^{-1}$K$^{1/2}$ to 0.009 Kgs$^{-1}$N$^{-1}$K$^{1/2}$. The Q value used in the ranges of the previous two sentences is taken at cruise conditions.

A specific thrust may be defined as net engine thrust divided by mass flow rate through the engine. In one embodiment, at engine cruise conditions:

0.029 Kgs$^{-1}$N$^{-1}$K$^{1/2}$≤Q≤0.036 Kgs$^{-1}$N$^{-1}$K$^{1/2}$; and

70 Nkg$^{-1}$s≤specific thrust≤110 Nkg$^{-1}$s.

In other embodiments, at cruise conditions: 0.032 Kgs$^{-1}$N$^{-1}$K$^{1/2}$≤Q≤0.036 Kgs$^{-1}$N$^{-1}$K$^{1/2}$. More specifically, at cruise conditions: 0.033 Kgs$^{-1}$N$^{-1}$K$^{1/2}$≤Q≤0.035 Kgs$^{-1}$N$^{-1}$K$^{1/2}$, or 0.034 Kgs$^{-1}$N$^{-1}$K$^{1/2}$≤Q≤0.035 Kgs$^{-1}$N$^{-1}$K$^{1/2}$ The turbine diameter 122, ratio of the radius of fan blade at its hub to the radius of the fan blade at its tip, and cruise conditions may be as defined elsewhere herein.

In the embodiment being described, the turbine 19 is a first turbine 19, the compressor is a first compressor 14, and the core shaft is a first core shaft 26, and the engine core 11 further comprises a second turbine 17, a second compressor 15, and a second core shaft 27 connecting the second turbine to the second compressor. In this embodiment, the second turbine, second compressor, and second core shaft 27 are arranged to rotate at a higher rotational speed than the first core shaft 26.

Figure 14B:
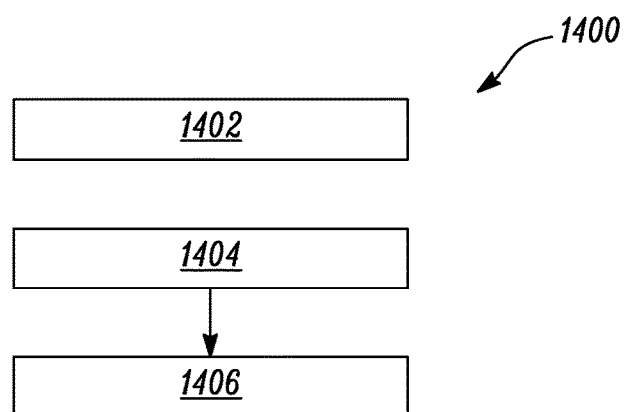
FIG. 14B illustrates a method of an embodiment.

FIG. 14B illustrates a method 1400 of operating an aircraft 70 comprising a gas turbine engine 10 as described above.

The method comprises taking off 1402, reaching cruise conditions 1404, and controlling 1406 the aircraft 70 such that the Q ratio is in a range from 0.005 Kgs$^{-1}$N$^{-1}$K$^{1/2}$ to 0.011 Kgs$^{-1}$N$^{-1}$K$^{1/2}$ during take-off. The Q ratio may more specifically be within any of the ranges defined above. The method may include controlling the gas turbine engine according to any of the other parameters defined herein.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A gas turbine engine for an aircraft mounted beneath a wing of the aircraft, the engine having an engine length and comprising:

an engine core comprising a turbine, a compressor, and a core shaft connecting the turbine to the compressor, the turbine comprising a lowest pressure rotor stage, the turbine having a turbine diameter;

a fan located upstream of the engine core, the fan comprising a plurality of fan blades extending from a hub, the hub and the plurality of fan blades of the fan together defining a fan face having a fan tip radius; and a gearbox that receives an input from the core shaft and outputs drive to the fan so as to drive the fan at a lower rotational speed than the core shaft, wherein a downstream blockage ratio is defined as:

$$\frac{\text{the turbine diameter at an axial location of the lowest pressure rotor stage}}{\text{a distance from a ground plane to the wing}}$$

and wherein an engine blockage ratio of:

$$\frac{(2 \times \text{the fan tip radius/the engine length})}{\text{the downstream blockage ratio}}$$

is in a range from 2.5 to 4.

2. The gas turbine engine of claim 1 wherein the engine blockage ratio is in the range of from 2.7 to 3.7.

3. The gas turbine engine of claim 1, wherein the engine blockage ratio is greater than 3.0.

4. The gas turbine engine of claim 1, wherein the downstream blockage ratio is in a range from 0.20 to 0.30.

5. The gas turbine engine of claim 1, wherein the downstream blockage ratio is in a range from 0.20 to 0.29.

6. The gas turbine engine of claim 1, wherein the downstream blockage ratio is in a range from 0.22 to 0.28.

7. The gas turbine engine of claim 1, wherein a distance between a ground plane and the wing is measured to a centre point of a leading edge of the wing.

8. The gas turbine engine of claim 1, wherein the distance between the ground plane and the wing is measured along a line perpendicular to the ground plane and passing through and perpendicular to an axial centreline of the engine.

9. The gas turbine engine of claim 1, wherein the turbine diameter at the axial location of the lowest pressure rotor stage is measured adjacent blade tips of rotor blades of the lowest pressure rotor stage.

10. The gas turbine engine of claim 1, wherein the turbine diameter at the axial location of the lowest pressure rotor stage is in a range from 70 cm to 170 cm, and wherein optionally either of the below may apply:
    (i) the fan tip radius is in a range from 110 cm to 150 cm, and the turbine diameter at the lowest pressure rotor stage is in the range from 100 cm to 120 cm; or
    (ii) the fan tip radius is in the range from 155 cm to 200 cm, and the turbine diameter at the lowest pressure rotor stage is in the range from 120 cm to 170 cm.

11. The gas turbine engine of claim 1, wherein the engine length is measured as an axial distance between a forward region of the fan and a rearward region of the turbine.

12. The gas turbine engine of claim 1, wherein the engine length is measured along a centreline of the engine from an axial position of an intersection of a leading edge of each of the plurality of fan blades and the hub of the fan to a trailing edge mean radius point of one of the rotor blades provided in the lowest pressure stage of the turbine.

13. The gas turbine engine of claim 1, wherein the engine length is in a range from 200 cm to 500 cm, and optionally from 230 cm to 470 cm, and wherein optionally either:
    (i) the fan tip radius is in a range from 110 cm to 150 cm, and the engine length is in the range from 300 cm to 360 cm; or
    (ii) the fan tip radius is in the range from 155 cm to 200 cm, and the engine length is in the range from 370 cm to 470 cm.

14. The gas turbine engine of claim 1, wherein the fan tip radius is measured between an engine centreline and a tip of a fan blade of the plurality of fan blades at its leading edge and a fan diameter equal to twice the fan tip radius is greater than or equal to any of: 220 cm, 230 cm, 240 cm, 250 cm, 260 cm, 270 cm, 280 cm, 290 cm, 300 cm, 310 cm, 320 cm, 330 cm, 340 cm, 350 cm, 360 cm, 370 cm, 380 cm or 390 cm.

15. The gas turbine engine according to claim 1, wherein a quasi-non-dimensional mass flow rate, Q, is defined as:

$$Q = W \frac{\sqrt{T0}}{P0 \cdot A_{flow}}$$

where:
W is mass flow rate through the fan in Kg/s;
T0 is average stagnation temperature of the air at the fan face in Kelvin;
P0 is average stagnation pressure of the air at the fan face in Pa; and
$A_{flow}$ is the flow area of the fan face in m$^2$,
and a Q ratio of:
the downstream blockage ratio×the quasi-non-dimensional mass flow rate (Q) is in a range from 0.005 Kgs$^{-1}$N$^{-1}$K$^{1/2}$ to 0.011 Kgs$^{-1}$N$^{-1}$K$^{1/2}$, optionally 0.006 Kgs$^{-1}$N$^{-1}$K$^{1/2}$ to 0.009 Kgs$^{-1}$N$^{-1}$K$^{1/2}$, where the Q is calculated at cruise conditions.

16. The gas turbine engine according to claim 1, wherein:
the turbine is a first turbine, the compressor is a first compressor, and the core shaft is a first core shaft;
the engine core further comprises a second turbine, a second compressor, and a second core shaft connecting the second turbine to the second compressor; and
the second turbine, second compressor, and second core shaft are arranged to rotate at a higher rotational speed than the first core shaft.

17. An aircraft comprising a wing and a gas turbine engine mounted beneath the wing of the aircraft, the engine having an engine length and comprising:
an engine core comprising a turbine, a compressor, and a core shaft connecting the turbine to the compressor, the turbine comprising a lowest pressure rotor, the turbine having a turbine diameter;
a fan located upstream of the engine core, the fan comprising a plurality of fan blades extending from a hub, the hub and the plurality of fan blades of the fan together defining a fan face having a fan tip radius; and
a gearbox that receives an input from the core shaft and outputs drive to the fan so as to drive the fan at a lower rotational speed than the core shaft,
wherein a downstream blockage ratio is defined as:

$$\frac{\text{the turbine diameter at an axial location of the lowest pressure rotor}}{\text{a distance from a ground plane to the wing}}$$

and wherein an engine ratio of:

$$\frac{(2 \times \text{the fan tip radius/the engine length})}{\text{the downstream blockage ratio}}$$

is in a range from 2.5 to 4.

* * * * *